US012705949B2

(12) United States Patent
Weaver et al.

(10) Patent No.: US 12,705,949 B2
(45) Date of Patent: Aug. 11, 2026

(54) STANDARD ANIMATED ROLL-UP FOR ELECTRONIC PULL-TAB GAMING

(71) Applicant: Pilot Gaming Systems, Inc., Reno, NV (US)

(72) Inventors: Jon Weaver, Birmingham, MI (US); Anthony M. Morelli, Mt. Pleasant, SC (US)

(73) Assignee: Pilot Gaming Systems, Inc., Reno, NV (US)

( * ) Notice: Subject to any disclaimer, the term of this patent is extended or adjusted under 35 U.S.C. 154(b) by 0 days.

(21) Appl. No.: 19/007,234

(22) Filed: Dec. 31, 2024

(65) Prior Publication Data

US 2026/0170898 A1 Jun. 18, 2026

Related U.S. Application Data

(60) Provisional application No. 63/735,478, filed on Dec. 18, 2024.

(51) Int. Cl.
*G07F 17/32* (2006.01)

(52) U.S. Cl.
CPC ...... *G07F 17/3213* (2013.01); *G07F 17/3244* (2013.01)

(58) Field of Classification Search
CPC ......................... G07F 17/3213; G07F 17/3244
See application file for complete search history.

(56) References Cited

U.S. PATENT DOCUMENTS 5,647,592 A * 7/1997 Gerow .................... A63F 3/069 463/26
5,934,671 A * 8/1999 Harrison ................. A63F 3/069 283/901
5,944,606 A * 8/1999 Gerow .................... A63F 3/069 273/138.2
6,183,361 B1 * 2/2001 Cummings ......... G07F 17/3262 273/269
6,305,687 B1 * 10/2001 Pollock ................... A63F 3/069 463/19
6,309,298 B1 * 10/2001 Gerow ................ G07F 17/3258 273/138.2
6,612,576 B1 * 9/2003 Stancik ................... A63F 3/069 283/901

(Continued)

*Primary Examiner* — Dmitry Suhol
*Assistant Examiner* — Jason Pinheiro
(74) *Attorney, Agent, or Firm* — Kerr IP Group, LLC

(57) ABSTRACT

A pull-tab gaming system and method is described. The pull-tab gaming system includes a wagering system and a plurality of gaming devices. The wagering system generates an electronic pull-tab deck that includes winning electronic pull-tab tickets having a non-zero prize value. A game play instruction is received by a gaming device, which causes the gaming device to generate an electronic pull-tab request from the wagering system. A non-zero electronic pull-tab ticket is transmitted from the wagering system to the gaming client. The non-zero electronic pull-tab ticket includes a final awarded prize. For the non-zero electronic pull-tab ticket, the gaming device displays a plurality of payline symbols but does not display the final awarded prize. The gaming device then displays an animated roll-up that includes the final awarded prize. The gaming device then displays the payline symbols and the final awarded prize after displaying the animated roll-up.

17 Claims, 48 Drawing Sheets

(56) References Cited

U.S. PATENT DOCUMENTS

| | | | | |
|---|---|---|---|---|
| 6,648,755 | B1 * | 11/2003 | Luciano, Jr. | G07F 17/42 463/20 |
| 7,179,168 | B1 * | 2/2007 | Tulley | G07F 17/329 463/25 |
| 7,780,169 | B2 * | 8/2010 | Breslo | A63F 1/00 463/16 |
| 7,950,662 | B2 * | 5/2011 | Robinson | G07F 17/32 273/139 |
| 7,997,581 | B2 * | 8/2011 | Brennan | A63F 1/04 463/19 |
| 8,047,907 | B2 * | 11/2011 | Kane | G07F 17/329 463/16 |
| 10,872,504 | B2 * | 12/2020 | Acres | G07F 17/3227 |
| 11,263,869 | B2 * | 3/2022 | Lindelsee | G06K 19/041 |
| 11,823,530 | B2 * | 11/2023 | Freels | G07F 17/3244 |
| 2002/0039917 | A1 * | 4/2002 | Armstrong | G07F 17/32 463/16 |
| 2002/0098882 | A1 * | 7/2002 | Lind | G07F 17/32 463/17 |
| 2003/0111793 | A1 * | 6/2003 | Cherry | A63F 3/069 273/292 |
| 2003/0116916 | A1 * | 6/2003 | Cherry | A63F 3/069 273/292 |
| 2003/0132576 | A1 * | 7/2003 | Stancik | A63F 3/069 273/292 |
| 2004/0147321 | A1 * | 7/2004 | Duhamel | G07F 17/329 463/42 |
| 2004/0173962 | A1 * | 9/2004 | Cherry | A63F 3/065 273/139 |
| 2004/0185931 | A1 * | 9/2004 | Lowell | G07F 17/329 463/17 |
| 2006/0046827 | A1 * | 3/2006 | Saffari | G07F 17/32 463/19 |
| 2006/0166725 | A1 * | 7/2006 | Saffari | G07F 17/3248 463/2 |
| 2006/0279038 | A1 * | 12/2006 | Irwin | A63F 3/0665 463/17 |
| 2011/0244951 | A1 * | 10/2011 | Shaw | G07F 17/3258 463/30 |
| 2014/0080564 | A1 * | 3/2014 | Acres | G07F 17/3288 463/25 |
| 2016/0092069 | A1 * | 3/2016 | Kelly | G07F 17/323 463/25 |
| 2017/0046906 | A1 * | 2/2017 | Hilbert | G07F 17/3225 |
| 2019/0073877 | A1 * | 3/2019 | Deleon | G07F 17/3267 |
| 2020/0027312 | A1 * | 1/2020 | Demasters | G07F 17/3227 |
| 2023/0368615 | A1 * | 11/2023 | Tsombanidis | G07F 17/3267 |
| 2023/0419771 | A1 * | 12/2023 | Milosevich | G07F 17/3258 |
| 2024/0096174 | A1 * | 3/2024 | Baerlocher | G06Q 50/34 |

* cited by examiner

Figure 2E
240
242
Pilot Games
FISHING
FISHING
$2.00
FISHING
WILD
BET
$1
WIN
$2.00
CASH
$299.00
244

Figure 9G
950
902a
902b
902c
904
FISHING
FISHING
FISHING
WILD
WILD
$15.00
BET
$1
WIN
$15.00
CASH
$380.50
952
906
954

Figure 10A
Figure 10B
1000
1002
1004
WILD
BET
WIN
CASH
$379.50
Development Build
1010
1012
WILD
BET
WIN
CASH
$379.50
Development Build

Figure 11A
Figure 11B
1100a
1110
1102
1104
1106
1108
Watermark
Symbols
Pay
Winners
$300.00 1
$200.00 1
$150.00 2
$150.00 1
$80.00 2
$80.00 1
$50.00 2
$50.00 2
$50.00 2
$25.00 3
$25.00 3
$25.00 2
$25.00 2
$15.00 5
$15.00 5
1100b
Watermark
Symbols
Pay
Winners
$15.00 5
$15.00 5
$15.00 5
N/A $50.00 1
N/A $25.00 10
N/A $40.00 1
N/A $20.00 9
N/A $40.00 1
N/A $20.00 3
N/A $10.00 39
N/A $20.00 2
N/A $5.00 177
N/A $40.00 3
N/A $20.00 8
N/A $10.00 5

1100c

1100d

Figure 15C
Figure 15D
Watermark
Symbols
Pay
Winners
$2.00 9
$2.00 9
N/A $50.00 1
N/A $25.00 10
N/A $40.00 1
N/A $20.00 9
N/A $40.00 1
N/A $20.00 3
N/A $10.00 36
N/A $20.00 2
N/A $5.00 189
N/A $40.00 2
N/A $20.00 8
N/A $10.00 4
N/A $8.00 12
Watermark
Symbols
Pay
Winners
N/A $4.00 17
N/A $2.00 290
N/A $100.00 1
N/A $50.00 1
N/A $40.00 1
N/A $25.00 3
N/A $20.00 1
N/A $20.00 4
N/A $10.00 5
N/A $8.00 2
N/A $5.00 10
N/A $4.00 2
N/A $4.00 4
N/A $2.00 5
N/A $1.00 370

1500c

1500d

1500e

Figure 17F
Figure 17G
1732
1730
The HOUSE on HAUNTED HILL
Advance
Collect $10.00
Collect $4.00
Collect $8.00
Collect $4.00
BET
WIN
CASH
$687.75
1742
1740
The HOUSE on HAUNTED HILL
Advance
Collect
Collect $50.00
Collect $30.00
BET
WIN
CASH
$687.75

Figure 17H
Figure 17I
1752
1750
The HOUSE on HAUNTED HILL
Collect
$150.00
Collect
$300.00
Collect
$75.00
BET
WIN
CASH
$667.75
1762
1760
The HOUSE on HAUNTED HILL
$300.00
BET
WIN
$300.00
CASH
$967.75

Figure 19C
Figure 19D
1932
1934
1930
BUNYAN'S BABES
CLEAR CUT
CLEAR CUT
CLEAR CUT
BET
WIN
CASH
$297.50
Development Build
1944
1940
1942
EXTRA AXE
$2
TOTAL WIN
Development Build

STANDARD ANIMATED ROLL-UP FOR ELECTRONIC PULL-TAB GAMING

CROSS-REFERENCES

This patent application claims the benefit of provisional patent application 63/735,478 entitled STANDARD ANIMATED ROLL-UP FOR ELECTRONIC PULL-TAB GAMING, filed on Dec. 18, 2024; and the above patent applications are hereby incorporated by reference in this patent application.

FIELD

A standard animated roll pull-tab gaming system and method is described. More specifically, a game play instruction is received by a gaming device, which causes the gaming device to generate an electronic pull-tab request from the wagering system. A non-zero electronic pull-tab ticket is transmitted from the wagering system to the gaming client. The non-zero electronic pull-tab ticket includes a final awarded prize. For the non-zero electronic pull-tab ticket, the gaming device displays a plurality of payline symbols but does not display the final awarded prize. The gaming device then displays an animated roll-up that presents the final awarded prize. The gaming device then displays the payline symbols and the final awarded prize after displaying the animated roll-up.

BACKGROUND

Electronic pull-tab gaming is a form of gambling that is played on electronic devices, such as tablets or gaming machines. Electronic pull-tab gaming is similar to traditional paper pull-tab games where players purchase tickets with perforated tabs that can be pulled back to reveal symbols or numbers.

Electronic pull-tab gaming is regulated by gaming authorities to ensure fairness and responsible gambling practices. Electronic pull-tab gaming systems are commonly found in casinos, gaming lounges, or online gambling platforms. Electronic pull-tab gaming provides entertainment and the opportunity to win prizes for players who enjoy this form of gambling.

Traditional pull-tab gaming includes a "roll-up" that only reveals a payline and the awarded final prize. The traditional roll-up reveals the awarded final prize after the gaming device receives a winning electronic pull-tab ticket.

Novel pull-tab gaming systems and methods are described herein that provide a more entertaining prize reveal. Additionally, these novel pull-tab gaming systems and methods overcome various regulatory challenges in one or more jurisdictions.

SUMMARY

A pull-tab gaming system and method is described. The pull-tab gaming system includes a wagering system and a plurality of gaming devices. The wagering system generates an electronic pull-tab deck which includes winning electronic pull-tab tickets having a non-zero prize value. The gaming devices are communicatively coupled to the wagering system. Each gaming device includes a processor and a memory.

A game play instruction is received by a gaming device, which causes the gaming device to generate an electronic pull-tab request from the wagering system. A non-zero electronic pull-tab ticket is transmitted from the wagering system to the gaming client. The non-zero electronic pull-tab ticket includes a final awarded prize.

For the non-zero electronic pull-tab ticket, the gaming device displays a plurality of payline symbols associated with a first graphical representation. The gaming device then displays an animated roll-up that is associated with an intermediate graphical representation that follows the first graphical representation. The gaming device then displays a final graphical representation that includes the payline symbols and the final awarded prize after displaying the animated roll-up. Also, the gaming device displays a paytable that presents a plurality of final prizes corresponding to the payline symbols.

In one embodiment, the game play instruction includes receiving a bet amount which is associated with a player wager. In another embodiment, the game play instruction includes receiving a play game instruction received from a play button.

In a further embodiment, the intermediate graphical representation includes a simulated intermediate prize, and the simulated intermediate prize does not affect the final awarded prize. Additionally, the first graphical representation includes a watermark and the payline symbols, and the final graphical representation includes the watermark, the payline symbols, and the final awarded prize.

In a still further embodiment, the simulated intermediate prize extends the animated roll-up without affecting the final awarded prize.

In another embodiment, a background display is presented with the first graphical representation that includes the payline symbols. The animated roll-up zooms into the background display to present an exploded view of the background display. The simulated prize is then revealed on the exploded view of the background display, and the final awarded prize is presented on the exploded view of the background display.

A pull-tab gaming method is also described. The pull-tab gaming method includes enabling a wagering system to generate an electronic pull-tab deck having a plurality of electronic pull-tab tickets. The electronic pull-tab deck includes winning electronic pull-tab tickets having a non-zero prize value. The method communicatively couples a plurality of gaming devices to the wagering system, wherein each gaming device includes a processor and a memory. A game play instruction is received by the gaming device. The game play instruction causes a gaming device to generate an electronic pull-tab request from the wagering system. A non-zero electronic pull-tab ticket is transmitted from the wagering system to the gaming client. The non-zero electronic pull-tab ticket includes a final awarded prize in response to the electronic pull-tab ticket request.

A plurality of payline symbols are displayed on the gaming device for the non-zero electronic pull-tab ticket. The displaying of the payline symbols is associated with a first graphical representation. The gaming device displays an animated roll-up that is associated with an intermediate graphical representation that follows the first graphical representation. The intermediate graphical representation may include a simulated intermediate prize. The gaming device then displays a final graphical representation after the intermediate graphical representation. The final graphical representation includes the payline symbols and the final awarded prize. The gaming device displays a paytable that presents a plurality of final prizes corresponding to a plurality of payline symbols.

In one embodiment, the game play instruction includes receiving a bet amount which is associated with a player wager. In another embodiment, the game play instruction includes receiving a play game instruction received from a play button.

In yet another embodiment, the first graphical representation includes a watermark and the payline symbols and the final graphic representation includes the watermark, the payline symbols, and the final awarded prize. In a further embodiment, the simulated prize extends the animated roll-up without affecting the final awarded prize.

In a further embodiment, the method provides a background display when displaying the first graphical representation. During the animated roll-up, the pull-tab gaming method zooms into the background display to generate an exploded view of the background display. The simulated prize is revealed in the exploded view of the background display. The final awarded prize is also revealed in the exploded view of the background display.

FIGURES

The present invention will be more fully understood by reference to the following drawings which are presented for illustrative, not limiting, purposes.

Referring to FIG. 1A shows a simplified pull-tab gaming system that includes a wagering system.

Referring to FIG. 1B and FIG. 1C show a high-level flowchart of pre-play selection, watermarking, and the animated roll-up during a Game Session.

Figure 17A:
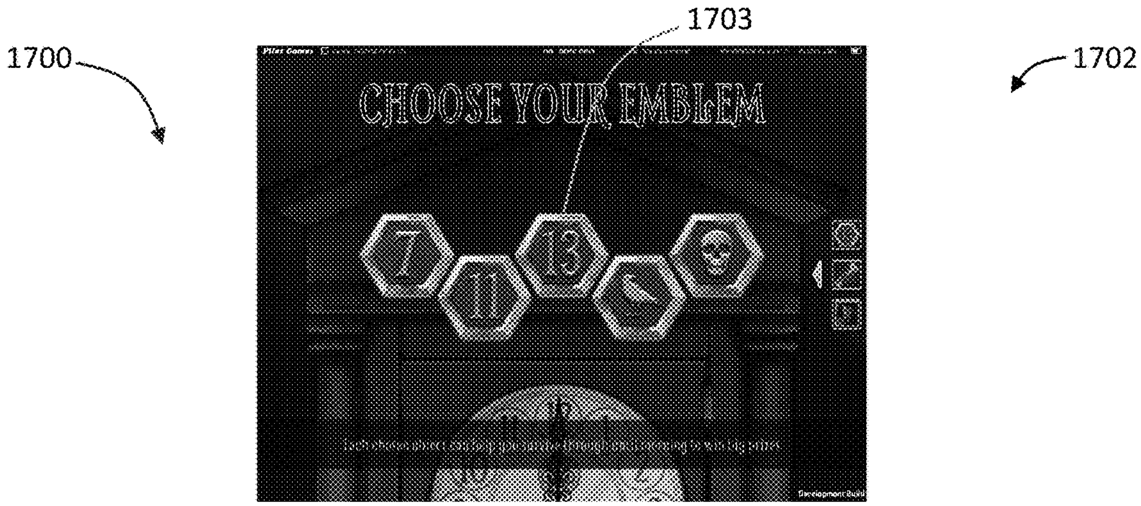
Figure 17B:
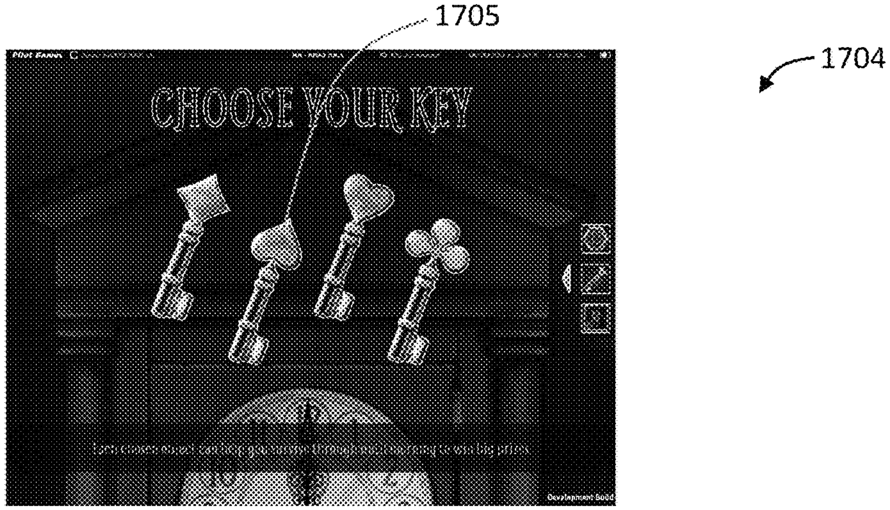
Figure 17C:
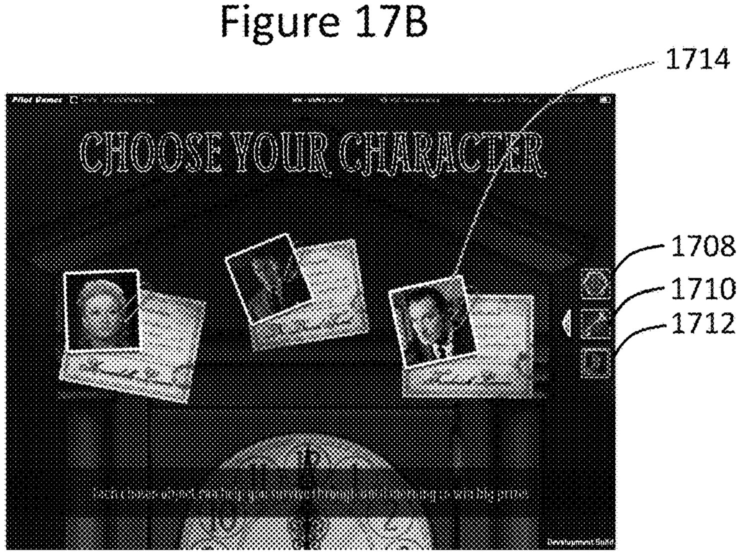
Figure 17D:
Figure 17E:
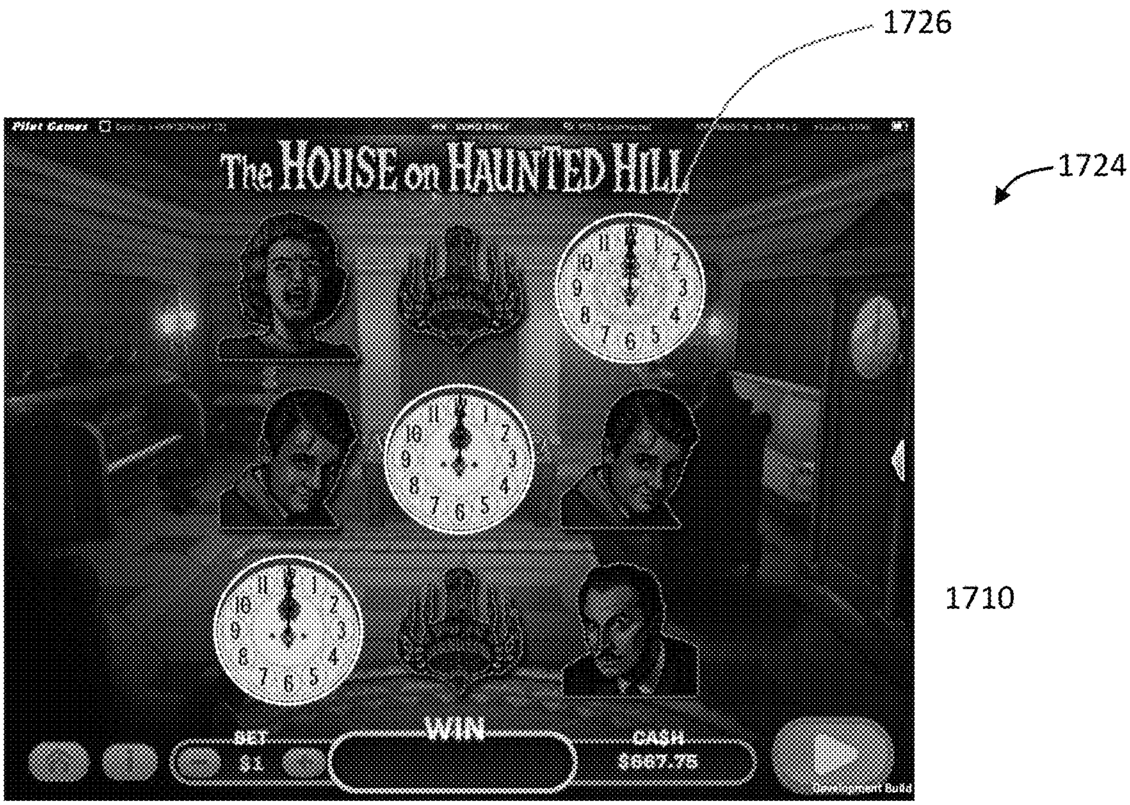
Figure 17F:
Figure 17G:
Figure 17H:
Figure 17I:

FIG. 17A though FIG. 17I show another illustrative pull tab game entitled The House on Haunted Hill, in which the player is presented with three (3) items to choose from, namely, an emblem, a key and a character.

FIG. 18A through FIG. 18I shows a Cash Mountain pull-tab game with pre-play selection.

FIG. 19A through FIG. 19H shows a game entitled Bunyan's Babes that also includes an extended roll-up game feature, however, without the pre-play selection feature.

FIG. 20A through FIG. 20L shows an animated roll-up that includes a Picture-in-Picture (PiP) game play feature for the Go4Gold game.

DESCRIPTION

Persons of ordinary skill in the art will realize that the following description is illustrative and not in any way limiting. Other embodiments of the claimed subject matter will readily suggest themselves to such skilled persons having the benefit of this disclosure. The various illustrative embodiments will now be described more fully with reference to the accompanying drawings. It should be understood that this disclosure and the claims may be embodied in many different forms and should not be construed as limited to the embodiments set forth herein. Additionally, those familiar with computing systems shall appreciate that there are many variants possible for the described systems, depending on the nature of the available networks, legal frameworks, which can open or restrict the types of locations in which the system can be operated. Additionally, there may be advances in server and networking technologies that result in alternative embodiments that are practiced by those of ordinary skill in the art.

The systems and methods presented herein describe a prize reveal process for electronic pull-tab gaming. There are three steps to the prize reveal process that occur when a non-zero winning electronic pull-tab ticket is received by a gaming client device, in which the non-zero electronic pull-tab ticket includes a final awarded prize.

The first step of the prize reveal process includes a first graphical representation that includes one or more payline symbols that indicate a winning ticket was received. However, the first graphical representation does not include the final awarded prize. A watermark may be associated with the first graphical representation.

The second step of the prize reveal process includes an intermediate graphical representation that includes an animated roll-up and/or one or more images. The animated roll-up includes one or more animations and results in presenting the final awarded prize. In some embodiments, a variety of simulated intermediate prizes are also awarded during the animated roll-up to build anticipation during game play. The animated roll-up may also be customized for the player based on the pre-play selection feature described herein.

The third step of the prize reveal process includes a final graphical representation that includes the payline symbols and the final awarded prize. A watermark may also be included with the graphical representation.

The systems and methods presented herein describe a variety of game play features for electronic pull-tab (e-pull-tab) gaming that comply with laws from various jurisdictions including, but not limited to, Minnesota gaming law. The first game play feature includes a plurality of payline symbols and a watermark when a gaming client receives a non-zero, e.g., winning, electronic pull-tab ticket. Initially, a final awarded prize is not shown with the payline symbols and watermark. In certain embodiments, the payline symbols indicate that a winning ticket does not include a watermark. The term “first graphical representation” refers to displaying the payline symbol combination with a possible watermark, but without the final awarded prize.

A watermark may be associated with at least one payline symbol. The watermark described herein provides an identifying image or pattern that is proximate to a payline symbol, or the watermark is integrated into the payline symbol. The watermark is also associated with a prize that is identified in a paytable. In the illustrative embodiments presented herein the watermark presented on the gaming client device 108 is encoded with visible patterns that, in combination with the payline symbols, identify a prize in a paytable. The watermarks described herein are not readily identifiable by the player. The uniqueness of the watermark does not allow a player to recall a particular pattern. Since the watermark is not readily identifiable to the player, the animated roll-up provides an animation that increases the anticipation when the final awarded prize is revealed. For example, the watermark may include an enhancement to a standard symbol such that at a quick glance by a player displays no perceivable difference, however, under closer inspection the differences between symbols without watermarks and symbols with watermarks and the difference between individual watermarks are observable.

A payline is a lineup of specific symbols that indicates a prize is to be awarded according to a game paytable. Paylines may line up in a horizontal, vertical, diagonal, zig zag or any other pattern that is associated with a winning ticket. The traditional payline for electronic pull-tab games includes the payline symbols and the awarded prize. The payline is usually different for each game and the term “payline symbol combination” or “payline symbols” refers to a particular set of payline symbols that associated with a particular paytable. Payline symbol combination may include a watermark associated with one of the payline symbols.

The second game play feature relates to a standard animated roll-up, which is associated with the intermediate graphical representation. The intermediate graphical representation is associated with the second prize reveal step that occurs after the first graphical representation reveals a payline symbol combination and does not reveal the final awarded prize. Recall, the first prize reveal step includes the first graphical representation having a plurality of payline symbols. Additionally, in certain embodiments the first graphical representation may also include a watermark. The intermediate graphical representation is typically embodied as an “animated roll-up.” The intermediate graphical representation is a transient graphical representation that occurs after the first graphical representation. The intermediate graphical representation ends when the final awarded prize is revealed, typically, via an animated roll-up. The intermediate graphical representation is followed by the final graphical representation that includes the final awarded prize and the payline symbols.

In some instances, the reference to an animated roll-up refers more specifically to animations that are presented after the first graphical representation that includes a payline and before the final graphical representation. Also, the term intermediate graphical representation refers to animations, still images, background images, overlaid images, and other such combinations of images and animations. Thus, the typical intermediate graphical representation typically includes an animated roll-up, however, in certain embodiments the intermediate graphical representation may only include images.

The intermediate graphical representation or the animated roll-up may include a simulated intermediate prize, which is a simulated prize that appears to be randomly awarded during the animated roll-up. Although the final awarded prize has already been predetermined when the gaming client receives the electronic pull-tab ticket, the simulated intermediate prize builds anticipation into the prize reveal process, which makes game play more entertaining. The simulated intermediate prize does not impact the final awarded prize. The animated roll-up is initiated after a winning ticket is received by an electronic pull-tab mobile gaming client and the first graphical representation that includes the payline symbol combination is shown. Thus, a winning ticket is received and the first graphical representation, e.g., payline symbols, is presented before initiating the second intermediate graphical representation. Typically, the animated roll-up is completed when the final awarded prize is revealed. Note, in the illustrative embodiments presented herein, a separate third process reveal step then follows, in which the final awarded and the payline symbols are presented.

There are two types of animated roll-ups, namely, a standard animated roll-up and a customized animated roll-up. The standard animated electronic pull-tab roll-up provides a prize reveal that does not include the pre-play selections. The standard animated roll-up includes a prize dependent animation having a plurality of images that are revealed over a period of time, in which the awarded prize is associated with an electronic pull-tab gaming paytable. At the completion of the standard animated roll-up, the payline and awarded prize are presented at the same time in the final graphical representation. In Minnesota, a traditional electronic pull-tab roll-up is revealed in the win meter and by a payline that reflects the awarded prize. Thus, the traditional e-pull-tab roll-up only reveals an awarded prize with a payline and with an updated win meter. Note, the end of the standard animated roll-up also reveals the awarded prize with the payline.

The standard animated roll-up developed by Pilot Games includes a variety of animated images that are presented over a period of time and may also include one or more simulated intermediate prizes so that simulated intermediate prizes increase over time, thereby, building player anticipation and making game play more engaging and fun. However, the final prize revealed in the standard animated roll-up is the same as the winning ticket prize received by the mobile gaming device.

The third game play feature described herein generates the customized animated roll-up based on a pre-play selection input. The customized animated roll-up is a personalized animated roll-up that is generated with player selections that occur before receiving a game play instruction. As described herein, the pre-play selection input(s) is received before the “game play instruction.” The “game play instruction” is a player-driven game action that triggers one or more game device executables or system-drive game events. An illustrative game play instruction includes receiving a bet amount or receiving a play game instruction. The play game instruction may be embodied as a “play” button such as a “start game” arrow.

Additionally, the pre-play selection may also affect the volatility after receiving a wager. Thus, in addition to the denomination affecting the volatility, the game volatility may independently be affected by the pre-play selection, in which the player selects the desired volatility after having made a wager. Thus, an in-wager change to game volatility may be selected by the player using pre-play selection.

The fourth game play feature is a Picture-in-Picture (PiP) game play feature, in which the prize reveal includes a secondary display, e.g., a large screen television, disposed in the background of the animated roll-up. During the intermediate graphical representation, a zoom animation magnifies the secondary display and presents prize information associated with the winning ticket received by the mobile gaming client in an exploded view of the display that was previously in the background, i.e., a background display.

The fifth game play feature is an extended animated roll-up that simulates randomly awarding an additional prize that extends the prize reveal and increases the awarded prize without affecting the predetermined final awarded prize. Thus, the extended animated roll-up is typically associated with the simulated intermediate prize described above and hereafter and includes extending the animation associated with the animated roll-up. Note, the final awarded prize during the extended animated roll-up matches the winning ticket prize received by the mobile gaming client. The extended animated roll-up prize may be embodied as simulating randomly awarding additional prizes such as “lucky items,” a simulated intermediary prize that extends the animated roll-up, as additional game elements that extend game play, or other such game device Executable that extends the animated roll-up.

Figure 1A:
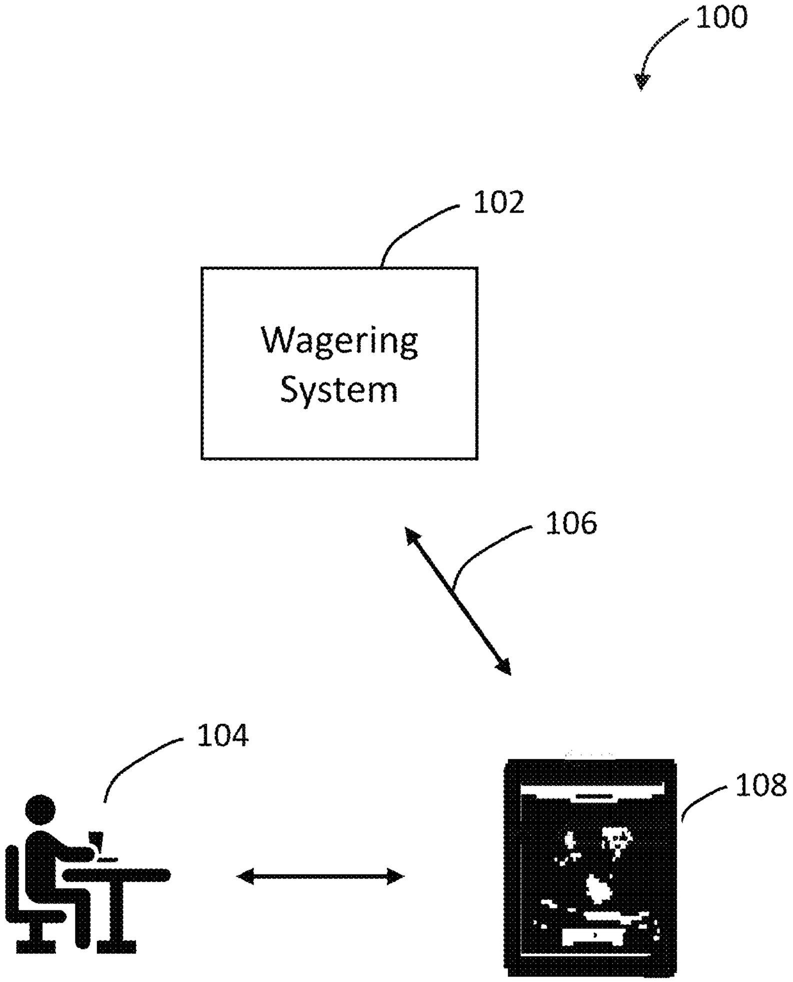

Referring to FIG. 1A there is shown a simplified pull-tab gaming system 100 that includes a wagering system 102. The simplified pull-tab gaming system can be played in a bar, casino or other gaming establishment by a player 104. The player interacts with a gaming client device 108, e.g., iPad. The illustrative iPad receives a downloaded game from the Apple App Store, or the wagering system 102. More generally, the wagering system 102 represents server-side operations performed by one or more server side modules as described in further detail below. The gaming client device 108 communicates with the wagering system using a wide area network 106, e.g., the Internet. Typically, the wagering system 102 receives a plurality of electronic pull-tab ticket requests from the illustrative gaming client device 108 and transmits one or more electronic pull-tab tickets to the gaming client device 108.

For purposes of this patent, the term “Game Play” refers to player interactions with a pull-tab gaming client device 108 that is communicating with the wagering system 102. Game Play occurs during a “Game Session.” A pull-tab “Game Session” begins when a player receives a mobile pull-tab gaming client device 108 or sits down at a stationary pull-tab gaming client device (not shown). The Game Session ends when the player returns the mobile gaming client device 108 to the bar or the casino. During a Game Session, player 104 engages with the gaming client device 108 and requests at least one electronic pull-tab gaming ticket from the wagering system 102.

The Game Session includes system-driven “Game Events” and player-driven “Game Actions.” A system-driven Game Event is a system 102 initiated occurrence that may occur independent of or in response to a player-driven Game Action. Some illustrative system-driven Game Events include generation of a virtual pull-tab deck, receipt of a virtual pull-tab ticket request, delivery of a requested virtual pull-tab ticket, redemption of a virtual pull-tab ticket value, and auto-closing a virtual pull-tab deck.

A player-driven “Game Action” is a player 104 initiated action that may occur before, during, and/or after a Game Event. Some illustrative player-driven Game Actions include receipt of a mobile pull-tab gaming client device, sitting at a stationary pull-tab gaming client device, selection of a game title from gaming client device 108, selection of a particular pull-tab deck (or denomination) as some games may have more than a single deck available per wager amount, e.g., decks may vary in volatility and prize distribution, selection of a wager amount, selection of a number of virtual pull-tab tickets for purchase, purchase of the selected number of virtual pull-tab tickets, selection of a virtual pull-tab ticket to play, play a virtual pull-tab ticket, and cashing out.

There are also game device Executables that are operations performed by the gaming client device 108, which may be dependent on player-driven Game Actions, system-driven Game Events, game play operations performed on the gaming device, or executing various game related software operations. Illustrative game device Executables include downloading an electronic pull-tab game from an App Store, e.g., Apple App Store, executing the operations of the electronic pull tab game such as receiving player instruction, receiving a pre-play selection input, receiving a wager, displaying a requested virtual pull-tab ticket, displaying of a game animation associated with a virtual pull-tab ticket such as an animated roll-up, and displaying a virtual pull-tab ticket prize.

Although the illustrative embodiments described herein are presented include a game device Executable, it shall be appreciated by those of ordinary skill in the art that the mobile gaming device, e.g., iPad, may also be embodied using a browser-based mobile app that interprets instructions from a website. Thus, the game device Executable processes described herein may also be embodied as a combination of system-driven Game Event(s) and game device Executable (s). For example, a local browser may be operating on the iPad and then the browser accesses the website that performs pull-tab gaming operations described herein such as having the iPad display operations that are occurring on the server side, e.g., streaming game content and/or transmitting game play instructions to display game animations stored locally on the iPad. In operation, the illustrative web browser may be executing the HTML5 code or JavaScript and the browser is rendering the game play on the illustrative iPad.

Additionally, other game play operations may be controlled by a combination of game device Executable and system-driven Game Event. For example, the distribution of prizes may be dependent on the type of pull-tab deck request, which is processed as a system-driven Game Event, and the presentation of the prize may include a pre-play selection image, which is associated with the pre-play selection input and may be displayed on the gaming device 108 with a game device Executable. Thus, some game play operations may occur at the same time or at approximately the same time.

However, this limited time dependency is provided for illustrative purposes only and should not be considered as limiting the scope of this description. For example, there may be a serial dependency in game operations that can allow certain game operations to occur asynchronously-so a game device Executable may use a memory buffer to store an outcome, which would be displayed when the appropriate system-driven Game Event transmits a winning ticket. Other engineering design considerations may also affect the prize reveal process and game play features so that some operations are performed locally on the client gaming device 108 and/or performed on the server side 102.

Figure 1B:
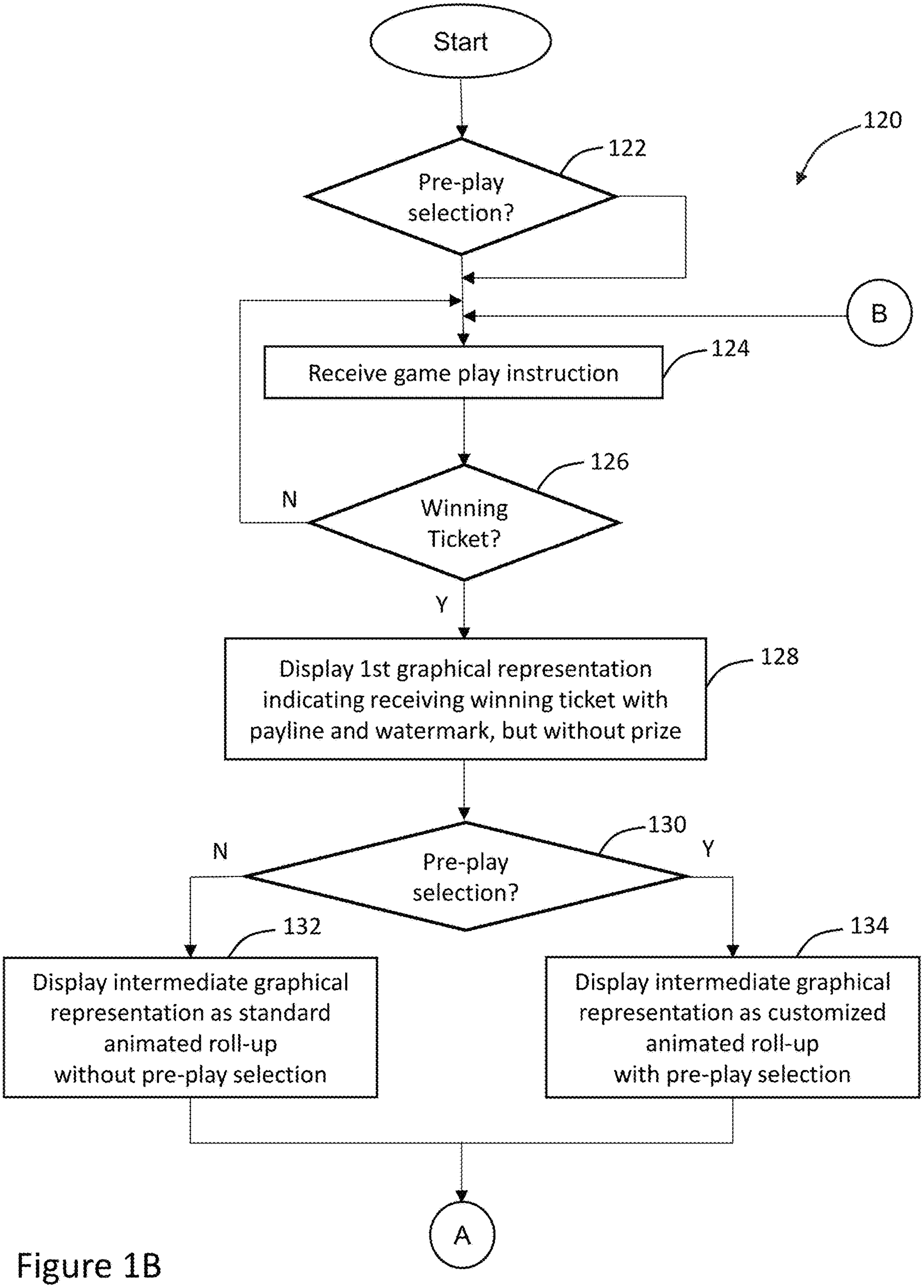

Referring to FIG. 1B there is shown a high-level flowchart that includes pre-play selection, watermarking, the first graphical representation, and the intermediate graphical representation. The method 120 is initiated at decision diamond 122 where the player-driven Game Action of selecting the pre-play selection feature may be engaged.

The pre-play selection feature refers to the gaming client device 108 receiving a pre-play selection instruction, which is a game device Executable that is associated with at least one pre-play selection image. The player 104 interaction with the pre-play selection feature of gaming client device is a player-driven Game Action that results in the gaming client device 108 receiving a pre-play selection instruction.

Figure 2A:
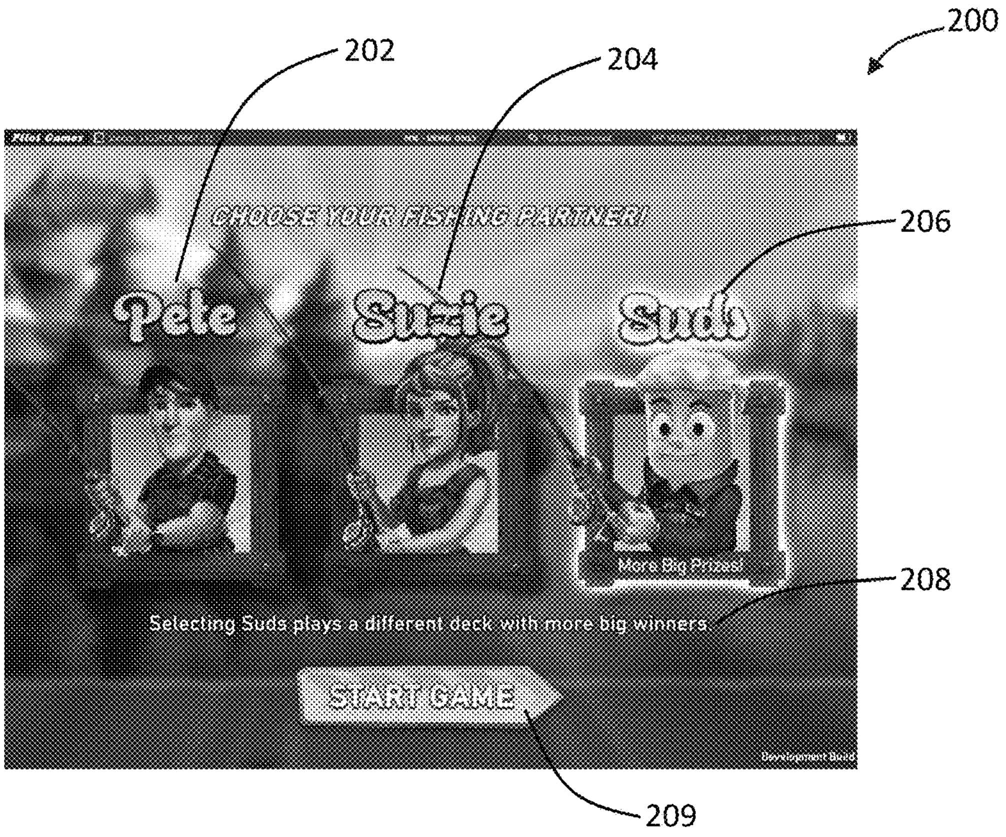
FIG. 2A through FIG. 2E shows Wild Walleye, which is an electronic pull-tab fishing game.

An illustrative game that includes a pre-play selection game feature is Wild Walleye developed by Pilot Games for Minnesota. Referring to FIG. 2A there is shown a first screenshot 200 for Wild Walleye, which is an electronic pull-tab fishing game. During an illustrative Game Session, a player is prompted to choose a fishing avatar from the group of Pete 202, Suzie 204, and Suds 206. In Wild Walleye, the player-drive Game Action of selecting a fishing avatar is the "pre-play selection." The pre-play selection customizes the prize reveal.

The pre-play selection may also occur after a wager is received, but before receiving a game play instruction 124. For example, the player may place a $1 wager and then the player is prompted to choose a fishing avatar from the group of Pete 202, Suzie 204, and Suds 206. The pre-play selection 122 shown in FIG. 1B is associated with a pre-play selection image, e.g., selecting a fishing avatar. The pre-play selection image may be further associated with a game device Executable and may be presented during various stages of Game Play as described in further detail in this Specification.

Referring to FIG. 1B, method 120 continues with the process step of receiving a game play instruction at block 124, which is a player-driven Game Action that causes one or more game device Executables. By way of example and not of limitation, an illustrative game play instruction includes receiving a bet amount or receiving a play game instruction. The play game instruction may be embodied by simply hitting a "play" button such as a "start game" arrow.

An illustrative game play instruction is shown in screenshot 200 of FIG. 2A, in which the "start game" arrow 209 is the illustrative game play instruction. This player-driven Game Action shows the pre-play selection operation being performed before the gaming client device 108 receives the game play instruction 124.

Method 120 of FIG. 1B then continues to decision diamond 126 where the gaming client device determines if a winning ticket has been received. Virtual electronic pull-tab tickets are generated and stored by wagering system 102. After having received the game play instruction, the gaming client device 108 requests an electronic pull-tab ticket from wagering system 102.

The process of having gaming client device 108 determines if the winning ticket was received is a game device Executable. However, the transmission of the electronic pull tab ticket is a system-driven Game Event that is caused by the player-driven Game Action of receiving an illustrative bet amount. Once the illustrative bet amount instruction is received by the gaming client device 108, the game device initiates a game device Executable that requests the electronic pull-tab ticket from the wagering system 102.

If a winning ticket has not been received by the gaming client device 108, the method proceeds to the next game play instruction 124, which for illustrative purposes includes receiving another player-driven Game Action of receiving a wager or play game instruction to continue the Game Session.

If a winning ticket is received by the gaming client device 108 at decision diamond 126, the method proceeds to block 128 where a first graphical representation having a payline symbol combination is displayed without displaying the final prize awarded. The first payline symbol combination informs the player that a winning ticket has been received by the gaming client device 108. In the illustrative embodiment, the first payline symbol combination includes a plurality of gaming symbols and a watermark. In some embodiments, the gaming symbols may be associated with the pre-play selection image. In other embodiments, the first graphical representation of block 128 includes payline symbols that are not associated with a pre-play selection and does not include a watermark or a final awarded prize. Thus, at a minimum, the first graphical representation only includes the payline symbol combination indicating that a non-zero ticket, e.g., winning ticket, has been received by the gaming client device 108.

The final awarded prize is not displayed at block 128. Instead, the final awarded prize is presented after the intermediate graphical representation is completed. The final awarded prize is shown at block 140 with the final graphical representation.

Regardless, the final awarded prize can be determined by the player at block 128 with a paytable that indicates the prize that is associated with the combination of the payline symbol(s) and the watermark. Thus, the final awarded prize can be determined at block 128 by having the player access a separate iPad that displays the relevant paytable or by pausing game play and looking up the watermark on the paytable. Additionally, the game may be configured to be paused so that the player may look up the final awarded prize in the paytable.

Figure 2B:
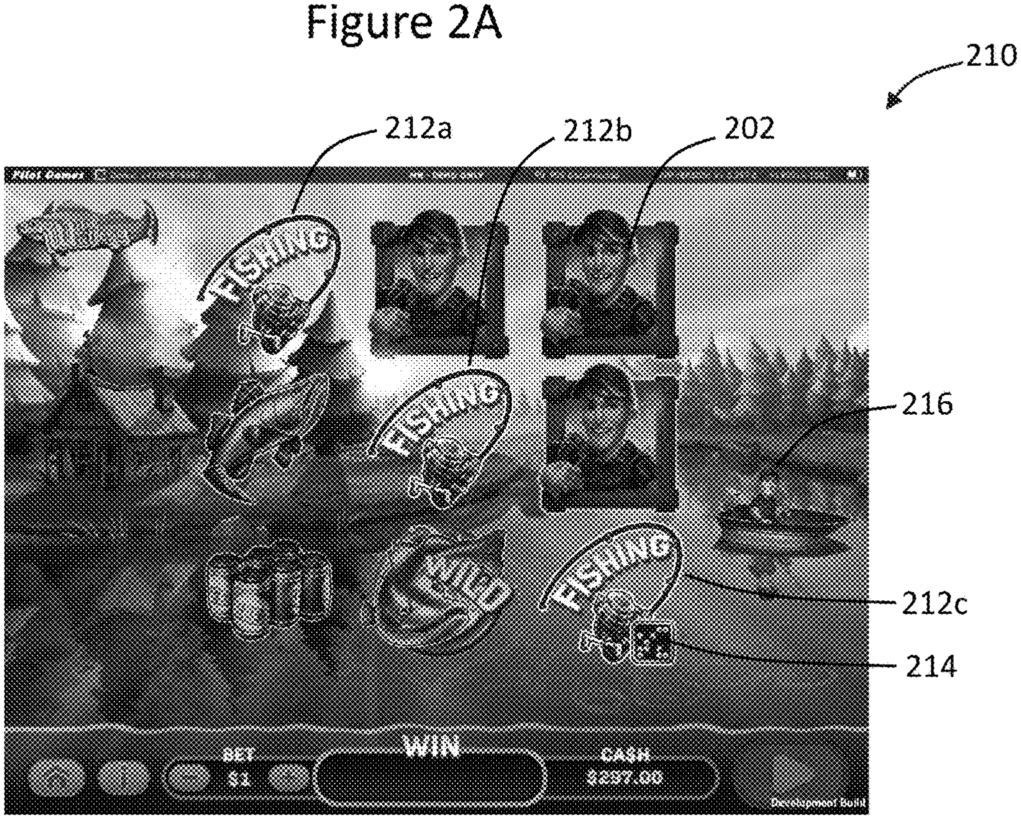

For example, an illustrative first payline symbol combination with a watermark is shown in screenshot 210 of FIG. 2B, in which gaming client device 108 receives a winning ticket. The screenshot 210 displays the first set of payline symbols 212*a*, 212*b*, and 212*c* that include a unique watermark 214, but without the final awarded prize. Screenshot 210 displays the first graphical representation combination with watermark indicating that a winning ticket has been received by the client gaming device.

Note, FIG. 2B shows the pre-play selection image of Pete 202 in three (3) grid cells in the top right-hand corner of the 3×3 payline symbol matrix. Further Pete 202 is shown in the background in fishing boat 216. Thus, the first payline symbol combination screenshot 210 has been customized to include avatar Pete 202.

In the illustrative embodiment, displaying of the payline symbol combination and the watermark is a game device Executable. In other embodiments, the displaying of the payline symbol combination and the watermark may be a system-driven Game Event and a game device Executable. For example, after the winning ticket is received by the gaming client device 108, a game device Executable requests avatar information from the wagering system 102, which triggers a system-driven Game Event that communicates avatar information from the wagering system 102 to the mobile gaming client 108.

After the first graphical representation combination with watermark is displayed at block 128, method 120 continues to decision diamond 130 where a determination is made by the illustrative gaming client device 108 if there was a pre-play selection 122 that would generate a customized animated roll-up. As previously stated, the intermediate graphical representation may also be referred to as an animated roll-up when one or more animations are included in the prize reveal. Recall, the intermediate graphical representation does not require an animation and so an image would suffice for other intermediate graphical representation embodiments.

For illustrative purposes only, the animated roll-up is performed as a game device Executable. Alternatively, the animated roll-up may also be performed by the combination of a game device Executable and a system-driven Game Event. For example, the gaming device Executable may not be able to determine the avatar from the pre-play selection, so another request may be made to the wagering system 102 for avatar information. A system-driven Game Event is then triggered, in which the wagering system 102 identifies the avatar and transmits this information to the gaming client device 108. The gaming client device can then display the customized animated roll-up.

The determination of customizing the animated roll-up is based on whether the pre-play selection feature is enabled as described above in decision diamond 122. Note, some pull-tab games may include pre-play selection and other pull-tab games may not include the pull-tab selection feature.

If an illustrative pull-tab game does not include the pre-play selection, the method proceeds to block 132 where the intermediate graphical representation is displayed as a standard animated roll-up without any pre-play selection. Thus, the standard animated roll-up does not include a pre-play selection and is initiated after the gaming client device 108 receives a winning ticket and after the first graphical representation having the payline symbols. In the illustrative embodiments presented herein, the standard animated roll-up is initiated after the gaming client device 108 displays a first graphical representation combination that includes a payline and a watermark but does not include the final award prize. The standard animated roll-up is completed at block 140 when the final graphical representation combination is presented with the payline symbols, watermark, and the final awarded prize. In other embodiments, the first graphical representation may not include a watermark or a pre-play selection, and the resulting intermediate graphical representation is a standard animated roll-up.

If pre-play selection feature is enabled at decision diamond 122, then the method proceeds to block 134 and a customized animated roll-up is displayed. More specifically, the intermediate graphical representation at block 134 presents a customized animated roll-up that includes one or more pre-play selection images. In the illustrative embodiments presented herein, the customized animated roll-up is initiated after the gaming client device 108 displays a first graphical representation combination that includes a payline and a watermark but does not include the final award prize. The customized animated roll-up is completed at block 140 when the final graphical representation combination is presented with the payline, watermark, and the final awarded prize.

In summary, the difference between the standard animated roll-up and the customized animated roll-up is that customized animated roll-up is affected by the pre-play selection feature. If the electronic pull-tab game does not include the pre-play selection feature, then a standard animated roll-up is displayed.

Figure 2C:
Figure 2D:
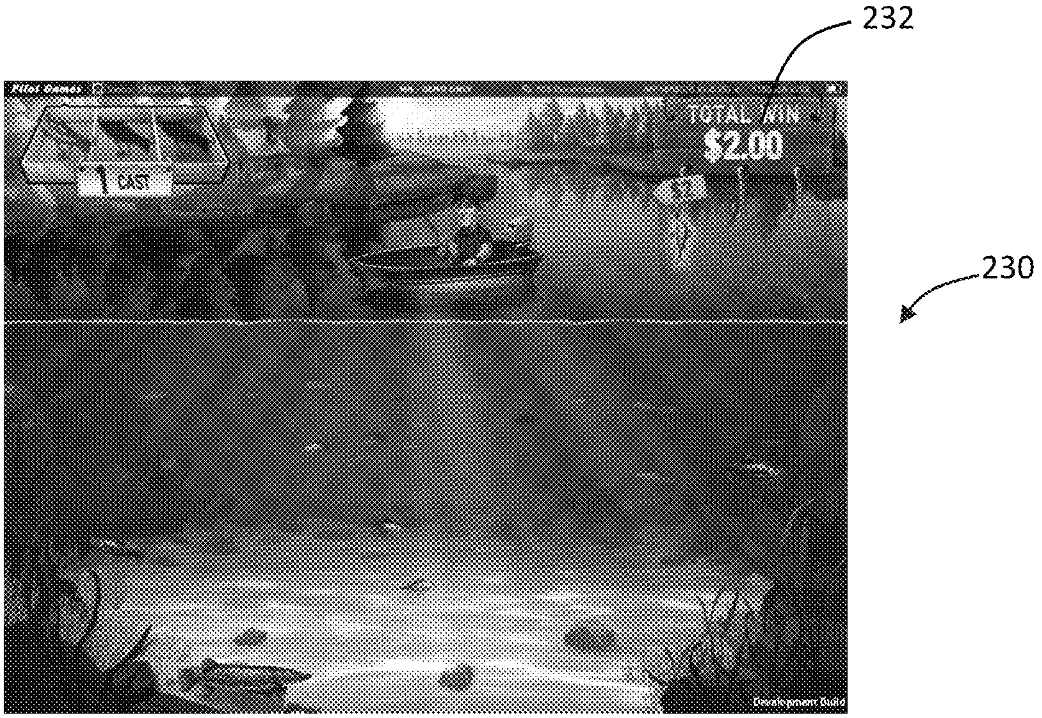
Figure 2E:

In the illustrative Wild Walleye game, customized animated roll-up screenshots are shown in FIG. 2C through FIG. 2E. FIG. 2C shows a screenshot 220 of the customized animated roll-up that includes Pete 202 fishing by casting a first lure 222. In FIG. 2D, a fish is caught by Pete with the lure 222 and a $2 prize 232 is awarded. The prize 232 is displayed on the top right-hand corner of screenshot 230. Screenshot 220 and screenshot 230 present the intermediate graphical representation as an animated roll-up with the pre-play selection image of Pete 202. The customized animated roll-up 134 described in FIG. 1B includes the pre-play selection image.

In FIG. 2E, the final graphical representation 240 is shown, which includes the payline combination, the watermark, and the final awarded prize 242, which is $2.

Figure 1C:
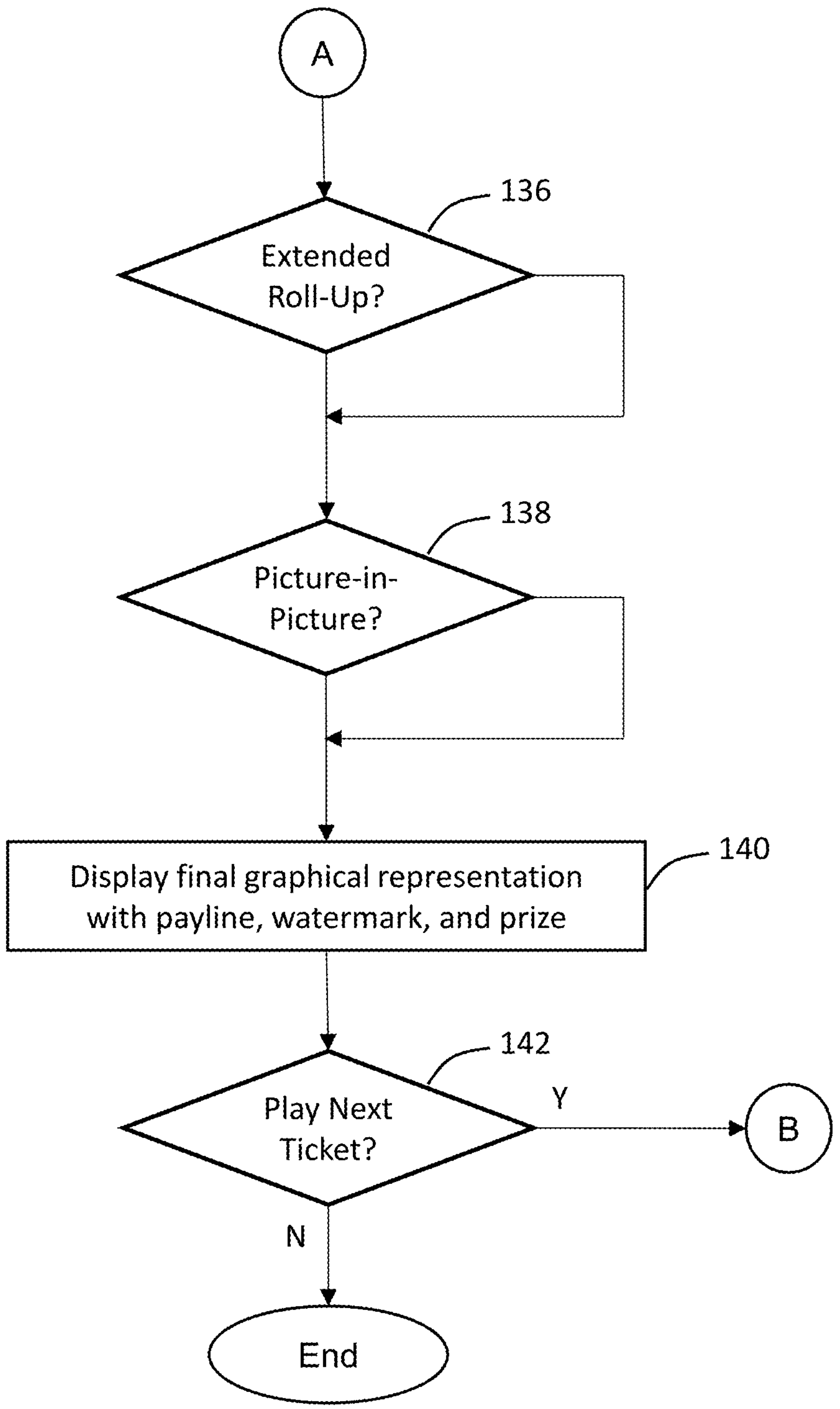

Returning to FIG. 1B and FIG. 1C, the method 120 then proceeds to circle A in FIG. 1C where the animated roll-up simulates awarding an additional prize that extends the prize reveal and increases the awarded prize. This "extended animated roll-up" is associated with the winning ticket and the intermediate graphical representation. The extended animated roll-up is described as decision diamond 136 because the simulated award appears random even though the extended animation is deliberate and planned because the winning ticket amount is already known by the gaming client device 108. Thus, the extended animated roll-up is an extension or expansion of the standard animated roll-up or customized animated roll-up with pre-play selection.

Recall, the final awarded prize during the extended animated roll-up matches the winning ticket prize received by the mobile gaming client device 108. The extended animated roll-up prize simulates randomly awarding additional prizes such as "lucky items" or as additional game elements that extend game play.

The method may also proceed to decision diamond 138 where the animated roll-up may also include a Picture-in-Picture (PiP) animation. The Picture in Picture (PiP) game play feature includes a secondary display, e.g., a large screen television, disposed in the background of the animated roll-up. During the prize reveal, a zoom animation magnifies the secondary display and presents additional prize information associated with the winning ticket received by the mobile gaming client. The final awarded prize presented by the PiP animation matches the winning ticket prize received by the mobile gaming client or increases the awarded prize. The PiP animation may act as an element of the intermediate graphical representation.

At block 140, the final graphical representation is displayed with the payline symbol combination and the illustrative watermark associated with the first graphical representation and the final awarded prize revealed in the animated roll-up. In an embodiment that does not include a watermark, the final graphical representation includes the payline symbol combination and the final awarded prize. Thus, the illustrative embodiments described herein shown the final graphical representation as being similar to the first graphical representation except the final graphical representation includes the final awarded prize that was revealed during the animated roll-up, i.e., intermediate graphical representation After the payline symbol combination, watermark, and the final awarded prize has been revealed in the final graphical representation, the player has the option of requesting a next ticket as reflected by decision diamond 142. If the player requests the next ticket, then the method returns to block 124 and awaits a player 104 game play instruction. Otherwise, player 104 proceeds to cash-out and game play ends.

Referring now to FIG. 2A there is shown a first screenshot 200 for Wild Walleye, which is an electronic pull-tab fishing game. During a game session, a player is prompted to choose a fishing partner from the group of Pete 202, Suzie 204, and Suds 206. As described above, the selection of a fishing partner is referred to as "pre-play selection" because the pre-play selection customizes the prize reveal.

Additionally, the screenshot 200 includes an instruction 208 that states "[s]electing Suds plays a different deck with more big winners." The screenshot instruction 208 relates to the pre-play selection allowing the player to select from a high volatility deck and a low volatility deck after having placed a wager. Thus, the pre-play selection may also affect the deck that is being played, which is an operation that would occur before receiving the game player instruction, but after receiving a wager.

Minnesota gaming law requires that the awarded prize must be presented before the roll-up. Consistent with Minnesota gaming law, the "animated roll-up" described herein is triggered after the first payline symbol combination indicates a winning ticket has been received by the gaming client device 108. The animated roll-up is part of the intermediate graphical representation that is displayed after the first payline symbol combination is presented.

The final awarded prize can be presented separately at the end of intermediate graphical representation that does not include the payline symbol combination and in the final graphical representation that includes the payline symbol combination. In some embodiments, the final awarded prize may only be presented with the payline symbol combination after the intermediate graphical representation. Note, the intermediate graphical representation does not have to reveal the final awarded prize.

Generally, an electronic pull-tab game relies on a central determination system to generate random results. Central determination in a pull-tab game refers to the method by which the outcome of the game is pre-determined. In traditional paper pull-tab games, the outcome is typically predetermined and printed on the physical tickets. However, in electronic pull-tab games, the outcome is determined centrally by a random number generator (RNG) or a central computer system.

By using central determination, electronic pull-tab games can offer a wide range of outcomes, possibilities, and presentations, which creates excitement and suspense for players. Additionally, central determination allows for more flexibility in game design and the ability to offer progressive jackpots or bonus features that can be triggered based on the central determination system's results.

In operation, when a player purchases a virtual pull-tab ticket and reveals the symbols or numbers on the screen, the central determination system uses the RNG to select the specific ticket. Note, the outcome is already embedded in the ticket and the RNG is used to shuffle the order of the tickets. The RNG is a computer algorithm that generates random numbers or symbols, ensuring fairness and unpredictability in the game. The RNG operates independently of the player's actions and cannot be influenced or manipulated. The central determination system ensures that each ticket has an equal chance of winning or losing, providing a fair and transparent gaming experience.

The watermarking feature, the intermediate graphical representation having animated roll-up feature, the pre-play selection feature, the extended animated roll-up feature, the Picture-in-Picture (PiP) feature described herein can be applied to common types of electronic pull-tab games including, but not limited to, classic pull-tabs, multi-line pull-tabs, progressive pull-tabs, bonus feature pull-tabs, themed pull-tabs, and instant win pull-tabs.

Classic pull-tabs resemble traditional paper pull-tabs with simple game play and straightforward rules. During classic pull-tab game play, each player reveals symbols or numbers to determine their awarded prizes with classic electronic pull-tabs.

Multi-line pull-tabs feature multiple lines or rows of symbols, numbers, or scatters offering more chances to win. The exact paytable and combinations are revealed to the player on a paytable or flare. During multi-line pull-tab game play, players are awarded a prize by matching symbols or numbers horizontally, vertically, or diagonally.

Progressive pull-tabs operate by having a portion of each wager contribute to a progressive jackpot. During progressive pull-tab game play, the jackpot continues to grow until a player hits a prize combination that can result in substantial prize payouts.

Bonus feature pull-tab games include additional bonus features or mini-games that can be triggered by specific symbol combinations. During bonus feature pull-tab game play, bonus rounds may offer extra prizes or multipliers to enhance the gameplay experience.

Themed pull-tab games incorporate various themes, such as sports, fantasy, animals, or popular movies. The symbols and graphics in a themed pull-tab game are designed to match the theme and provide a more immersive and engaging gaming experience.

Themed pull-tab games incorporate various themes, such as sports, fantasy, animals, or popular movies. The symbols and graphics in a themed pull-tab game are designed to match the theme and provide a more immersive and engaging gaming experience.

Instant win pull-tab games offer immediate results, with players instantly knowing if they have won or lost. Instant win pull-tab games are designed for quick and easy game play and providing instant gratification.

Figure 3:
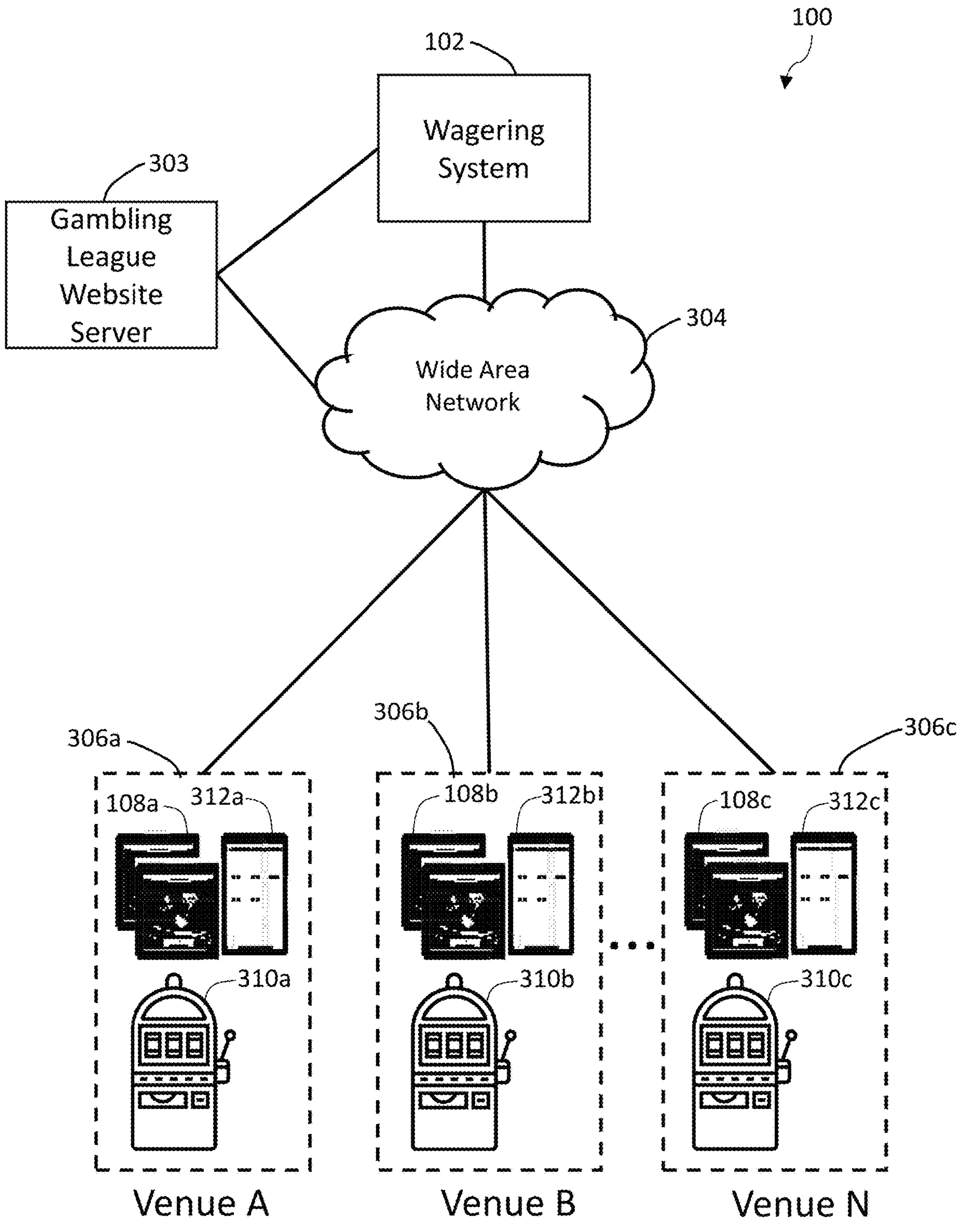
FIG. 3 shows an illustrative electronic pull-tab gaming system 100.

Additional details regarding the communications between the gaming client device 108 and the wagering system 102 are provided in FIG. 3 through FIG. 6. Referring to FIG. 3, there is shown an illustrative electronic pull-tab gaming system 100. Electronic pull-tab gaming system 100 includes a wagering system 102 that can manage and operate the electronic pull-tab gaming systems and methods. The wagering system 102 is communicatively coupled to a Wide Area Network 304, e.g., the Internet. Additionally, the wagering system 102 is communicatively coupled to a plurality of gaming venues, namely, illustrative gaming Venue A 306*a*, Venue B 306*b* and other such gaming venues as represented by Venue N 306*c*.

In the illustrative embodiment, each gaming venue may be associated with a sponsoring organization, e.g., a charity and a distributor. The types of venues, sponsoring organizations, and other such business entities vary according to jurisdictional statutes and state or local regulation.

In the illustrative embodiment, each of the gaming venues 306*a*, 306*b* and 306*c* may include a plurality of authorized mobile devices 108*a*, 108*b* and 108*c*, respectively. Additionally, each of the gaming venues 306*a*, 306*b* and 306*c* may include a plurality of non-mobile or stationary gaming devices 310*a*, 310*b*, and 310*c*, respectively.

The authorized mobile devices 108 and non-mobile gaming devices 310 may also be referred to as "gaming client devices," "pull-tab gaming client device," "client device," or "wireless client device" depending on the context. Furthermore, each of the gaming venues includes at least one Point-of-Sale (POS) device 312*a*, 312*b*, and 312*c*. The illustrative authorized mobile devices 108 and the POS devices 312 are client devices configured to communicate with each other and the wagering system 102.

In operation, the authorized mobile devices 108, non-mobile gaming devices 310, and POS devices 312 are registered with the wagering system 102, which includes a database (not shown) that associates the authorized mobile devices 108, non-mobile gaming devices 110, and POS devices 312 with a designated gaming venue 106. The authorized mobile devices 108 and POS devices 312 are not allowed to interact with the electronic pull-tab gaming system 100 when such client devices are not located at the designated gaming venue 306.

The illustrative authorized mobile devices 108 operate as wireless client devices that are communicatively coupled to the electronic pull-tab gaming system 100. Additionally, the electronic pull-tab gaming system 100 may be communicatively coupled to authorized non-mobile clients such as stationary gaming devices 310. Furthermore, other client devices such as non-mobile clients may be disposed in the gaming venues and these non-mobile clients may also be communicatively coupled to the electronic pull-tab gaming system 100.

The authorized non-mobile client devices 310 include, but are not limited to, wired devices such as stationary gaming machines, slot machines, PCs, stationary monitors, Internet appliances, Internet of Things (IoT) devices and other such non-mobile devices with hardwire connections or wireless connections to the Wide Area Network 304. The non-mobile client devices may be configured to participate in the games presented herein including, but not limited to, the tournament games described hereinafter.

Operationally, the illustrative pull-tab gaming client devices must comply with the system-centric gaming requirements, in which all gaming and accounting activity are controlled by the wagering system 102. Also, the wagering system 102 has the communications infrastructure, directly or by proxy, to interact with the pull-tab gaming client devices 108 and 310 described herein.

The illustrative electronic pull-tab gaming system 100 includes a plurality of server-side applications that are configured to provide high-availability and redundancy and process various instructions that are received from other servers, virtual machines, and client devices. The gaming system 100 also generates outputs related to game play. The illustrative electronic pull-tab gaming system 100 includes three different types of network communications. Firstly, there are network communications between the server-side components. Secondly, there are network communications between the server-side components such as the wagering system 102 and the illustrative remote gaming venues **306*a*, 306*b* and 306*c*. The electronic pull-tab gaming system 100 may also interface with an illustrative gambling league website server 303. Thirdly, there are separate network communications within the gaming venues 306*a*, 306*b*, and 306*c*. This illustrative system 100** may be applicable in a jurisdiction in Minnesota.

In an alternative offline embodiment, a local site server disposed at a particular gaming location includes a cache of tickets that may be comingled so that more than one deck for a wager and theme is in play at any given time and the system makes a random or alternating purchase from the different active decks matching the player's selection. This alternative offline embodiment may be applicable in North Dakota. Other system embodiments that comply with local regulations would readily suggest themselves to those of ordinary skill in the art having the benefit of this description and the drawings.

With respect to network communications between the server-side components which operate as a single network, the plurality of server-side components communicate with one another using service requests. By way of example and not of limitation, the illustrative internal server components have two internet protocol addresses, namely, a private IP address used to maintain the server network and ensuring secure server-to-server communication, and a public IP address that is bound to the Internet and that provides access to server services through high security communications such as Hypertext Transfer Protocol Secure (HTTPS). The internal server components may use their private IP addresses for server-to-server communications so that these services are not exposed to the Internet.

By way of example and not of limitation, each illustrative server is configured with an SSL certificate that supports HTTPS calls. The illustrative server is configured to forward some requests it receives through HTTPS to a local port, and the requests that are allowed to pass are only those available to authorized gaming devices and POS devices.

By way of example and not of limitation, the server-side components and/or servers are implemented using the Linux operating system using Restful programming techniques with Java as the programming language and having Jersey RS support and the database structures are contained in an illustrative MySQL database.

Communication between the server-side components, namely, the wagering system 102, and the remote gaming client devices is performed over a wide-area network 304, and these network communications are performed using secure SSL communications over the Internet.

Figure 4:
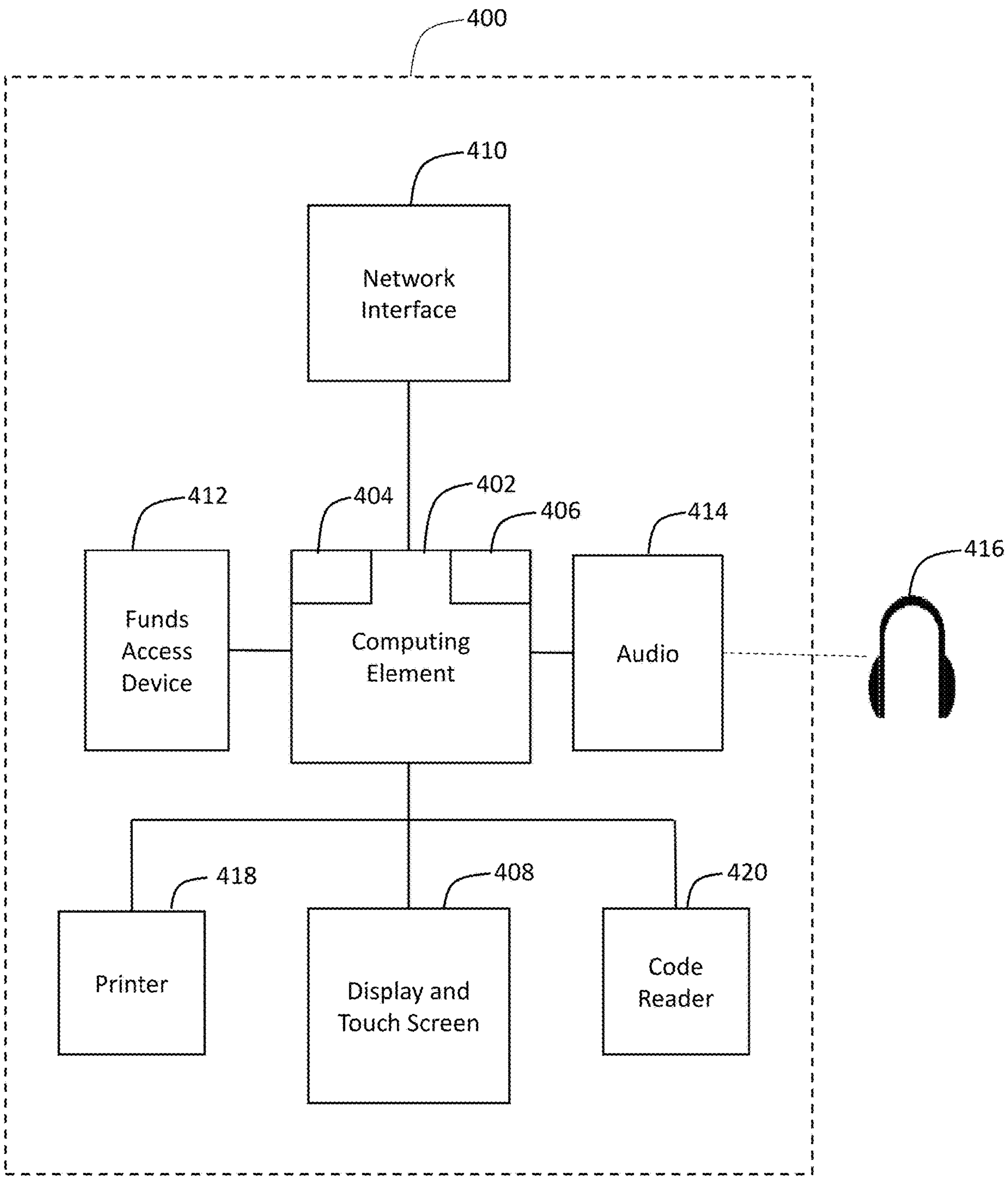
FIG. 4 shows an illustrative player interface unit, which may also be referred to as a pull-tab gaming client device with POS functionality.

For purposes of this patent, the authorized mobile gaming devices **108*a*, 108*b* and 108*c* are also referred to as a "player interface unit." An illustrative authorized mobile device is presented in FIG. 4. Operationally, each authorized mobile device 108** in the illustrative embodiments are each associated with a player account.

By way of example and not of limitation, the player account is described as a short-term, anonymous entity tied to the client device being used by the player, and which expires when the fund balance drops to zero. However, it is possible in other embodiments to have player accounts which may exist for longer time periods and be tied to a player regardless of a zero balance.

Additionally, it should be noted that while the illustrative embodiments presented herein generally describe financial transactions such as adding funds or cashing out at the POS device 312, in different regulatory environments or with different technology, such player accounts can have financial transactions originating at the player device or any other client device that may be configured to support POS transactions. Also, financial transactions may be supported at a system level with a server component or server module that provides web portal functions for financial transactions. Thus, the financial transactions may be performed by the client device, a server component, a server module, or any combination thereof. Depending on regulatory issues and available technology, financial transactions may be based on cash, credit cards, debit cards, digital currency, or other mediums of finance.

Referring to FIG. 4, there is shown an illustrative player interface unit 400, which may also be referred to as a pull-tab gaming client device with POS functionality. The illustrative player interface unit 400 may include the authorized mobile device 108, the point-of-sale device 312, and any combination thereof. Thus, the distinction between the gaming client device in FIG. 3 and the player interface unit 400 is that the player interface unit 400 may also operate as POS device and as a gaming client device.

For example, the illustrative player interface unit 400 may be one of the plurality of authorized mobile devices 108 that is associated with each venue. The illustrative player interface unit 400 includes a central computing element 402 with a processor 404 and memory storage 406. One or more games may be pre-installed on the player interface unit 400 before the player interface units are deployed in a gaming venue or other such production environment. Alternatively, the illustrative game title files may be stored in a remote server, e.g., an "App" store, and the player interface unit 400 may be configured to download the game title file, run the game title file, and enable the user to interact with the corresponding game title.

The player interface unit 400 also includes a touch screen color display 408 and a network interface component 410, which provides network access to a local area network, a wide area network or any combination thereof. By way of example and not of limitation the network interface component supports a wireless local area network such as a Wi-Fi network, which is based on IEEE 802.11 standards. Additionally, the player interface unit 400 may communicate with the wide area network 304 via the illustrative Wi-Fi network. The communication between the player interface unit 400 and the mobile wagering system 102 may be performed using the illustrative HTTPS protocol or other such secure networking protocol that allows game session inputs, commands, and outputs to be communicated securely across the Wide Area Network.

In an illustrative embodiment, the player interface unit 400 may be a tablet computing device running iOS or Android operating systems. The illustrative player interface unit may also include a Funds Access Device module 412 that may be configured to have a custom locked profile to evade security-bypassing attempts. The Funds Access Devices 412 may also provide alternative methods for starting play sessions or adding funds to existing sessions. By way of example and not of limitation, the Funds Access Device module 412 may include currency readers and debit/credit card readers such as a magnetic stripe reader, a smart-card reader, an infra-red reader, a Near-Field-Communications reader and other such financial transaction readers.

The player interface unit 400 may also include an audio system component 414 that enhances the game-playing experience for the players. The audio system component 414 may also include a standard audio jack so that a player can use wired or wireless headphones 416 to improve the game audio environment without disturbing others.

In one illustrative embodiment, the player interface unit 400 may include a printer 418 and a code reader 420. By way of example and not of limitation, the printer 418 generates vouchers. The illustrative code reader 420 may be embodied as a bar-code reader that is configured to read vouchers generated by the printer.

By way of example and not of limitation, the player interface unit 400 may be configured to include a "HELP" button in the game client device that also dispatches a signal to the POS to notify the operator that the player is requesting assistance. The player interface unit 400 may also be configured to include text-to-speech functionality to aid a visually impaired player. Additionally, the player interface unit 400 may include a gaming application that downloads files, decompresses the downloaded files if they have been compressed, and caches all assets inside the player interface unit 400. The player interface unit 400 supports dynamic updates without the need to update the game client itself.

Referring now to FIG. 3 and FIG. 4, the wagering system 102 is communicatively coupled to a plurality of authorized non-mobile devices 310 and mobile devices 108 such as illustrative player interface unit 400 presented in FIG. 4. In one illustrative embodiment, the wagering system 102 receives a wager input for a game session from the illustrative player interface unit 400. In another illustrative embodiment, the wagering system 102 receives the wager input for a game session from a plurality of authorized non-mobile devices 310 and mobile devices 108, which may be disposed at one or more venues as presented in FIG. 3.

The illustrative player interface unit 400 presents a user interface on touch screen 408 that shows a plurality of game content associated with different types of game sessions. In the illustrative embodiment, the player interface unit 400 may also accept player inputs that are associated with a game session. The game session may perform various operations as described in further detail below.

Figure 5:
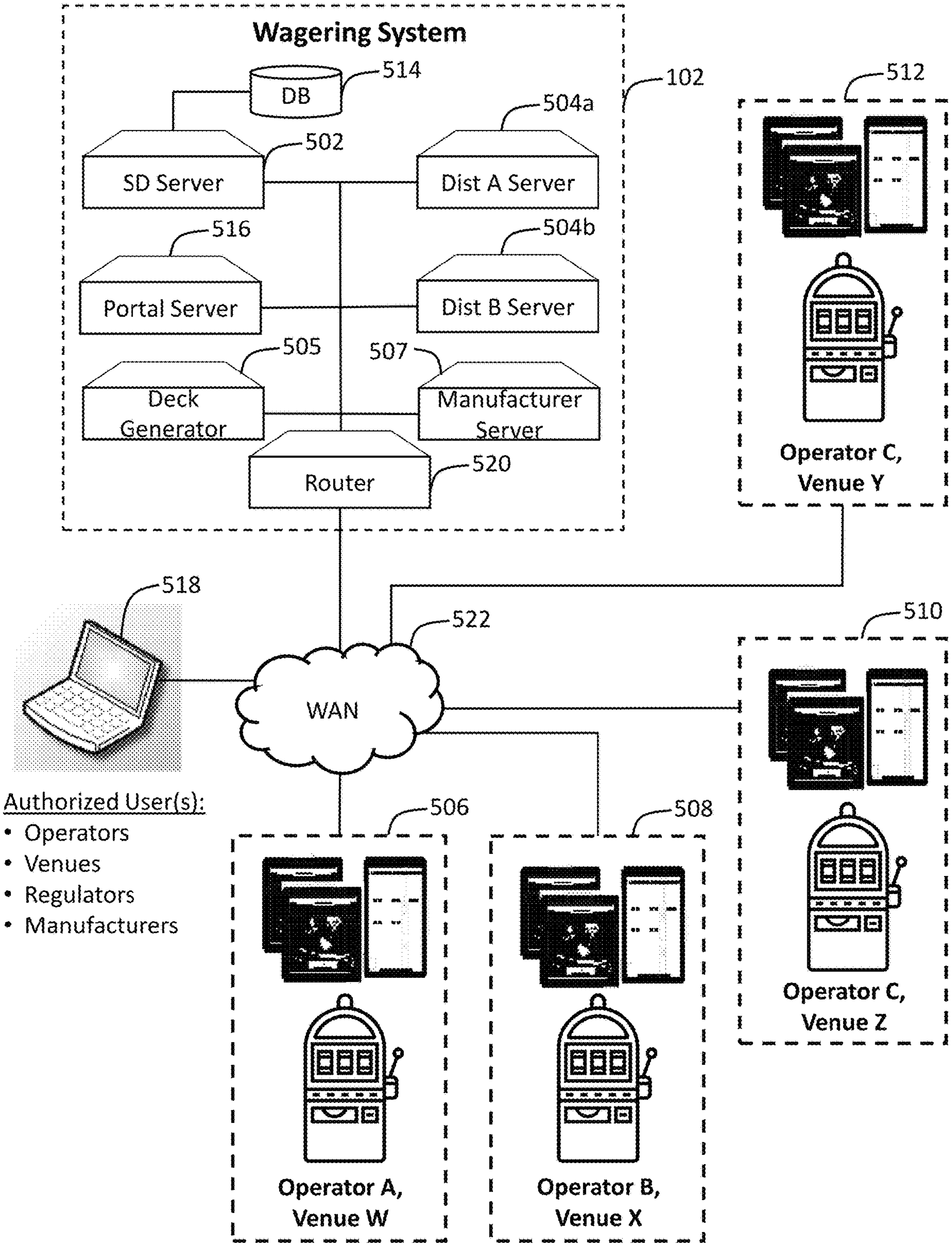
FIG. 5 shows further details of the wagering system communicatively coupled to different venues.

Referring to FIG. 5, there is shown further detail for the wagering system 102 communicatively coupled to different venues. In an illustrative embodiment, the wagering system 102 functionality is distributed on server-side components such as the multiple servers shown in FIG. 5, including those that provide database 514 functionality. The illustrative wagering system 102 maintains authority over game operations controlled by the electronic pull-tab gaming system 100 and includes a site director server 502 that operates as a coordinating entity for system operation, handles graphics, directs configuration of gaming devices and downloads of applications thereto. The wagering system 102 also includes a distributor server 504 that is communicatively coupled to the gaming devices at each venue 506, 508, 510, and 512 through the router 520.

In the illustrative embodiment presented, first distributor server 504*a* and second distributor server 504*b* are communicatively coupled to the site director server 502. Each of the illustrative distributor servers 504 are configured to manage and control the game operations and cashier operations performed at a set of gaming venues that are associated with a distributor. The distributor is responsible for the sales and support of a multiplicity of venues.

For example, gaming venues 506 and 508 are configured to communicate with the first distributor server 504*a*, which manages and controls the game operations at gaming venues 506 and 508. A second set of gaming venues 510 and 512 are configured to communicate with second distributor server 504*b*, which manages and controls the game operations at gaming venues 510 and 512. Thus, multiple gaming venues may require additional distributor servers.

A variety of tasks may be performed by the site director server 502. For example, one of the tasks performed by the site director server 502 includes providing a central routing operation for each of the authorized gaming devices 108 and 310 so that each authorized gaming device 108 and 310 is routed to the proper distributor server 504*a* or 504*b*, game server (not shown), and manufacturer server 507 upon activation of each authorized gaming device. By way of example and not of limitation, the first request generated by a player interface unit 400 may direct the player interface unit 400 to an illustrative distributor of the player interface unit 400.

For another example, one of the tasks performed by the site director server 502 includes performance of initial authentication through https secure socket layers of gaming device unique identifiers, such as MAC IDs on boot up of a respective gaming device. In an illustrative embodiment, the site director 502 authenticates a gaming device's unique identifier by comparing a received unique identifier to a list of authorized unique identifiers stored in an authentication database (not shown).

For a further example, one of the tasks performed by the site director server 502 includes communication of a manufacturer server 507 URL and a distributor server 504 URL.

Additionally, the site director server 502 may be configured to provide a central routing operation for cashier authentication. For example, a cashier device may be authenticated by the appropriate distributor server 504, which may then forward an authentication to an illustrative mobile device distributor (not shown). Decks are generated by the deck generator 505. The site director 502 has the capability to tell which systems authorized devices should be communicating with and other configuration details.

In the illustrative embodiment presented herein there are three types of electronic pull-tab tickets, namely, zero-prize electronic pull-tab tickets, e.g., losing tickets, and non-zero electronic pull-tab tickets, e.g., winning pull-tab tickets. The zero-prize electronic pull-tab tickets do not award a prize and are considered losing tickets. For purposes of this patent, the terms zero-prize tickets and losing tickets are using interchangeably.

The non-zero electronic pull-tab tickets, e.g., winning tickets, include the final awarded prize. In certain embodiments, the non-zero electronic pull-tab tickets also include information regarding watermarks. In other embodiments, the non-zero electronic pull-tab tickets include information about the intermediate graphical representation associated with the animated roll-up. In another embodiment, the non-zero electronic pull-tab tickets include information about the payline symbol representations. For purposes of this patent the terms non-zero electronic pull-tab and winning ticket are used interchangeably.

Note, the systems and methods described may also operate with traditional electronic pull-tab tickets that are associated with a traditional roll-up, which displays the plurality of payline symbols and the final awarded prize immediately after the winning traditional electronic pull-tab ticket is received by the gaming client device 108. An illustrative traditional roll-up is shown in FIG. 19B and FIG. 20B. A traditional roll-up does not include a first graphical representation, an intermediate graphical representation, a standard animated roll-up, a customized animated roll-up with pre-play selection, an extended roll-up, a Picture-in-Picture feature, or any combination thereof.

In the illustrative embodiment described herein, the winning tickets award a non-zero final prize with either a standard animated roll-up or a customized animated roll-up. The standard animated roll-up and customized animated roll-up are more particular embodiments of the intermediate graphical representation that follows the first graphical representation that includes the payline symbols. As previously stated, the final awarded prize was predetermined and based on the winning ticket that was received by the gaming client device 108.

There may be some embodiments where a watermarked winning pull-tab ticket awards a plurality of non-zero value prize such as a final award prize and a progressive prize. However, in the various embodiments presented herein, the winning tickets only include a final awarded prize. In a certain embodiment, the final awarded prize is revealed when the animated roll-up is complete, and the final awarded prize is overlaid on the payline symbols and the watermarked payline symbol as shown above in FIG. 2E.

In an illustrative embodiment, the mobile wagering system 102 includes a separate deck generator server 505 that operates as the central authority for generation of finite pool decks of predetermined electronic pull-tab results. In these embodiments, the deck generator server 505 is communicatively coupled to one or more of the distributor servers 504*a* and 504*b*, as well as to the site director server 502, and the manufacturer server 507. The deck generator server 505 both randomizes the decks of electronic pull-tabs and distributes the decks to the manufacturer server 507. The manufacturer server 507 then virtually assigns each deck to one of the site locations 506, 508, 510, and 512 and distributes randomized tickets from the decks to gaming devices in those site locations.

In another illustrative embodiment, a central server (not shown) may generate one or more finite decks, and a local server (not shown) may receive the receive the one or more finite decks. The local server (not shown) may then be accessed by the gaming clients. Periodically, the local server is synchronized with the central server.

Electronic pull-tab gaming systems and methods communicate winning and losing electronic pull-tab tickets from a server to a gaming client device. The losing electronic pull-tab tickets may also be referred to interchangeably as the zero prize electronic pull-tab tickets. Additionally, the winning electronic pull-tab tickets may also be referred to interchangeably as the non-zero prize electronic pull-tab tickets. In the illustrative embodiments presented herein the electronic pull-tab tickets may include a watermark with the payline symbol combination or may only include a payline symbol combination before initiating the intermediate graphical representation, e.g., animated roll-up.

For the purposes of this patent, a watermark may be associated with at least one payline symbol. The watermark described herein provides an identifying image or pattern that is proximate to a payline symbol, or the watermark is integrated into the payline symbol. Thus, the watermark may be in close proximity to the payline symbol, and in certain embodiments the watermark may be embedded in the payline symbol. The watermark is also associated with a prize that is identified in a paytable. In the illustrative embodiments presented herein the watermark presented on the gaming client device 108 is encoded with visible patterns that, in combination with the payline symbols, identify a prize in a paytable. Illustrative paytables with watermarks are described in further detail below.

The watermarks described herein are not readily identifiable by the player. The uniqueness of the watermark does not allow a player to recall a particular pattern. Since the watermark is not readily identifiable to the player, the animated roll-up provides an animation that increases the anticipation when the final awarded prize is revealed. For example, the watermark may include an enhancement to a standard symbol such that at a quick glance by a player displays no perceivable difference, however, under closer inspection the differences between symbols without watermarks and symbols with watermarks and the difference between individual watermarks are observable.

A payline is a lineup of specific symbols that indicates a prize is to be awarded. Paylines may line up in a horizontal, vertical, diagonal, zig zag or any other pattern that is associated with a winning ticket. The traditional payline for electronic pull-tab games includes the payline symbols and the awarded prize as shown in FIG. 19B and FIG. 20B and the related text.

An illustrative electronic pull-tab ticket that includes a watermark identifier is described below. The watermark identifier provides display information associated with presenting the watermark and payline symbols on the gaming client device. The watermark identifier may be embedded in a "big ticket" pull-tab ticket. Also, the watermark identifier This illustrative electronic pull-tab ticket may also be referred to as a "big ticket" because it includes all the information needed to present the game on the gaming client.

The illustrative big ticket embodiment may include a watermark identifier that instructs that gaming client device 108 to present a watermark on the gaming client device 108. Additionally, the illustrative big ticket embodiment includes all the information that is needed for the gaming client device 108 to display the payline symbols and the watermark associated with at least one of the payline symbols. Furthermore, the watermark may also be displayed as part of the final graphical representation that includes the final awarded prize, the payline symbols, and the watermark.

An illustrative big electronic pull-tab ticket having a watermark identifier is presented below as nested JSON code.

{"prize_index":0,
"ticket":{"id":0, "sample_id":0, "total_prize":49800},
"play":{"prizes":[{"kind":"left", "line":1, "paytable":0,
"prize":49800, "symbols":[[false,true,false], [false, true,false],[false,true,false]]}],
"symbols":["f1","f1","p3"],["p3","f1","p2"],["p1",
"f1_2","p6"]]}}

The nested JSON code is interpreted below in a tabular format.

| | | | |
|---|---|---|---|
| prize index | index of the prize prior to deck shuffling | | |
| ticket | information of the particular ticket | | |
| | id | unique identifier for this ticket | |
| | sample_id | unique identifier for this sample | |
| | total prize | total prize in pennies | |
| play | information about how to display a result | | |
| | prizes | information about each prize in this ticket (in this case just 1) | |
| | | kind | could be line, scatter, left to right, right to left, top to bottom, etc. |
| | | line | which pay line is responsible for this win |
| | | paytable | indicator of which paytable this win came from |
| | | prize | prize in pennies for this win |
| | | symbols | list of which symbols contributed to this win. True indicating a paying symbol and false indicating a non-paying symbol |
| | symbols | list of symbols to show to the player. The watermark identifier is encoded in this list. For example, the watermarked identifier includes a symbol reference followed by an '_' followed by the watermark identifier. In the ticket above, the third occurrence of the 'f' symbol is marked with a "2" watermark identifier. | |

In the illustrative "big ticket" example provided above, the watermarked symbol is "f1_2". The watermark symbol includes the payline symbol 'f1' and the watermark identifier "2", and the underscore "_" associated the payline symbol with the watermark identifier.

In the illustrative embodiment, the watermark ID of '2' refers to an index associated with a watermark table stored on the gaming client device 108. Alternatively, the watermark table may be stored on one of the server components described above or a separate watermark server component. The watermark index may be embodied as a look-up table stored on the gaming client device that indicates the type of watermark and placement of the watermark for the first payline symbol combination associated with the first graphical representation.

The watermark identifier may also be fed into an algorithm to generate the watermark. The algorithm may be local, e.g., on the gaming client device, or the algorithm may reside in the cloud, e.g., one of the server components described above. The algorithm may include several components being combined to seed an RNG with a random yet predictable outcome that generates a watermark on the fly. For example, the watermark identifier can be used to seed the RNG, then random spots may be selected to generate the watermark for a 5×5 grid. Since the watermark identifier seeds the same RNG, then the same outcome is generated. Another illustrative algorithm that generates a watermark feeds the watermark identifier, paytable identifier, and wager are fed into an algorithm, which generates the watermark. The addition of these different identifiers creates different watermark outcomes that can be associated with game titles. Thus, a watermark identifier of "2" would generate a Watermark A for Wild Walleye and a different Watermark B for House on Haunted Hill. Thus, the same watermark identifier can product different watermarks for different games.

By way of example and not of limitation, the ID number 2 may be associated with an index having an array of watermarks with each watermark having a different unique identifier. In another embodiment, the ID number 2 may be an index of a set of known grid watermarks, in which there may be a finite number of predetermined 5×5 grid patterns of watermarks and this index represents a reference to one of the watermarks.

In yet another embodiment, the ID number 2 may be an encoded number referring to which spots on the watermark grid are highlighted. For example, the number after the underscore may be an unsigned integer where each bit of the unsigned integer represents the status of one of the spaces on the grid. In an illustrative 5×5 card, this can be represented by 25 bits of 0's and 1's and if a spot on the grid is a 1, that spot is highlighted in the water mark. In this example of the 'f' symbol followed by a '2', the bit representation of the number 2 may indicate that this watermark is a 5×5 grid with the second spot highlighted as "on" and the rest are "off."

In a still further embodiment, additional fields may be present in the electronic pull-tab ticket that provide further instructions about how to display the watermark and reveal the game outcome such as associating the watermark with a game symbol, instead of a game prize. For example, the watermark may be associated with a game title so that a different watermark is presented for each different prize, and the watermark is presented at the end of the standard animated roll-up or customized animated roll-up.

The ID number 2 may be associated with a particular watermark and with a particular animated roll-up. Further the ID number 2 may be associated with randomly selecting a particular animated roll-up. Thus, the watermark ID of 2 may be limited to the first graphical representation that includes the payline symbol combination, and the watermark ID may also affect the intermediate graphical representation having the animated roll-up.

The big pull-tab ticket embodiment may also include information about progressives associated with a progressive game server (not shown). Further the big pull-tab ticket embodiment can support tournament play and communicate tournament information to the gaming client.

The systems and methods described herein also support a "small ticket" embodiment. Generally, the small ticket embodiment transmits a small amount of ticket data (e.g., total win amount) to the gaming client device 108, and the gaming client device 108 then proceeds to request supplemental ticket information from one or more of the server-side components described above. This small ticket embodiment is associated with a thin client system architecture. Although the big ticket embodiment is associated with a thick client architecture where the gaming client device 108 performs most gaming operations after requesting a ticket from the wagering system 102 there may be specific embodiments that combine aspects of the big ticket embodiment with elements of a small ticket embodiment. For example, a big ticket electronic pull-tab game may include a progressive prize that that relies on a small ticket implementation that engages a separate server-side progressive game. Similarly, tournament game play may also require communicating with tournament based server-side components.

The term "paytable" may be used to refer to the big ticket (thick client) embodiment described above. The term "prize list" is used to refer to the small ticket (thin client) embodiment described below. A paytable provides detailed information about the payouts associated with the gaming client device 108. The paytable shows prizes for different symbol combinations, including symbol combinations that include a watermark. The term paytable may also be applicable to small ticket (thin client) embodiments described herein.

The term "prize list" refers to a broader list of possible prizes when compared to the paytable. The prize list may include progressive jackpots, special promotions, or other such prizes that are not displayed on the paytable. However, in certain contexts, the terms prize list and paytable may be used interchangeably or are synonymous to one another. For the small ticket embodiments described below the term "prize list" is used instead of the term "paytable" because accessing the server-side 102 supports additional game features such as progressive jackpots, special promotions, and other prizes that are not supported by the thick client embodiment.

Although the terms "big ticket" and "small ticket" are used to describe how the tickets interact with the wagering system 102 and the gaming client device 108, these descriptions are not limiting, and certain implementations may draw from both the big ticket embodiments and small ticket embodiments described herein. The big ticket embodiments and small ticket embodiments are both triggered by an electronic pull-tab ticket request that is generated by illustrative client gaming device 108.

In the "small ticket" embodiment, the deck generator server 505 shuffles data objects as described above, however, the requested electronic pull-tab tickets may only contain a small amount of ticket data, e.g., such as the total win amount, which is also referred to herein as the "final awarded prize."

In this small ticket embodiment, the wagering system 102 receives a request from the gaming client device 108 for an electronic pull-tab ticket and the system 102 returns the shuffled ticket and win amount. Additionally, upon request by the gaming client 108, the system 102 may generate additional data objects to display the awarded prize.

In the small ticket embodiment, the small pull-tab ticket includes the value of the prizes, and the total win amounts associated with the small pull-tab ticket. In some examples, the win amount may represent only one (1) payline of the ticket, or may represent a progressive win, or it may represent a multiple chance win, or it may represent some other indicator of how the game should behave when a ticket is either shuffled, requested, or received by the gaming client device.

By way of example and not of limitation, two different versions of prize lists are shown and described below for the small pull-tab ticket embodiment.

In one small pull-tab ticket embodiment, symbols that show animated features may display progressive wins, bonus rounds, multiple chance tickets or awards of some other value depending on regulations and game features. For example, the illustrative prize list shown below indicates that a generated deck of 7500 tickets should include 4717 tickets with a zero-prize, two (2) tickets that pay $300.00, etc. The samples field indicates the number of ways the deck generator may choose to display the zero prizes and non-zero prizes.

"manufacturer": "Pilot Games"
"title": "Cash Mountain",
"wager": 50,
"form": "AB7655",
"version": "1",
"payout": 85.0,
"ticketcount": 7500,
"prizelist": [
{"value":0, "qt":4717, "samples":1500},
{"value":3000, "qt":2, "samples":20},
{"value":2000, "qt":2, "samples":20},
{"value":1500, "qt":2, "samples":20},
{"value":1000, "qt":2, "samples":20},
{"value":750, "qt":6, "samples":60},
{"value":600, "qt":8, "samples":80},
{"value":500, "qt":12, "samples":60},
{"value":400, "qt":12, "samples":60},
{"value":300, "qt":25, "samples":63},
{"value":250, "qt":30, "samples":75},
{"value":200, "qt":30, "samples":75},
{"value":150, "qt":31, "samples":78},
{"value":100, "qt":180, "samples":270},
{"value":75, "qt":150, "samples":225},
{"value":50, "qt":250, "samples":300},
{"value":25, "qt":250, "samples":300}, In the above small pull-tab ticket example, the deck generator generates a new deck of 7500 total tickets, which must include 4717 tickets that have a zero-prize selected randomly from the 1500 zero prize tickets. In the case of the $300.00 ticket, the deck generator must randomly select two (2) $300.00 tickets to include in the shuffled deck of 7500 from the twenty (20) $300.00 paying tickets. This selection can be performed with or without replacement and duplicate selections may or may not be allowed depending on jurisdiction rules or game design choices.

In another small pull-tab ticket example, the deck generator may use this table to create a weighted random draw of the total win amounts and sequence 7500 win amounts for the shuffled deck. In this example, the total win amount would be sent to the gaming client 108 as the result of the small ticket not having additional ticket data. The gaming client 108 may either use that win amount combined with local data and tables to create the display of that winning ticket, or the gaming client may make a request to a ticket generator cloud service to create the display of the winning ticket. In this example, the display of the result may also be performed on gaming client 108 without requesting any additional ticket data. For example, the gaming client device 108 may receive a zero-prize ticket, award a zero prize, randomly select symbols to fill the grid positions, and the gaming client 108 may evaluate the random selection until a random selection matches the ticket pay amount. Alternatively, the gaming client may have a table of predefined zero prize tickets and will select one at random.

In yet another small pull-tab ticket example, the deck may only be shuffled with win values and when the game client requests a ticket, the ticket may be paired up and/or embedded with a predefined ticket sample and transmitted back to the game client for display.

In the prize list presented below, additional information may be included with different win levels. For example, the win amounts that produce a zero-prize ticket may be grouped together such that there is more control over how these zero paying prizes are displayed. As an example, there are four (4) different levels of zero prizes, in which each level has their own weights for representation in the final shuffled deck of 7500 tickets. Also, the illustrative shuffled deck has 1285 tickets that produce a set of symbols zero prizes, yet the 1285 reflect an "almost win" that is one (1) symbol away from both a feature1 and a feature2. The shuffled deck also has 127 "almost" win tickets with zero awarded prizes that are only one (1) symbol away from a feature1 prize, and the shuffled deck has 126 "almost" win tickets that are only one (1) symbol away from feature2. Also indicated in the small pull-tab ticket prize list are example counts and win amounts for each of the extended features for this game title, and this assists the deck generator in ensuring every deck has a consistent feel.

"ticketcount":7500,
"prizelist": [
{"value":0, "qt":4717, "samples":1500},
{"value":0, "qt":1285, "samples":200, "almost_win": "feature12",
"gameplay":{"almost_win":"feature12"}},
{"value":0, "qt":127, "samples":127, "almost_win": "feature1",
"gameplay":{"almost_win":"feature1"}},
{"value":0, "qt":126, "samples":126, "almost_win": "feature2",
"gameplay":{"almost_win":"feature2"}},
{"value":3000, "qt":2, "samples":20, "gameplay": {"feature": "feature1"}},
{"value":2000, "qt":2, "samples":20, "gameplay": {"feature": "feature1"}},
{"value":1500, "qt":2, "samples":20, "gameplay": {"feature": "feature1"}},
{"value":1000, "qt":2, "samples":20, "gameplay": {"feature": "feature1"}},
{"value":750, "qt":6, "samples":60, "gameplay": {"feature": "feature2"}},
{"value":600, "qt":8, "samples":80, "gameplay": {"feature": "feature2"}},
{"value":500, "qt":12, "samples":60},
{"value":400, "qt":12, "samples":60},
{"value":300, "qt":25, "samples":63},
{"value":250, "qt":30, "samples":75},
{"value":200, "qt":30, "samples":75},
{"value":150, "qt":31, "samples":78},
{"value":100, "qt":180, "samples":270},
{"value":75, "qt":150, "samples":225},
{"value":50, "qt":250, "samples":300},
{"value":25, "qt":250, "samples":300},]

As previously stated, the samples field describes the number of ways the deck generator can choose to display the final awarded prize. Non-zero prizes may also be listed multiple times because the samples for each of those wins may display the final non-zero prize amounts differently. For example, a game may have two (2) $5.00 entries in the prize list, one of the $5.00 may have two hundred (200) required tickets, and the other $5.00 may have twenty (20) required tickets. The samples associated with the $5.00 prizes with two hundred (200) required tickets may be three (3) cherries, the samples associated with the $5.00 prize with twenty (20) samples may be associated with three (3) bars. In this illustrative paytable, three (3) cherries and three (3) bars both pay $5.00. With these two different sample sets broken out as different entries in the prize list, each shuffled deck may have a similar feel in that the $5.00 result of three (3) cherries will be ten (10) times more common than the $5.00 result with three (3) bars in every deck shuffle.

Alternatively, another prize list may include one (1) entry for $5.00 with a total of two hundred twenty (220) tickets; and the deck generator shuffles the deck with two hundred twenty (220) tickets with a non-constant ratio of three (3) cherry wins to three (3) bars.

With respect to the presentation of the watermark for the small pull-tab ticket embodiment, the illustrative look and design of the watermark may vary. The watermark includes an enhancement to a standard symbol such that at a quick glance by a player there is no perceivable difference, however, under closer inspection the differences between symbols without watermarks and symbols with watermarks and the difference between individual watermarks are observable.

For example, the shuffled small pull-tab ticket may include a win amount and a plurality of ticket symbols. However, information related to watermarking or animated prize display may not be present in the shuffled small pull-tab ticket. A system component may create additional data fields after deck shuffling at the time of the electronic pull-tab ticket request. The additional data fields for the small ticket embodiment may include the following watermark data:

- play: information about how to display this result
  - prizes: information about each prize in this ticket (in this case just 1)
    - kind: could be line, scatter, left to right, right to left, top to bottom, etc. . . .
    - line: which pay line is responsible for this win
    - paytable: indicator of which paytable this win came from
    - prize: prize in pennies for this win
    - symbols: list of which symbols contributed to this win. True indicating a paying symbol and false indicating a non-paying symbol
  - symbols: list of symbols to show to the player. The watermarking may be encoded in this list.

In the small pull-tab ticket embodiment, the deck generator server 505 (shown in FIG. 5 below) utilizes a set of data files that describe the contents of a shuffled electronic pull-tab ticket deck. In operation, information such as the number of tickets, win amounts, number of winners for each win amount, and number of tickets that match the criteria for each pay level described. In addition to watermarking, the small pull-tab ticket embodiment may also be adapted to include progressive prize information, tournament information, player tracking information, casino management system information, cashless gaming information, and other such server-side services that are provided by gaming manufacturers to operators.

Referring more generally to either the small-ticket embodiment and the big-ticket embodiment, the type of data object may provide a description of how individual symbols pay. The system may use this as a mapping of how to generate decks. Some or all the information may be used when the decks are generated, and others may be used to populate the ticket upon request from the gaming client.

Symbols: The list of symbols for a particular title that may be used for this game Scatters: any symbols in the list of symbols that may be used as scatters Paytable: describes the sequence of symbols and their pay amount Illustrative JSON code may appear as follows:

"symbols":["p1", "p2", "p3", "p4", "p5", "p6", "p7", "p8", "feature1", "feature2"],
"scatters": ["feature1", "feature2"],
"paytable": {
"prizes": [
{"sequence": ["p1", "p1", "p1", "p1", "p1"], "pays": 6000, "mode":"left"},
{"sequence": ["p1", "p1", "p1", "p1"], "pays": 3000, "mode":"left"},
{"sequence": ["p1", "p1", "p1"], "pays": 1500, "mode":"left"},
{"sequence": ["p2", "p2", "p2", "p2", "p2"], "pays": 4000, "mode":"left"},
{"sequence": ["p2", "p2", "p2", "p2"], "pays": 2000, "mode":"left"},
{"sequence": ["p2", "p2", "p2"], "pays": 1200, "mode":"left"},
{"sequence": ["p3", "p3", "p3", "p3", "p3"], "pays": 1500, "mode":"left"},
{"sequence": ["p3", "p3", "p3", "p3"], "pays": 1000, "mode":"left"},
{"sequence": ["p3", "p3", "p3"], "pays": 600, "mode": "left"},
{"sequence": ["p4", "p4", "p4", "p4", "p4"], "pays": 1200, "mode":"left"},
{"sequence": ["p4", "p4", "p4", "p4"], "pays": 800, "mode":"left"},
{"sequence": ["p4", "p4", "p4"], "pays": 500, "mode": "left"},
{"sequence": ["p5", "p5", "p5", "p5", "p5"], "pays": 600, "mode":"left"},
{"sequence": ["p5", "p5", "p5", "p5"], "pays": 400, "mode":"left"},
{"sequence": ["p5", "p5", "p5"], "pays": 200, "mode": "left"},
{"sequence": ["p6", "p6", "p6", "p6", "p6"], "pays": 500, "mode":"left"},
{"sequence": ["p6", "p6", "p6", "p6"], "pays": 300, "mode":"left"},
{"sequence": ["p6", "p6", "p6"], "pays": 150, "mode": "left"},
{"sequence": ["p7", "p7", "p7", "p7", "p7"], "pays": 400, "mode":"left"},
{"sequence": ["p7", "p7", "p7", "p7"], "pays": 200, "mode":"left"},
{"sequence": ["p7", "p7", "p7"], "pays": 100, "mode": "left"},
{"sequence": ["p8", "p8", "p8", "p8", "p8"], "pays": 300, "mode":"left"},
{"sequence": ["p8", "p8", "p8", "p8"], "pays": 150, "mode":"left"},
{"sequence": ["p8", "p8", "p8"], "pays": 50, "mode": "left"},
{"sequence": ["feature2", "feature2", "feature2", "feature2", "feature2"],
"pays": 0, "mode":"line", "feature":["feature2"]},
{"sequence": ["feature1", "feature1", "feature1", "feature1", "feature1"],
"pays": 0, "mode":"line", "feature":["feature1"]}]}

In an illustrative example of data objects related to the distribution of prizes, the distribution of prizes data objects can be described as follows:

"manufacturer": the Manufacturer of this game

"title": Game Title

"wager": Wager (in this example it is shown in pennies, but it could be dollars, credits, or some other form of currency)

"form": Unique identifier for this data set

"version": Version of this data set

"payout": Payback Percentage

"ticketcount": Number of tickets in the shuffled deck

"prizelist": list of prizes.

With respect to both the big ticket embodiment and small ticket embodiment, the electronic pull-tab tickets in the deck may include standard zero prize pull-tab tickets (i.e., losing tickets), watermarked zero prize pull-tab tickets (i.e., watermarked losing tickets), standard winning pull-tab tickets, and watermarked winning pull-tab tickets. The inventors theorize that watermarked losing pull-tab tickets, watermarked winning pull-tab tickets, or any combination thereof may engage with player psychology in a manner that creates increased anticipation or suspense during instances of game play and extended game sessions. The inclusion of a watermark, even on a losing ticket, may provide players the appearance of a win and delay resolution of the anticipation associated with a potential win, increasing player engagement and desire to play. Further, the association of embedded watermark graphic enhancements with winning animations and/or increased win values may drive increased anticipation of a win value during any later display of the embedded watermark graphic enhancements.

The pull-tab gaming systems and methods presented herein support centralized control of electronic pull-tab ticket wagering with virtual pull-tab tickets. The electronic pull-tab gaming systems and methods described herein are placed in one or more wagering venues. A wagering or gaming venue includes a charity, a casino, and any other such authorized or licensed gaming venue. Additionally, a gaming venue includes a church, hotel, bar, restaurant, convenience store and other such locations that support licensed gaming activity. Note, that the term "gaming" refers to games of chance or games that include a chance component, in which a wager is received, and the awarded prize is dependent on the outcome of the game of chance or of the chance component.

The gaming systems and methods presented herein are communicatively coupled to a plurality of remote gaming venues, in which each remote gaming venue has at least one client device that supports customer wagering. More generally, the client devices supporting customer wagering may include fixed cabinet machines (e.g., electronic gaming machines (EGMs), slot machines, and mechanical reel type machines) and mobile gaming devices (e.g., smartphones, authorized mobile gaming devices, and player interface units). Additionally, each remote gaming venue may include one or more Point-of-Sale (POS) stations that manage player funds. In the illustrative embodiments presented herein, the various elements of the gaming system are communicatively and operatively coupled to one another with a secure network architecture that includes the Internet as the backbone and at least one secure Wi-Fi network within each gaming venue.

Referring to FIG. 5, there is shown distributor servers 504 communicatively coupled to the site director server 502. Each of the distributor servers 504 may be configured to manage finances for the player accounts that are associated with the authorized mobile devices. Additionally, the illustrative distributor servers 504 may be responsible for generating logs and reports required for the POS devices. Furthermore, the illustrative distributor servers 504 may be configured to manage game play operations, wagers, and prizes. Furthermore, the illustrative distributor servers 504 may manage cashier operations including customer sales and redemptions. Further yet, the distributor servers 504 may be configured to maintain the financial status for the authorized mobile devices, including the actual credit balance on each player device.

In an alternative embodiment, the operations performed by the site director server 502 and the distributor server 504 may be performed by a site director software module (not shown) and a distributor software module (not shown) that may be associated with a client-server architecture, a distributed architecture, a peer-to-peer architecture, a hierarchical architecture, a "cloud" architecture, or any combination thereof.

The mobile wagering system 102 may also include an illustrative web portal server 516. The web portal server 516 provides a web interface to access system accounting and operational data, as well as to maintain and configure the system. The web portal server 516 is configured to support creating, editing, and removing entities like distributors, operators, venues, cashiers, devices, game parameters and others as required. All actions performed on the portal are logged for auditing purposes. This action log can be accessed on the portal itself if the user has the necessary system privileges.

Additionally, the pull-tab gaming system and method operating on the wagering system 102 may be embodied in a fixed slot machine style cabinet communicatively coupled to one or more servers, such as a Casino Management System (CMS), which is well known in the art. The illustrative CMS server would operate as a network component.

By way of example and not of limitation, the web portal server may be accessed from personal computers or tablet devices 518 over the Internet. Authorized users having "administrator" privileges may access system reports and controls based upon their operational needs and organizational affiliation. The web portal server 516 supports a variety of different authorized users having different roles with different levels of access to the mobile wagering system 102. For example, the web portal server may be configured to support the following roles: regulator, manufacturer, distributor with access to multiple operators, operator with access to multiple venues, a particular venue, a particular cashier, and other such preconfigured roles.

An illustrative router 520 is disposed within the wagering system 102. The router 520 is communicatively coupled to a wide area network 522, e.g., Internet, which is communicatively coupled to the various venues and authorized users. Additionally, the illustrative router 520 is communicatively coupled to the portal server 516, each distributor server 504, and the site director server 502. The router 520 forwards data packets to the appropriate server, network, internet appliance, system, and other such destination. Additionally, router 520 may include a firewall that supports secure communications with the mobile wagering system.

The portal server 516 provides a web interface to access system accounting and operational data, as well as to maintain and configure the system. The web portal server is configured to support creating, editing, and removing entities like distributors, operators, venues, cashiers, devices, game parameters and others as required. All actions performed on the portal are logged for auditing purposes. This action log can be accessed on the portal itself if the user has the necessary system privileges.

The distributor servers 504 are communicatively coupled to the gaming devices at each venue. Each of the illustrative distributor servers are configured to manage and control the game operations and cashier operations performed at a set of gaming venues that are associated with a distributor. The distributor is responsible for sales and support of a multiplicity of venues.

The deck generator server 505 operates as the central authority for generation of finite pool decks of predetermined electronic pull-tab results. In these embodiments, the deck generator server is communicatively coupled to one or more of the distributor servers X, Y, Z, as well as to the manufacturer server. The deck generator server both randomizes the decks of electronic pull-tabs and distributes the decks to the manufacturer server. The manufacturer server then virtually assigns each deck to one of the site locations. The distribution server distributes randomized tickets from the decks to gaming devices in those site locations.

Figure 6:
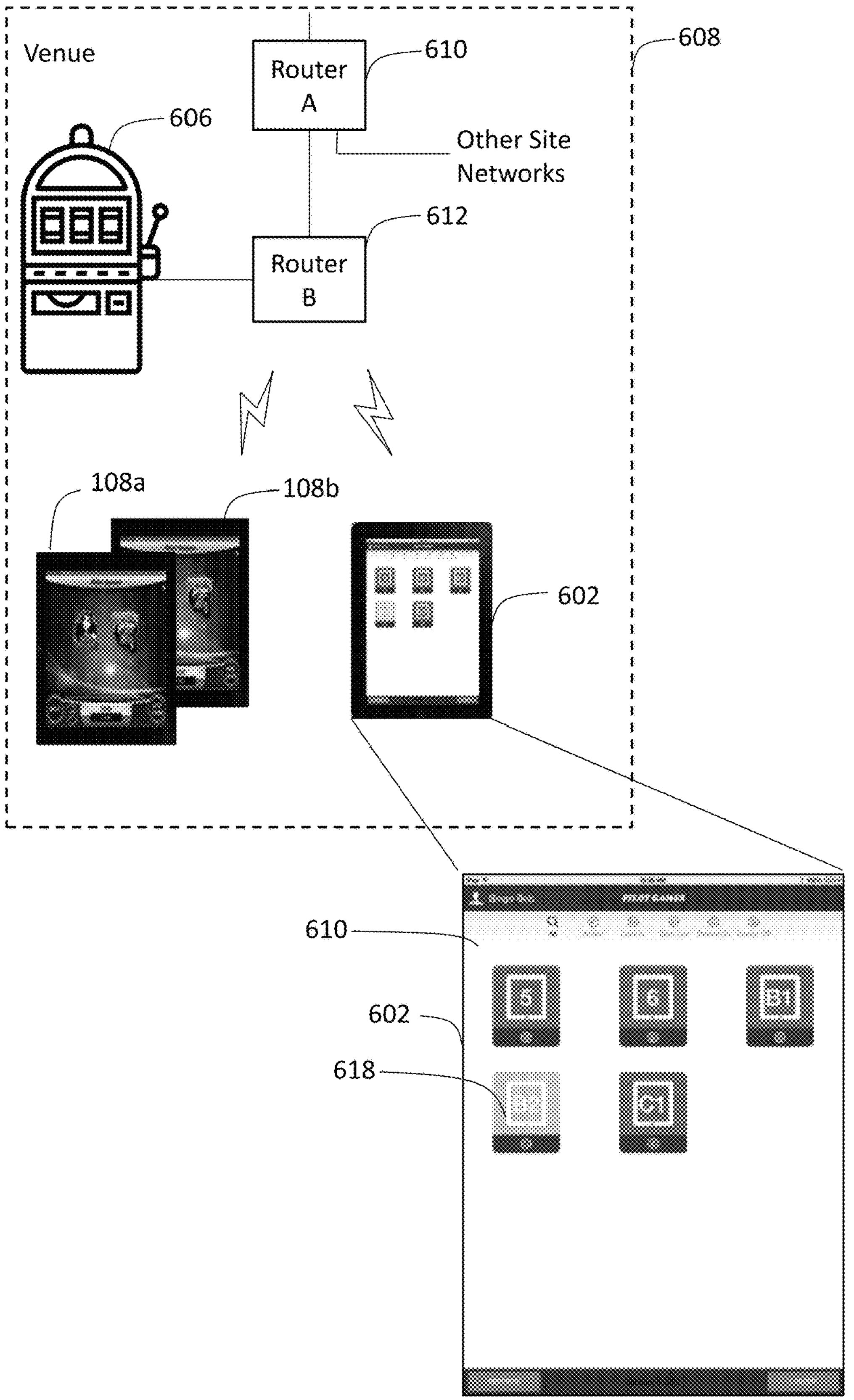
FIG. 6 shows an illustrative point-of-sale (POS) device communicatively coupled to authorized mobile devices in a gaming venue.

Referring to FIG. 6, there is shown an illustrative point-of-sale (POS) device communicatively coupled to authorized mobile devices in a gaming venue. The illustrative POS device 602 is communicatively coupled to one or more authorized mobile devices 108*a*, 108*b* and to one or more non-mobile gaming device 606 in gaming venue 608. By way of example and not of limitation, the illustrative POS device 602 is communicatively coupled to authorized mobile devices with a native socket implementation inside a Local Area Network. An exploded view of an illustrative user interface 610 corresponding to POS device 602 is also shown.

The point-of-sale device 602 is configured to manage all cash operations such as cash-in operations and cash-out operations. The cash-in and cash-out operations may be requested by the authorized mobile devices 108*a*, 108*b*, the authorized non-mobile device 606, the POS 602 or any combination thereof.

The illustrative point-of-sale (POS) device 602 and authorized mobile devices 108*a* and 108*b* may be embodied as a mobile device, e.g., player interface unit 400, as described above in FIG. 4. The illustrative POS device 602 is a client device configured to receive and operate an illustrative proprietary POS application. The authorized mobile devices 108*a* and 108*b* are client devices configured to receive and operate a proprietary game application. The illustrative POS device 602, the non-mobile devices 606, and authorized mobile devices 108*a* and 108*b* are communicatively coupled with the wagering system 102. In the illustrative embodiment, the client devices communicate with the wagering system 102 for each transaction.

More generally, all wagering and accounting information is monitored and stored in the gaming system 100 and the client devices always reflect the information received from the gaming system 100. For security and consistency, all game play decisions and financial data are hosted in the centralized gaming system and only visually reflected in the client devices.

Illustrative Wide Area Network 304, e.g., Internet, (shown in FIG. 3) is communicatively coupled to the illustrative gaming venue 608. In the illustrative embodiment, the illustrative wide area network terminates at Router A 610. The illustrative Router A 610 may be a pre-existing router located at venue 608 and usable for multiple purposes, depending on the needs of the venue. For example, Router A 610 may be a DOCSIS compliant component of a cable system. In the illustrative embodiment, a second Router B 612 is also communicatively coupled to router A 610. Illustrative Router B 612 may be configured to support the requirements for communications with the wagering system 102.

In the illustrative embodiment, router B 612 establishes one or more private Wi-Fi SSIDs to be used only at a specific site. Each Wi-Fi SSID includes a security key that is unique to that site and is not available to site personnel. One SSID may be used for the exclusive use of the wagering system 102.

The illustrative POS 602 tablet is an electronic device that may be operated by a cashier located at a venue. The POS device 602 provides control over financial activity within the venue. The illustrative POS application program runs on a tablet device and supports the following illustrative operations, namely, a cash-in operation (sales), a cash-out operation (redemption) and a reporting operation.

In the illustrative embodiment, the cashier logs into the POS application program by providing a cashier username and password. During the set-up process, the cashier's name is associated with a cashier role that is associated only with a particular venue. After a successful login, the POS client retrieves relevant system information from an illustrative distributor server 504, which presents the user interface 610.

The illustrative user interface 610 associated with POS client 602 presents colored icons, in which each icon represents one of the authorized mobile devices (such as authorized mobile devices 108*a* and 108*b* or non-mobile devices 606 in venue 608. For POS operations, the illustrative authorized mobile devices 108*a*, 108*b* and non-mobile device 606 may also be referred to as "a registered gaming client" or "requesting gaming device."

By way of example, each icon 618 has a short identifier representing the local identification of the device, which is unique within that venue. For example, a grey icon may identify that the authorized gaming device has been registered with the wagering system; however, the authorized gaming device is not currently available for game play. Another illustrative icon may be a yellow icon, which represents that the authorized gaming device is present and available. A green icon may represent that the authorized gaming device has credit and is involved in a game session. A red icon may represent that a player input has been received that relates to a HELP button input command, a cash input command, or a cash output command.

In operation, a cashier interacts with user interface 610 and selects an icon associated with a particular authorized mobile device. After selecting the appropriate authorized mobile device, the cashier interacts with another user interface that enables the cashier to add cash to the authorized mobile device. The user interface available to the cashier may also enable a player cash-out from the authorized mobile device. Additionally, the cashier user interface may display a log of recent play and transactional activity, which may be retrieved from the illustrative site director server, the distributor server, or any combination thereof.

A variety of other user interfaces may also be presented in the point-of-sale device. For example, a user interface may be presented that allows the cashier to access reports and to log-out from the POS device. For example, a reports screen may be presented that summarizes the business activity of the current day, the previous day, or a historical period. The reports may include data regarding cash-in sales (in dollars), awarded prizes (in dollars) and net revenue (which is the difference between the cash-in sales and the awarded prizes). The illustrative reports screen may be refreshed in real time or in pseudo real time.

By way of example and not of limitation, a player may interact with the centralized gaming system 100 by purchasing play credits at the POS device 602. For example, the illustrative player requests an amount of credit and pays the cashier that is interacting with POS device 602. Subsequently, a POS session is established with the central database 514 (shown in FIG. 5) when the illustrative distributor server 304 receives a cash-in message from the POS client device 602. The illustrative cash-in message identifies the session amount and identifies the authorized gaming device associated with the POS session amount, which is linked to the identity of the POS device initiating the transaction. The distributor server 504 acknowledges the POS transaction and provides updated information to the specific game client indicating the amount of available credit. Additionally, a player may elect to add credit to an existing balance by purchasing such credit from a cashier, who may use a POS ADD CASH function to record the transaction in the server database and update the available credit total.

The electronic pull-tab gaming system 100 described in FIG. 1, and FIG. 3 through FIG. 6 supports a variety of different types of games and game play, including electronic pull-tab game play as described herein.

Figure 7A:
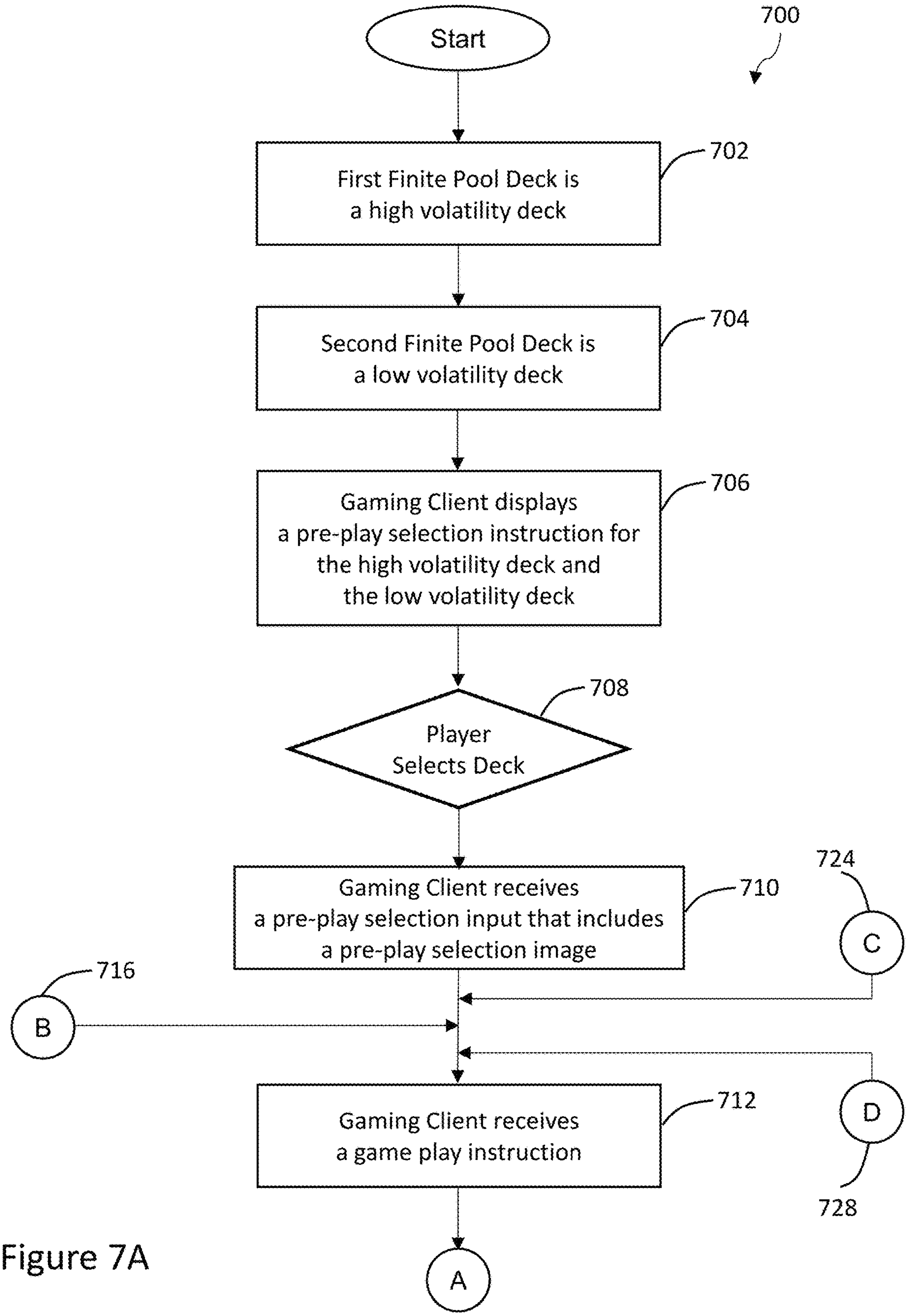
FIG. 7A and FIG. 7B show a pull-tab gaming method with pre-play selection for a plurality of decks that includes at least two finite pool decks such as for the pull-tab game Wild Walleye described above in FIG. 2.
Figure 7B:
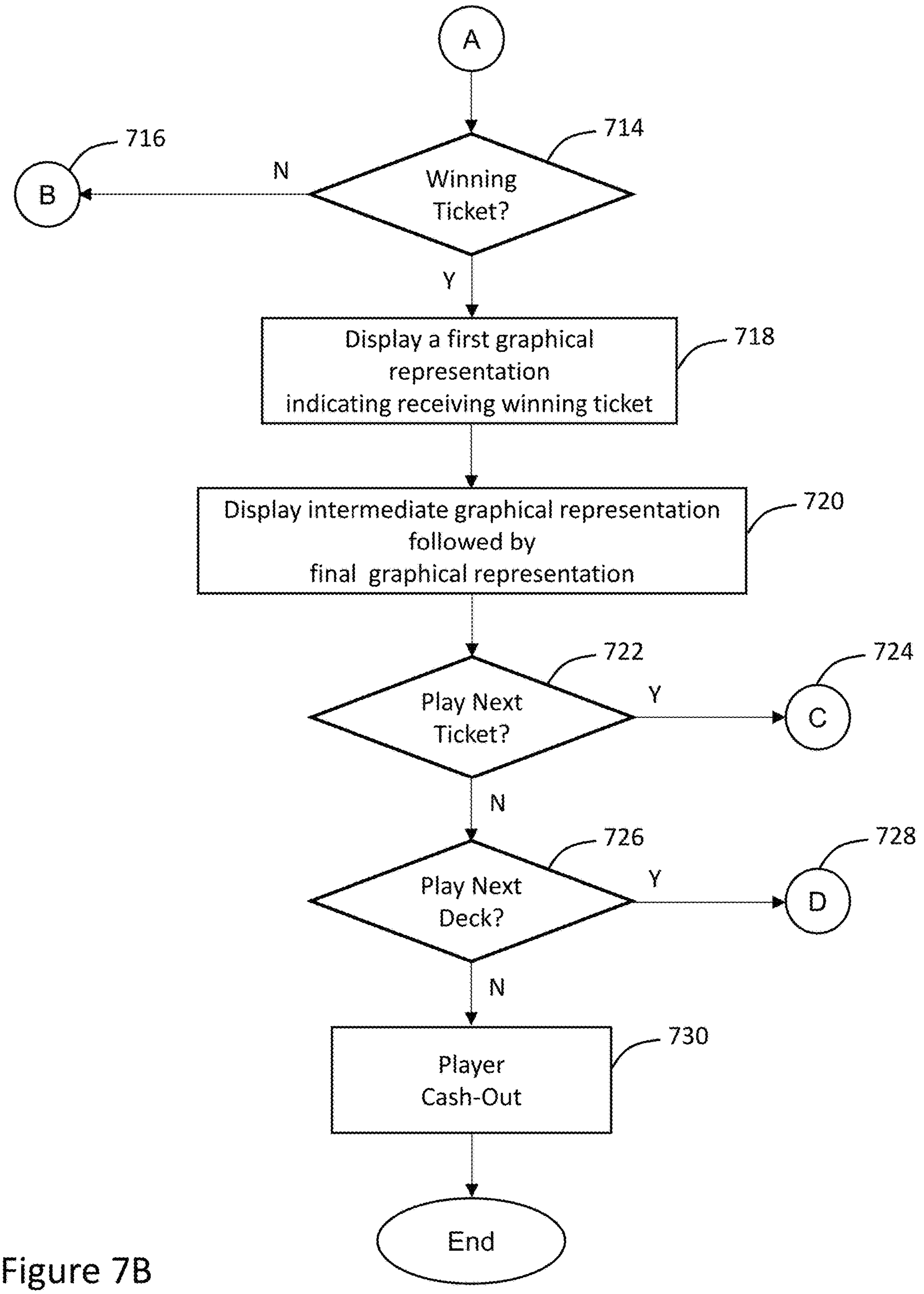

Referring to FIG. 7A and FIG. 7B there is shown a pull-tab gaming method 700 with pre-play selection for a plurality of decks that includes at least two finite pool decks such as for the pull-tab game Wild Walleye described above in FIG. 2. The pull-tab gaming method 700 operates using the pull-tab gaming system described in FIG. 1, and FIG. 3 through FIG. 6.

At block 702, the illustrative wagering system 102 provides access to each finite pool deck, which includes predetermined electronic pull-tab results. More specifically, block 702 relates to a first group of awarded prizes corresponding to an illustrative first high volatility deck that includes a greater quantity of high value winning tickets than. Additionally, the first high volatility deck includes a lesser quantity of winning tickets than the second low volatility deck. At block 704, the wagering system 102 also provides access to a second low volatility deck having a lesser quantity of high value winning tickets is also accessible by the gaming client 108.

The method then proceeds to block 706 where the gaming client device 108 presents a pre-play selection instruction that receives a player-driven Game Action of selecting one of the high volatility deck and the low volatility deck. At decision diamond 708, the player selects one of the decks.

The method then proceeds to block 710 where the gaming client device 108 receive the pre-play selection input, which includes a pre-play selection image and the deck selection of the first high volatility deck and the second low volatility deck. In the illustrative embodiment, the pre-play selection input is transmitted from the gaming client 108 to the wagering system 102 after the gaming client device 108 receives a wager.

In one embodiment, the pre-play selection input corresponds to the selection an avatar from a plurality of avatars, in which a first avatar is associated with the first high volatility deck and the second avatar is associated with the second low volatility deck. The pre-play selection image includes a selected avatar that may also be associated with the final awarded prize.

The gaming client 108 receives a plurality of pre-play selection game inputs, in which each pre-play game input is received before the game play instruction, in block 712, is received. Each pre-play selection game input is associated with a pre-play game selection image so that when the winning ticket is received by the gaming client 108 at block 718 and block 720, a plurality of images that correspond to the plurality of pre-play selection game inputs are displayed on the gaming client 108.

The gaming client device 108 receives the game play instruction and initiates game play after receiving the pre-play selection input. More specifically, at block 712, the game play instruction is received by the gaming client 108. Once received by the gaming device client 108, the game play instruction becomes a game-driven Executable that is communicated to the wagering system 102. By way of example, the game play instruction includes receiving a bet amount which is associated with a player wager. In another example, the game play instruction includes receiving a play game instruction received from a play button. The game play instruction may also include an instruction to play a ticket, or the next ticket, or to play a next deck, or to cash-out as shown in block 724.

At decision diamond 714, a determination of whether the wagering system transmits a winning ticket is made by the gaming client device 108. A winning ticket is selected by the wagering system from at least one of the first high volatility deck and the low volatility deck according to the deck selection associated with the pre-play selection input. The winning ticket is transmitted from the wagering system to the gaming client. The gaming client receives the winning ticket and displays a first graphical representation that indicates the winning ticket has been received by the gaming client. In the illustrative embodiment, the first graphical representation includes a payline of symbol combinations. In another illustrative embodiment, the first graphical representation includes the payline symbol combination and watermark.

If a winning ticket is received by the gaming client 108, the winning ticket includes at least one final awarded prize, and the method proceeds to block 718. If a winning ticket is not received by the gaming client, the method proceeds to bubble B 716 and then to block 712 where the gaming client 108 receives a game play instruction to request another ticket from the wagering system 102.

At block 718, the gaming client 108 receives the winning ticket and displays the first graphical representation combination that indicates the winning ticket has been received by the gaming client. The first graphical representation may include a payline of symbol combinations or the payline symbol combination and watermark.

At block 720, the gaming client displays an intermediate graphical representation that includes the pre-play selection image after displaying the first graphical representation. The final awarded prize includes the pre-play selection image, which is associated with the winning ticket. The intermediate graphical representation is typically performed with an animated roll-up that is customized to include images and animations that are associated with the pre-play selection image.

The prize reveal from the intermediate graphical representation results in the gaming client device presenting the final awarded prize. The final graphical representation includes the payline, the final awarded prize, and possibly the corresponding watermark.

At decision diamond 722, a play next ticket instruction may be received by the gaming client 108. If the play next ticket instruction is an affirmative instruction, the method proceeds to bubble C 724 where the gaming client receives a game play instruction at block 712. Thus, if the player continues game play with the same game, the pre-play selections are stored so that the player can re-use the pre-play selections for the next wager. If the play next ticket instruction is a negative instruction, the method proceeds to decision diamond 726.

At decision diamond 726, a play next deck instruction may be received by the gaming client 108. Thus, the player may elect to play another deck having a different denomination or the player may elect to play another game. If the player decides to play another denomination, which would be associated with another deck, the method proceeds via bubble D 728 to block 712 where the gaming client receives a game play instruction. Thus, the pre-game selection can be saved and used for other games too. If the play next deck instruction is negative, then the method proceeds to block 524 where the player cashes out.

Figure 8A:
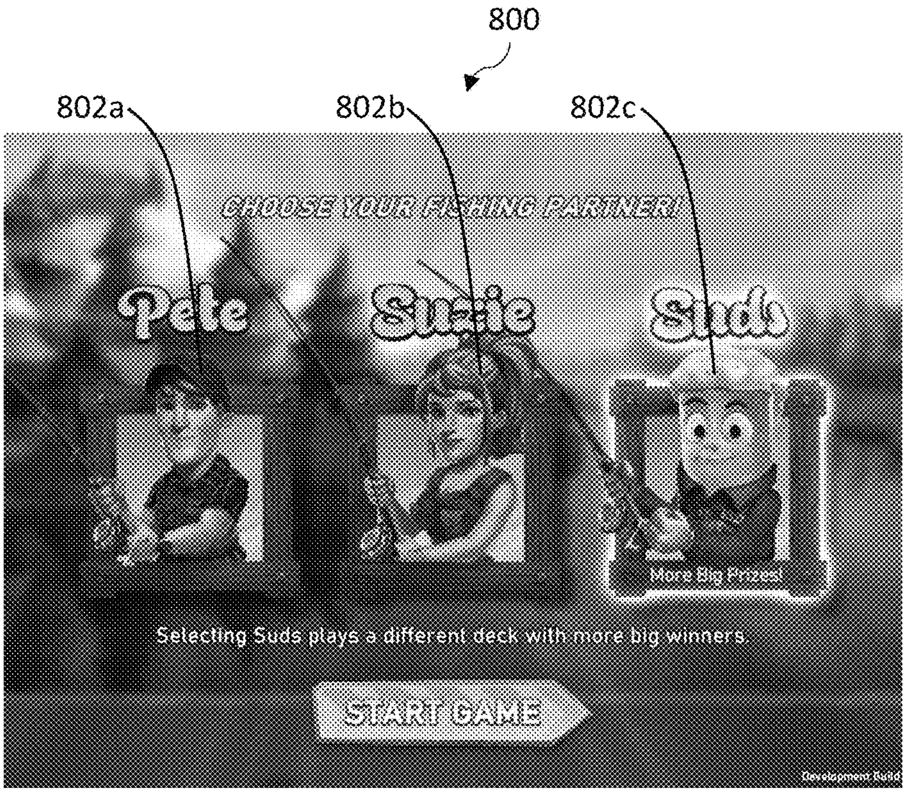
FIG. 8A through FIG. 8D shows a Wild Walley embodiment with pre-play selection, but without watermarking.

In FIG. 8A there is shown an illustrative selection that includes character selection start screen 800 for a summer season version of Wild Walleye displaying three avatar characters 802*a*, 802*b*, and 802*c*. The character selection start screen 800 is available to players whenever the game is idle. In some embodiments, the character selection start screen 800 enables players to select or change their previously selected avatar character 802 only prior to requesting a ticket for play. In some embodiments, the character selection start screen 800 enables players to select or change their previously selected avatar character 802 after requesting a ticket for play, but prior to revealing the ticket value. In some embodiments, each avatar character 802 is associated with unique game play graphic animations. In some embodiments, each avatar character 802 is associated with its own unique paytable and/or volatility. In some embodiments, each avatar character is associated with a pull-tab game version that has a volatility and paytable unique to that avatar character.

The inventors theorize players may perceive a character as lucky or unlucky, prompting a desire to continue game play with a particular character 802 or change their selected character between game instances. The inventors further theorize that player psychology may motivate continued game play in order to achieve a large win or a particular animated roll-up.

In the illustrative embodiment, two of the avatars in Wild Walleye, namely, Pete 802*a* and Suzie 802*b* share the same paytable. The other avatar, i.e., Suds 802*c*, is associated with a big prize paytable with the offset being prizes are awarded less frequently. During game play, the selected avatar is featured in the animated roll-up. For example, selecting Suds features Suds in the animated roll-up and awards prizes according to Suds big prize paytable. After selecting an avatar, the player places a wager and the gaming client initiates the request to receive an electronic pull tab ticket from a pull tab deck associated with the selected avatar. Note, the player's avatar selection may be switched to another avatar before placing a wager.

Figure 8B:
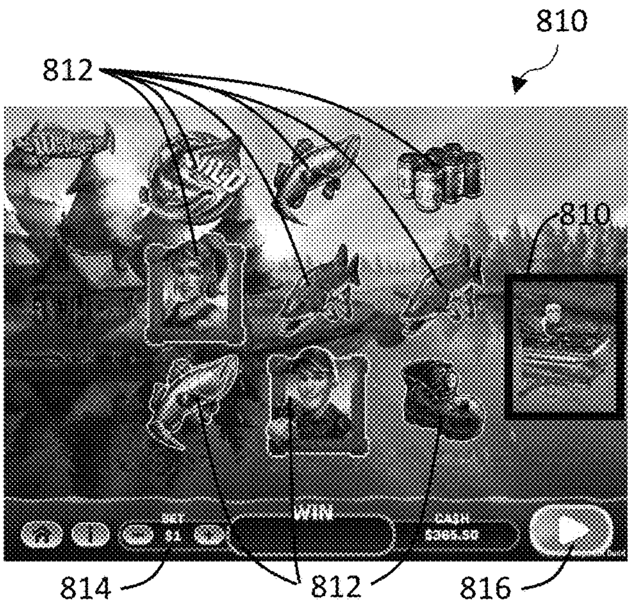

Referring now to FIG. 8B, there is shown there is shown an illustrative start screen 810 displaying a losing grid of symbols 812, the wager amount per ticket 814, and the play button 816 that causes the system driven Game Event reveal of the purchased ticket when a player input Game Action taps, selects, or otherwise interacts with the play button 816. While the illustrative embodiment presents a 3×3 grid game display area, the term "grid" is interchangeable with similar terms, such as "row," "column," or "reel," unless otherwise stated herein. Further, the grid may comprise a single row, a single column, multiple rows, and/or multiple columns, and is not limited to the illustrative 3×3 symbol grid depicted in FIG. 38B and other figures herein. Further still, each row or column of a grid is not limited to three (3) game symbol display positions and may include more of fewer game symbol display positions. The size and number of symbols may vary according to the gaming engineering constraints such as display size, game features, game play and other such engineering constraints.

In some embodiments, the game prizes may be presented to players using a variety of visual constructs. For example, a wheel constructed of wedge slices may be used to display the game prizes, where each slice may represent one or more prizes or tickets. One of skill in the art would recognize from this description that the presentation of prizes need not be limited to symbol arrays, grids or wheels, and any construct may be used to display the game prizes.

In the illustrative embodiment, the player has selected avatar character 802*c* Suds from the character selection start screen 800. In response, to the selection made on the character selection start screen 800, the start screen 810 further displays an animation graphic of the selected avatar character 820.

In the illustrative embodiment, the auto-close is "off." The system driven auto-close Game Event may be selected by the operator. In some embodiments, the system driven auto-close Game Event automatically replaces a finite game pool with a new pool when all prizes exceeding a predetermined value for the deck have been exhausted and the game may no longer be desirable by players.

When the system driven auto-close Game Event is turned "ON," a deck may automatically close and be replaced by a new deck when prizes over a game specific value set in the portal are gone. For example, a game may have 3 large value prizes and when the last prize is awarded, the deck may close, and a new deck may open. By way of example and not of limitation, the system driven auto-close Game Event is identified in the client game information when it is active, so players may know that it is active. A notification may also be given to all active clients when a new deck is open. This feature is attractive to players because they are always assured that there are always some valuable prizes remaining in a deck they may be playing.

When auto-close is enabled, the remaining prizes may be pooled into a progressive prize. Thus, in certain embodiments, proceeds from the auto-close may be applied to a progressive jackpot.

Figure 8C:
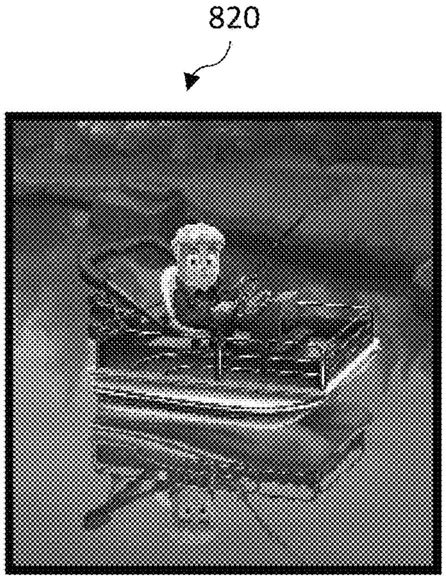

FIG. 8C shows an expanded inset view of the animation graphic of the selected avatar character 820. In this expanded inset view, the animation graphic of the avatar character 820 Suds is depicted fishing from a pontoon boat in the background of the start screen 810.

Figure 8D:

In FIG. 8D there is shown an illustrative final graphical representation 830 for a standard winning virtual pull-tab ticket displaying a payline symbol combination 832*a*, 832*b*, 832*c* along a descending diagonal of the 3×3 grid marked by a winning line 833, a final awarded prize 834, and a win meter 836 displaying the final awarded prize. The paytable associated with the pre-play selection includes a final awarded prize of $2.00 for the sequence of payline symbol combination 832*a*, 832*b*, and 832*c*.

Figure 9A:
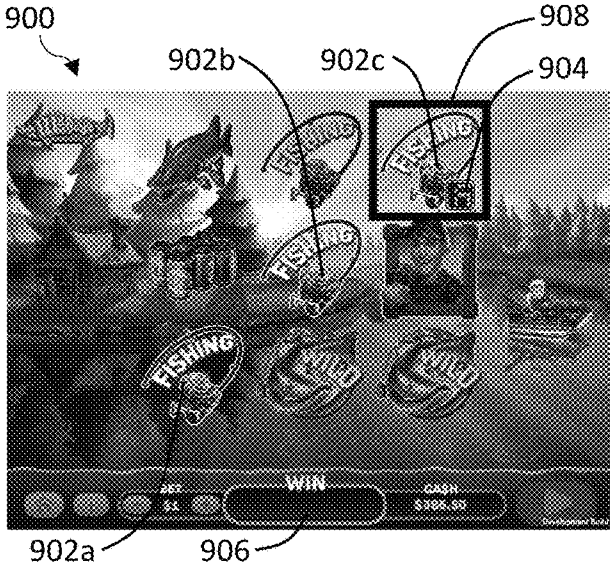
FIGS. 9A through 9G show a sequence of graphic animations for game play of a watermarked virtual pull-tab ticket.

FIGS. 9A through 9G show a sequence of screenshots for a Wild Walleye watermarked pull-tab ticket game. In FIG. 9A there is shown the result of a winning system-driven Game Event where a payline symbol combination 902*a*, 902*b*, and 902*c* further include an embedded watermark 904.

Although FIG. 9A presents a screenshot 900 that shows a watermark 904 the first graphical representation of payline symbol combination 902*a*, 902*b*, and 902*c*, there is a notable absence of the final awarded prize. Since the paytable associates the watermark with a prize, then the combination of three fishing symbols and the unique watermark can be mapped to the final awarded prize. However, the player must view the animated roll-up to determine the final awarded prize.

Figure 9B:
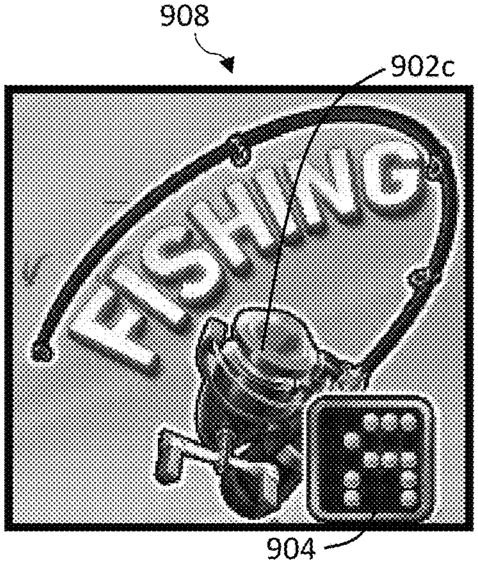

FIG. 9B shows an enlarged view 908 of the game symbol 902*c* and the watermark 904. In this view 908, the particular arrangement of highlighted tiles and empty tiles in the embedded watermark graphic enhancement 904 grid are clearly visible. This arrangement of highlighted tiles and empty tiles is unique to the single winning value associated with this ticket and this embedded watermark graphic enhancement 904 grid, i.e., no other watermark grid arrangement is associated with the winning value of this ticket.

FIGS. 9C through 9G show a series of screenshots from an intermediate graphical representation, embodied as an animated roll-up animation.

Figure 9C:
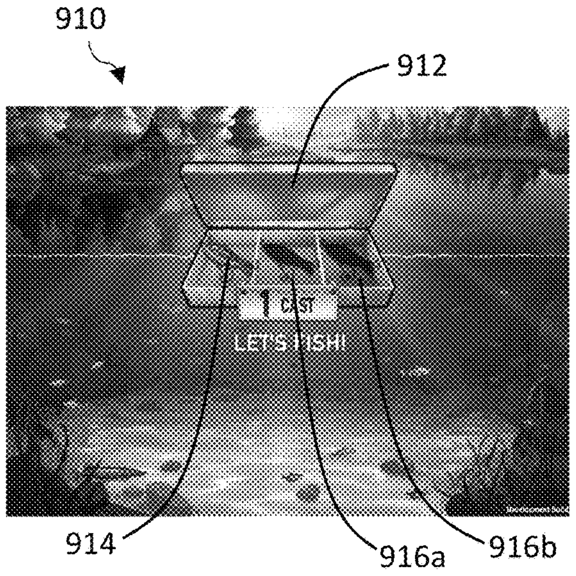

In FIG. 9C the screenshot 910 has shifted frame to display a split view of an underwater environment and an above water environment with a tackle box 912 displaying a single lure 914 and two empty slots 916*a* and 916*b* for additional lures.

Figure 9D:
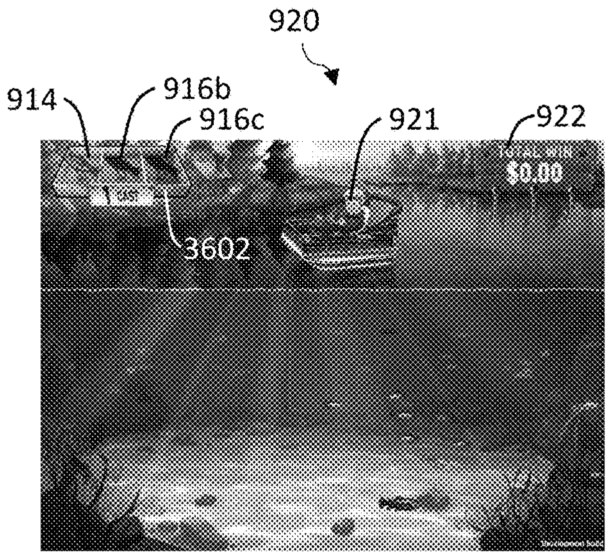

In FIG. 9D, the screenshot 920 shows the next progression of the intermediate graphical representation where the tackle box 912 has shifted out of the center of the screen view 920, the character avatar 921 is visible fishing from a pontoon boat, and a total win meter 922 is now displayed. In screenshot 920 the character avatar 921 Suds has cast the first and only lure 914. Suds has not caught anything so the win meter 922 reads $0.00.

Figure 9E:
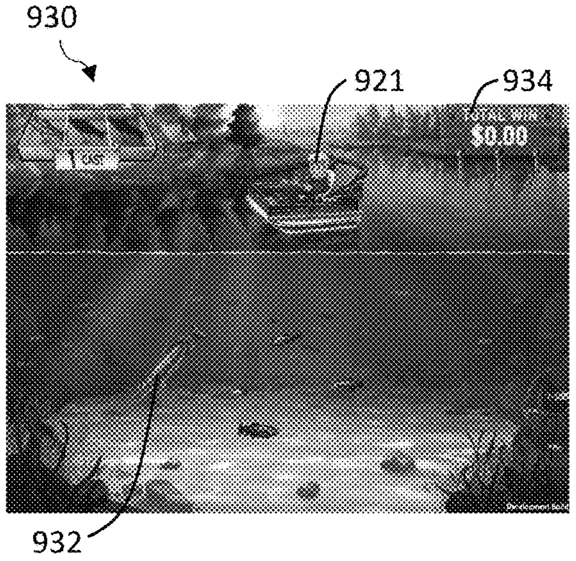

In FIG. 9E the screenshot 930 shows the next progression of the intermediate graphical representation where the character avatar 921 cast the first and only lure 914 and catches fish 932. Fish 932 represents an unknown win value. In the illustrative embodiment, only a single lure 914 is available for casting and only a single fish 932 can be caught, as such, the caught fish 932 represents not just a partial win value but the final awarded prize.

Figure 9F:
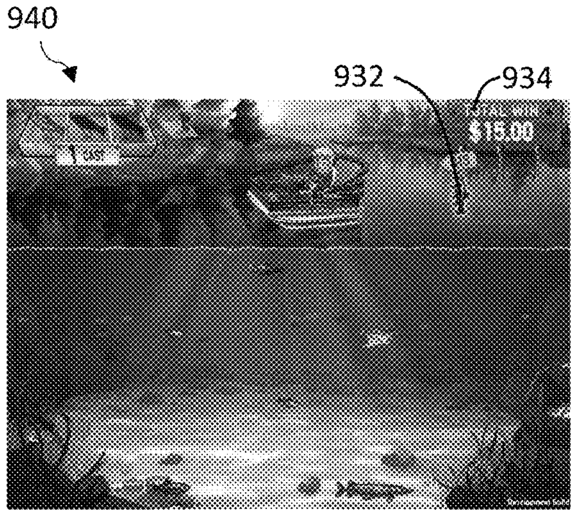

In FIG. 9F the intermediate graphical representation finishes with a tally animation shown in screen view 940, which shows the fish 932 caught and hung for display. The caught fish 932 includes a value tag showing the final awarded prize of $15.00 and the total win meter 934 has recorded the $15.00 final awarded prize of the caught fish 932. In this illustrative example, only a single lure 914 is associated with the $15.00 final awarded prize. At the conclusion of the intermediate graphical representation, the animation shown in screen view 940 the total win meter 934 displays the final awarded prize.

Figure 9G:

FIG. 9G shows a screenshot 950 of the final graphical representation that includes payline symbols 902*a*, 902*b*, and 902*c*, the watermark 904, and the final awarded prize 954. having a watermark.

Figure 10A:
FIG. 10A through FIG. 10D show initial wild symbol graphic animations without watermarking.

With reference now to FIGS. 10A through 10D there is shown illustrative game play screenshots of a winning ticket from a watermarked electronic pull-tab deck. In FIG. 10A an initial wild symbol graphic animation of a grid of game symbols is displayed with an empty symbol position 1002. In the illustrative embodiment, the empty symbol position 1002 is occupied by a mass of flies. Box 1004 identifies an inset frame of the screen view 1000, which becomes the focal frame for the intermediate graphical representation.

Figure 10B:

In FIG. 10B the screen view 1010 shows a first portion of the intermediate graphical representation that has shifted to the inset frame 1004 of the screen view 1000 and displays a fish animation 1012 below water.

Figure 10C:
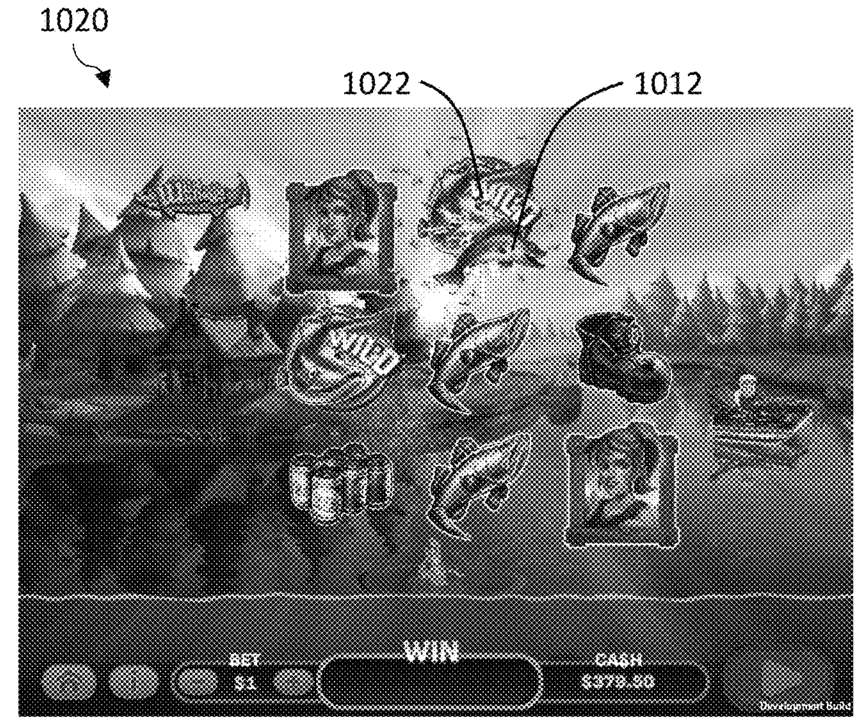

In FIG. 10C the intermediate graphical representation continues with screen view 1020 that has returned its focal frame to that of screen view 1000, showing the full grid of symbols. In this portion of the intermediate graphical representation, the fish animation 1012 has jumped out of the water to eat the mass of flies occupying the empty symbol position and transformed the mass of flies into a wild symbol 1022.

Figure 10D:

In FIG. 10D the screen view 1030 shows a final graphical representation for the final awarded prize. In the illustrative final graphical representation, the wild symbol 1022 is an element of a winning symbol sequence that includes the initially revealed symbols 1032*a* and 1032*b*. The screenshot 1030 of the final graphical representation further includes a winning line 1034, the final awarded prize 1036 overlaid on the payline symbols 1022, 1032*a*, 1032*b*. Additionally, the win meter 906 includes the final awarded prize.

Figure 10E:
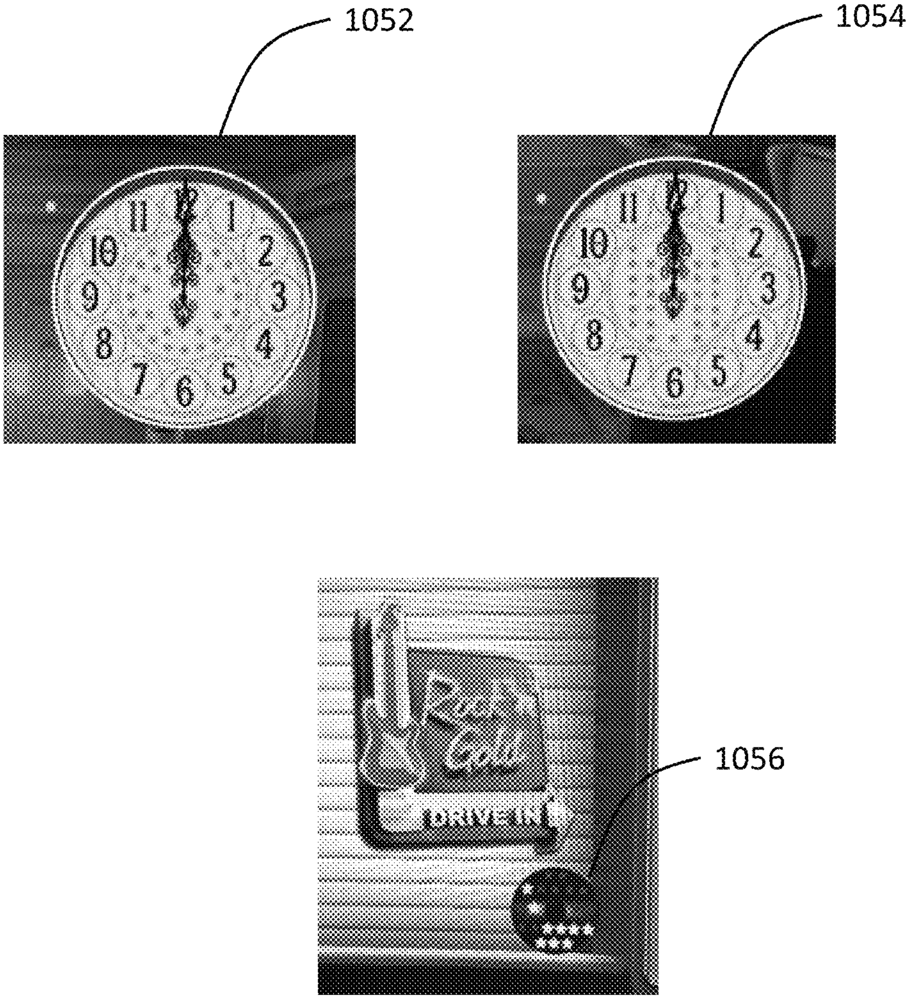
FIG. 10E shows some watermarked symbols.
Figure 11A:
FIG. 11A through FIG. 11D show illustrative screenshots of a composite single watermarked virtual pull-tab ticket paytable.
Figure 11B:
Figure 11C:
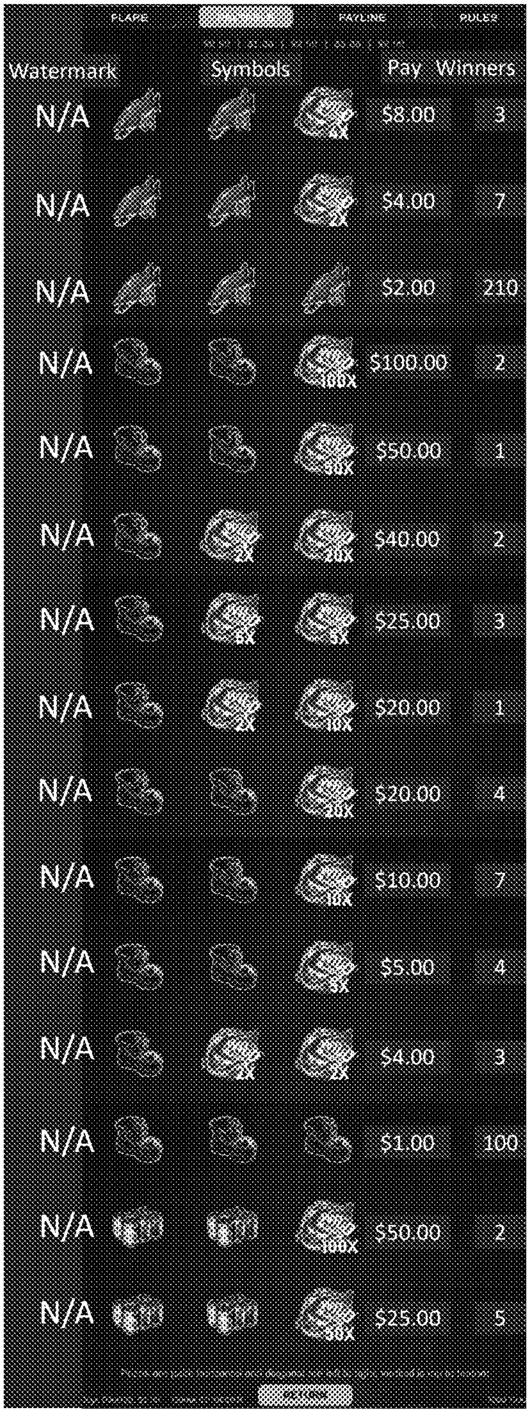
Figure 11D:

Some examples of watermarks having a grid formation as shown in FIG. 9B and FIG. 9G. In other illustrative examples, the watermark may be embedded into the symbol as shown in the clock symbols of FIG. 10E. More specifically, clock 1052 is distinct from clock 1054. However, the clock symbol does not share a grid formation, instead, the watermark has circular form with a unique dot pattern on the watch face. Another illustrative symbol is presented in watermark 1056 in FIG. 10E, which includes a watermark 1056 feature having stars that are separate and distinct from the Rock 'n Roll Drive In game symbol.

With reference now to FIGS. 11A through 11D, there is shown illustrative screenshots 1100*a* through 1100*d* of a composite single watermarked virtual pull-tab ticket paytable are shown. The final watermarked prizes and standard prizes are listed in a "paytable" menu view. The illustrative screen shots 1100*a* through 1100*d* include depictions of payline symbols 1102, the number of tickets 1104 having the payline symbols 1102 in the illustrative electronic pull-tab deck, and the final awarded prize 1106. Each watermarked symbol sequence 1102 further includes the watermark graphic enhancement 1108 embedded in certain symbol(s) that uniquely identifies the win value of the symbol sequence. For clarity, the embedded watermark graphic enhancement 1108 for each watermarked symbol sequence is reproduced in an enlarged format 1110. This enlarged format 1110 clearly shows that each grid pattern is unique, although some grid patterns are associated with the same final awarded prize. In these examples, while multiple grid patterns may indicate the same win value, each grid pattern may be associated with a particular character avatar and associated unique intermediate graphic animation.

Figure 12A:
FIGS. 12A and 12B show an illustrative character selection start screen for a winter season version of the watermarked virtual pull-tab game.

Referring now to FIG. 12A there is shown a view 1200 of an illustrative character selection start screen for a winter season version of Wild Walleye. In some embodiments, players may select between the summer season game version and the winter season game version using player input prior to purchasing a game ticket. This view 1200 again displays the three avatar characters 802*a*, 802*b*, 802*c*, with avatar character 802*a* Pete selected by a player prior to initiating a round of game play. Note, a round of game play is associated with a single wager and requesting a single ticket from wagering system 102.

In some embodiments, the winter season pull-tab game version has the same volatility and paytable as the summer season pull-tab game version. In some embodiments, the winter season pull-tab game version has a different volatility and paytable than the summer season pull-tab game version.

Figure 12B:
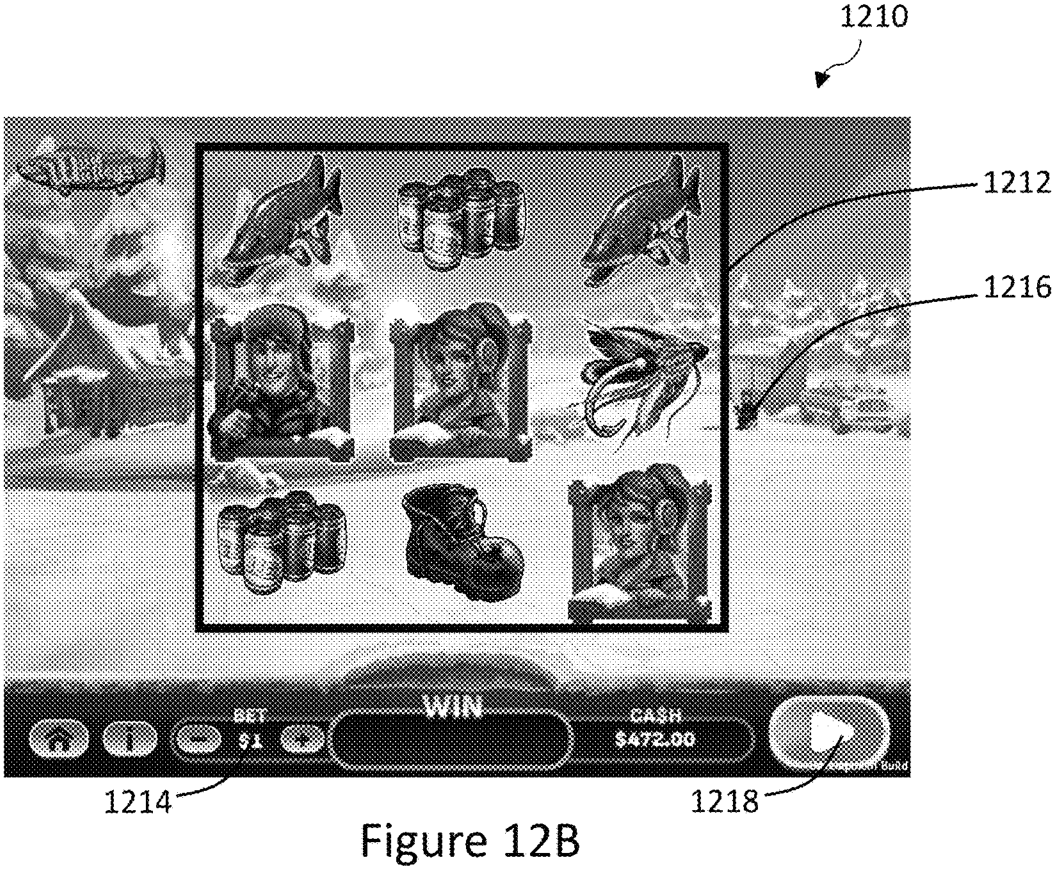

With reference to FIG. 12B there is shown an illustrative screenshot 1210 displaying a losing grid of symbols 1212, the wager amount per ticket is shown on wager amount meter 1214, and the play button 1218. In response, to the selection made on the character selection start screen 1200, the start screen 1210 further displays an animation graphic of the selected avatar character 1216 Pete.

Figure 13A:
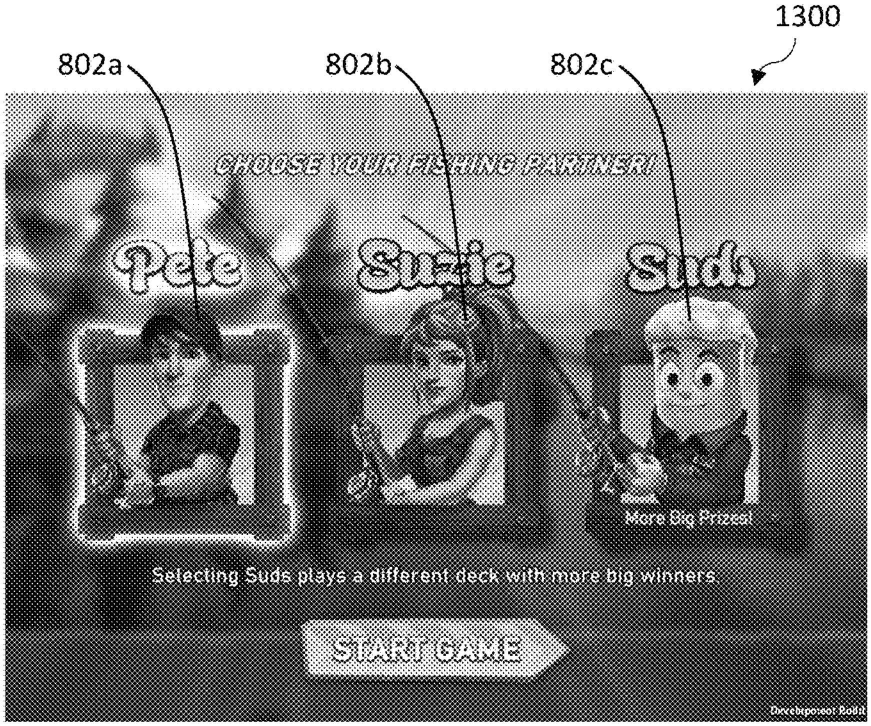
FIG. 13A through 13C show the character selection start screen for the summer season game version.

Referring now to FIG. 13A there is shown a screenshot 1300 of the character selection start screen for the summer season game version. This screenshot 1300 again displays the three avatar characters 802*a*, 802*b*, 802*c*, with avatar character 802*a* Pete selected by the player prior to initiating a round of game play.

Figure 13B:
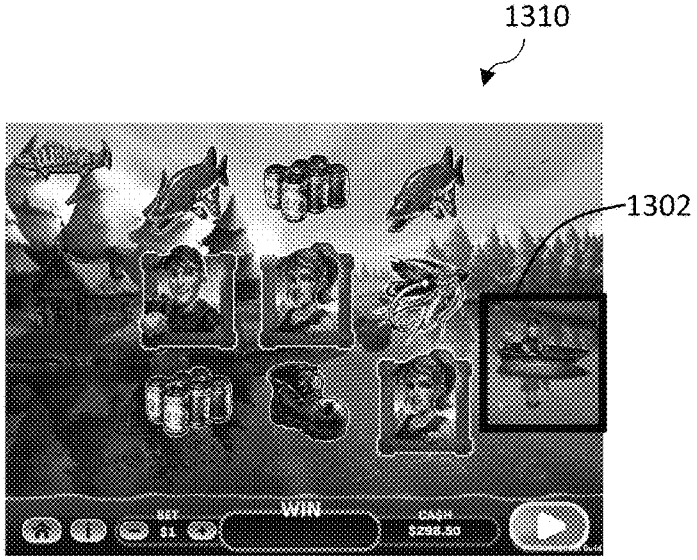
Figure 13C:
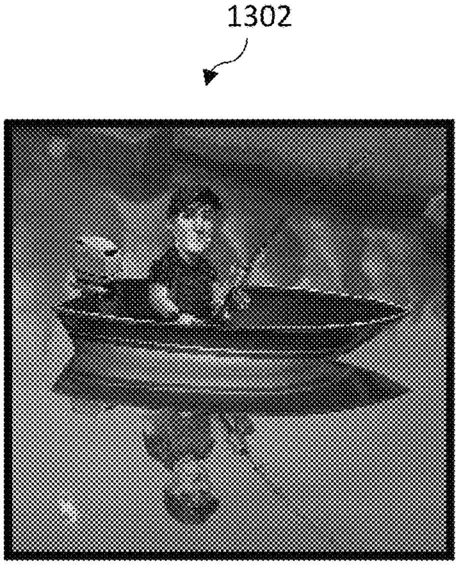

With reference to FIG. 13B there is shown an illustrative screenshot 1310 for a summer season game version of Wild Walleye. In response to the selection made on the character selection start screen 1300, the screen 1310 further displays an image of the selected avatar character 1302 Pete fishing in a pontoon boat in the background. FIG. 13C shows an expanded view of the selected avatar character 1302 Pete in his pontoon boat.

Figure 14A:
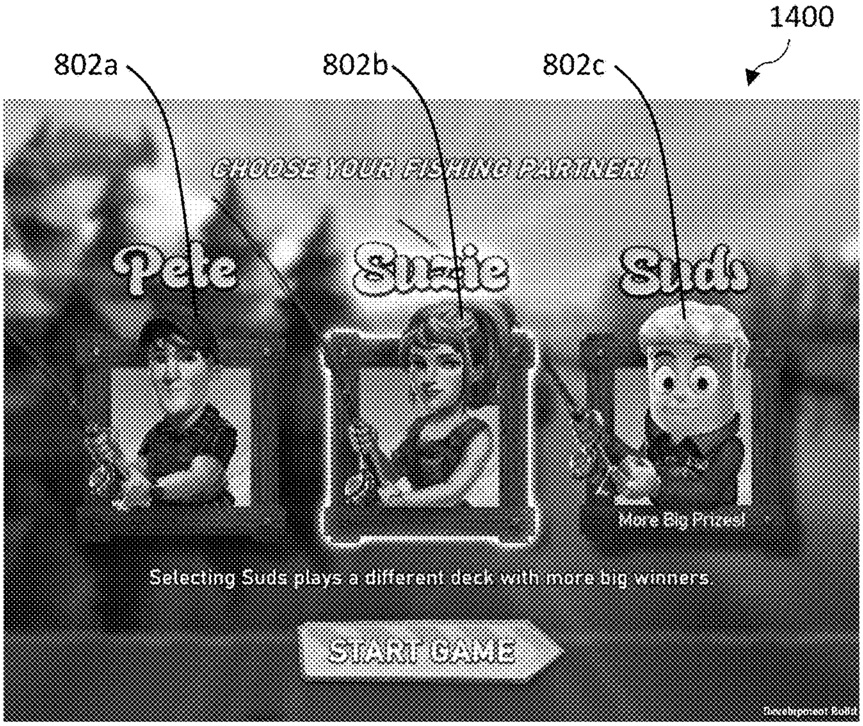
FIG. 14A through 14C show another character selection start screen for the summer season game version.

Referring now to FIG. 14A there is shown a further view 1400 of the character selection start screen for the summer season game version. This view 1400 again displays the three avatar characters 802*a*, 802*b*, 802*c*, with avatar character 802*b* Suzie selected by a player prior to initiation of a game instance to play a virtual pull-tab ticket.

Figure 14B:
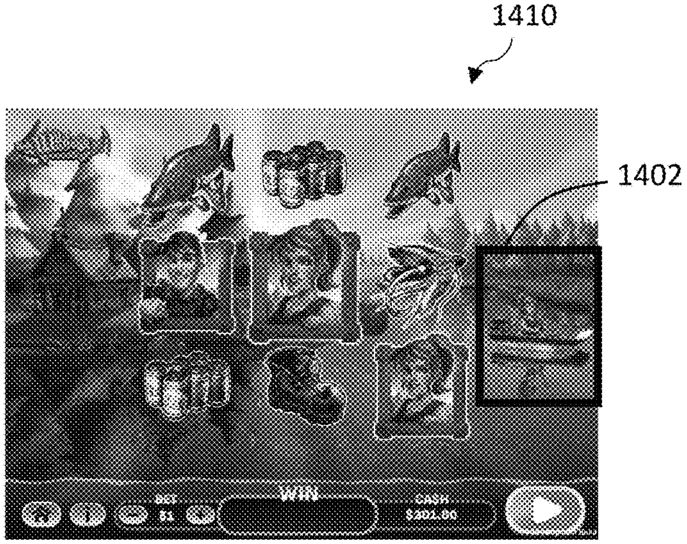
Figure 14C:
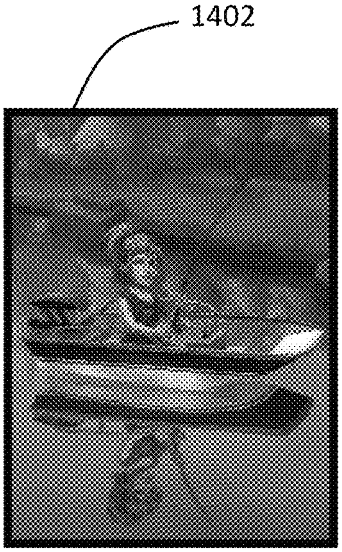
Figure 15A:
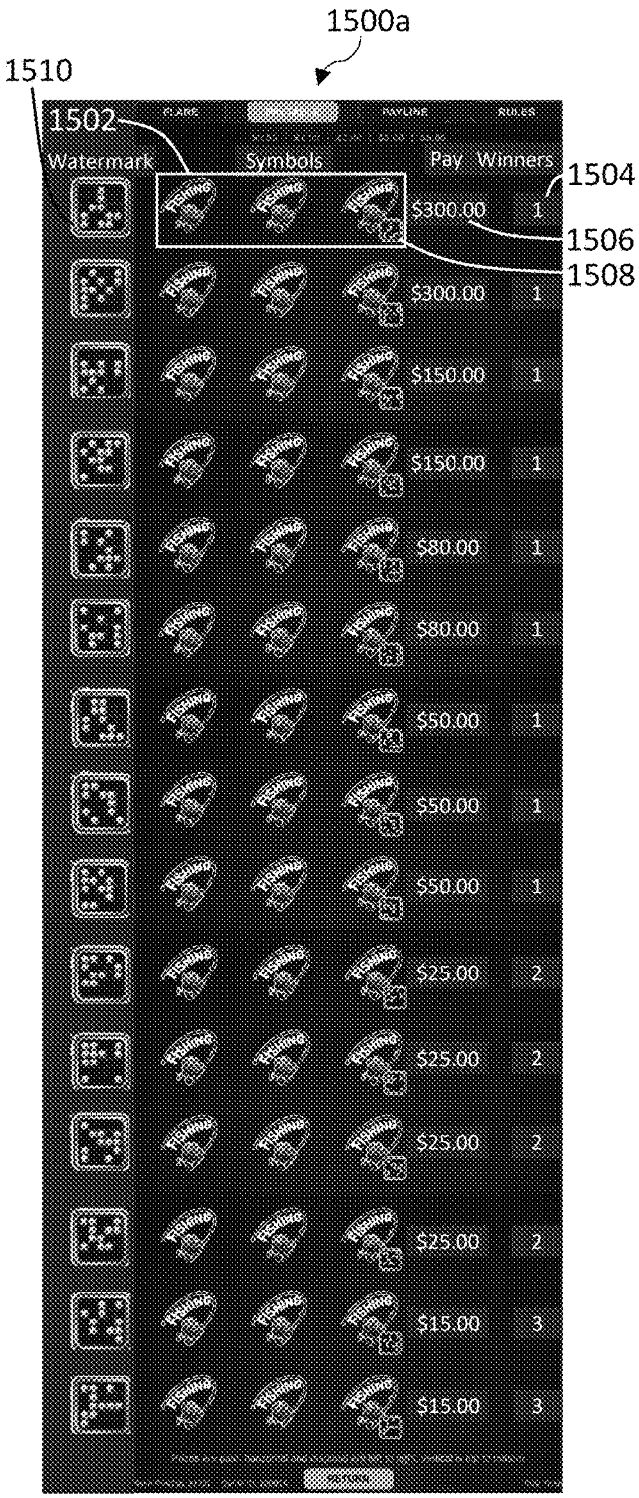
FIG. 15A through 15E show a composite single watermarked virtual pull-tab ticket paytable.
Figure 15B:
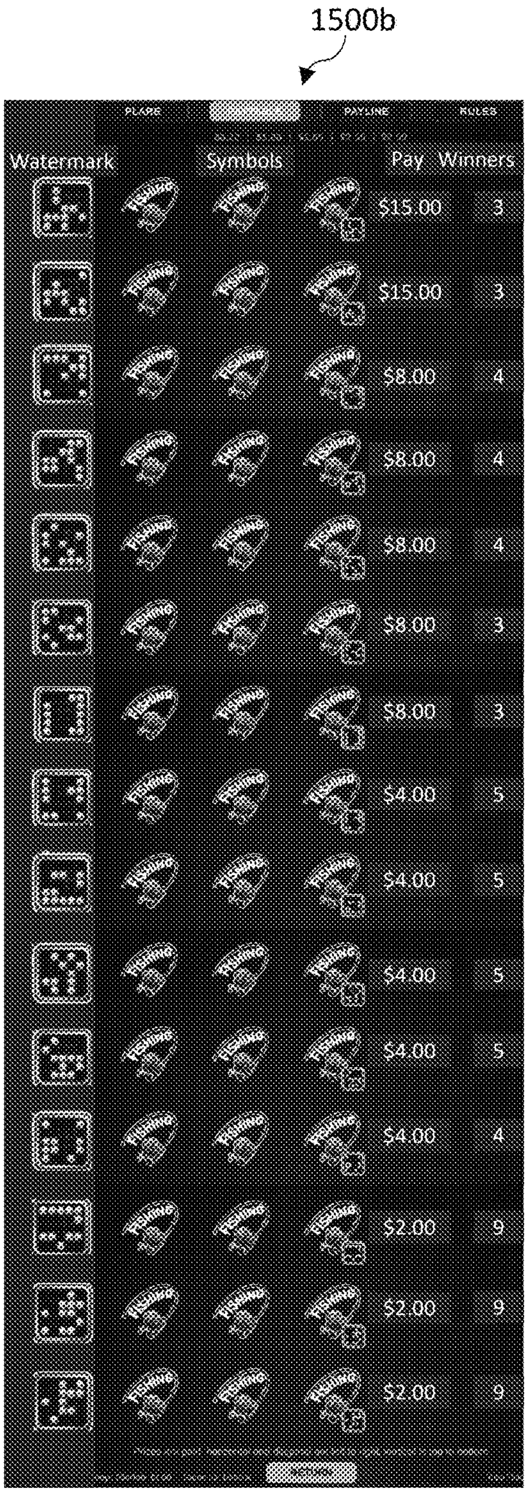
Figure 15C:
Figure 15D:
Figure 15E:
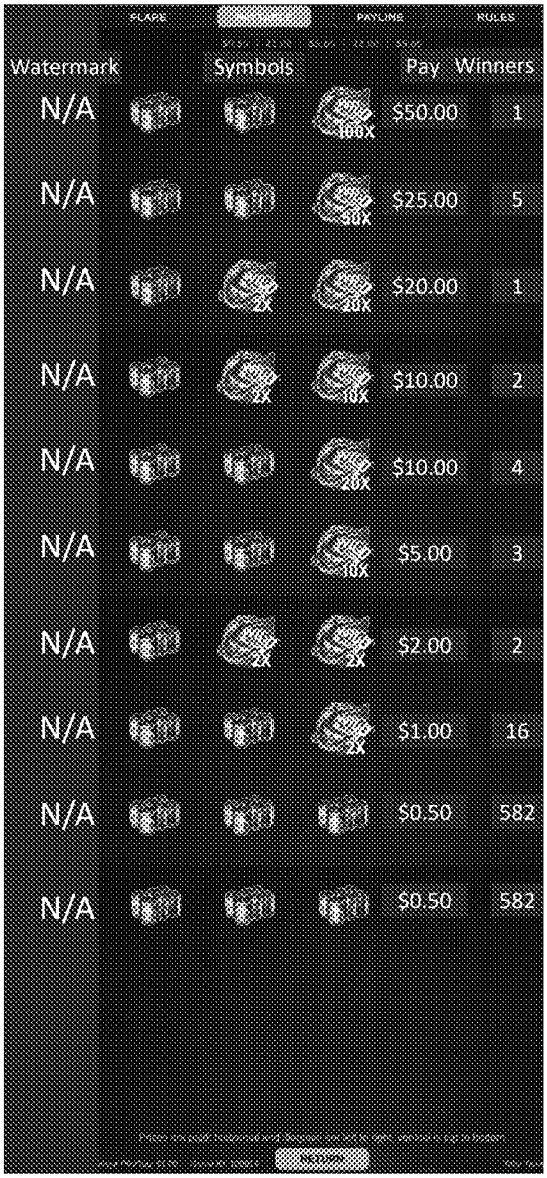

In FIG. 14B there is shown an illustrative screenshot 1410 for the summer season game version. In response to the selection made on the character selection start screen 1400, the start screen 1410 further displays an animation graphic of the selected avatar character 1402 Suzie fishing in a pontoon boat in the background. FIG. 14C shows an expanded view of the background animation graphic of the selected avatar character 1402 Suzie in her pontoon boat.

With reference now to FIGS. 15A through 15E there are shown illustrative screenshots 1500*a* through 1500*e* of a composite single watermarked virtual pull-tab ticket paytable are shown. The final watermarked prizes and standard prizes are listed in a "paytable" menu view. The illustrative screen shots 1500*a* through 1500*e* include depictions of payline symbols 1502, the number of tickets 1504 having the payline symbol combination 1502 in the illustrative virtual pull-tab deck, and the final awarded prize 1506 Each watermarked symbol sequence 1502 further includes the watermark graphic enhancement 1508 embedded in certain symbol(s) that uniquely identifies the win value of the symbol sequence. For clarity, the embedded watermark graphic enhancement 1508 for each watermarked symbol sequence is reproduced in an enlarged format 1510. This enlarged format 1510 clearly shows that each grid pattern is unique, although some grid patterns are associated with the same final awarded prize. In these examples, while multiple grid patterns may indicate the same win value, each grid pattern may be associated with a particular character avatar and associated unique intermediate graphic animation.

FIG. 7A through FIG. 15E describe a customized animated roll-up that is usually dependent on a pre-play selection. Note, FIG. 10A through FIG. 10D did not include a watermark, yet there was a final awarded prize. Additionally, the Wild Walleye embodiment allowed the ability to control game volatility after selecting a particular denomination. Note, there may a variable game volatility that is dependent on the denomination. However, in the Wild Walley embodiment described above, the game volatility is controlled by the player afters selecting the denomination.

The pre-play selection may also be stored on the gaming client device 108 for each game having a pre-play selection feature. Thus, the player does not have to input their pre-play selections each time they interact with the game device 108.

Also, the pre-play selections may be determined on another device, e.g., a personal mobile device (not shown) that has downloaded a mobile application, and the pre-play selections may then be communicated to the gaming client device 108. Additionally, the pre-play selections may be stored in the wagering system 102 and the gaming client device 108 may request the pre-play selections from the wagering system 102. Furthermore, the pre-play selection may be performed on a personal computer that is communicatively coupled to the wagering system, the gaming client device, or a combination thereof.

Figure 16A:
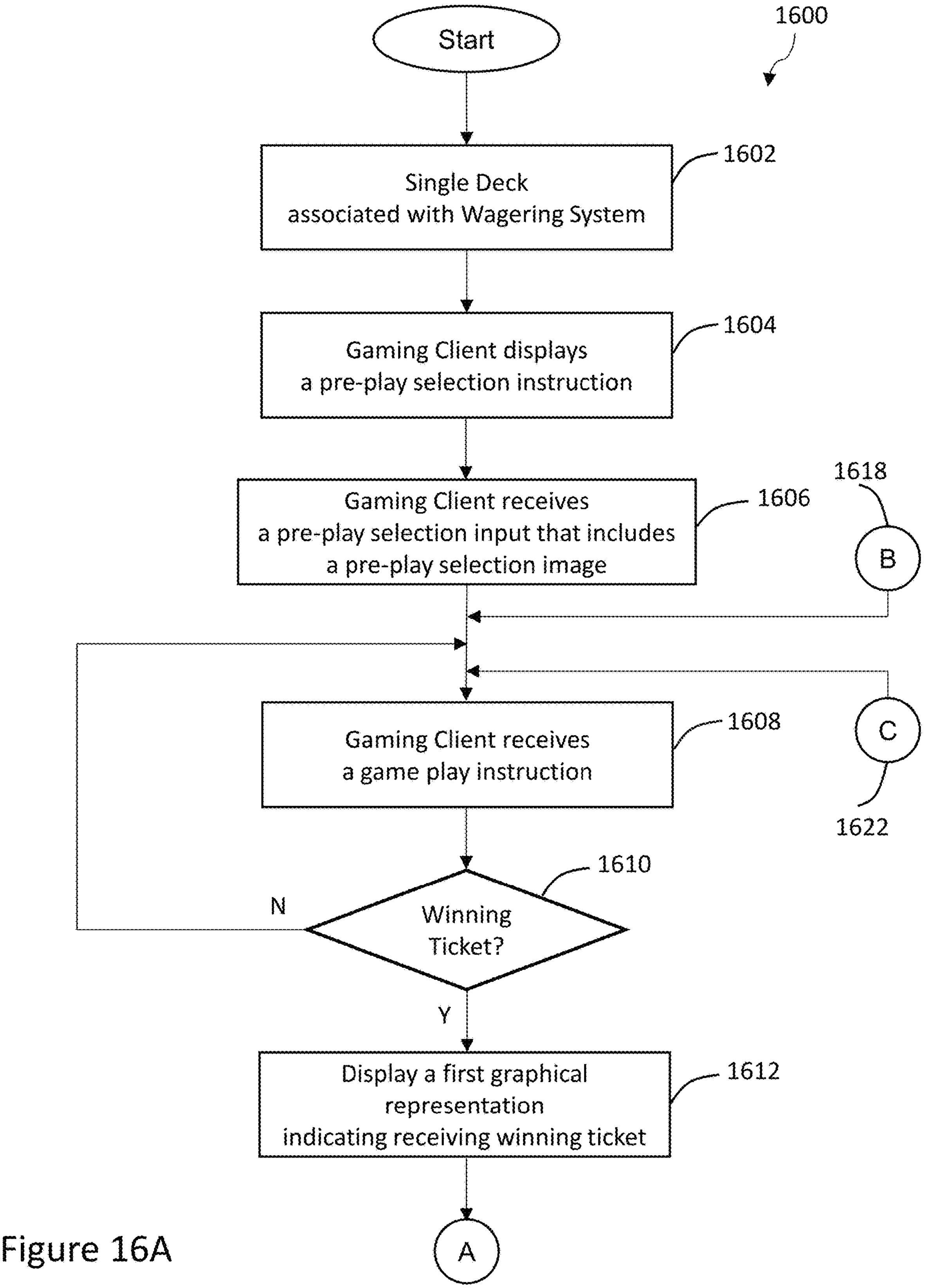
FIG. 16A and FIG. 16B show a flowchart for a pull-tab gaming method with pre-play selection for a single deck.
Figure 16B:
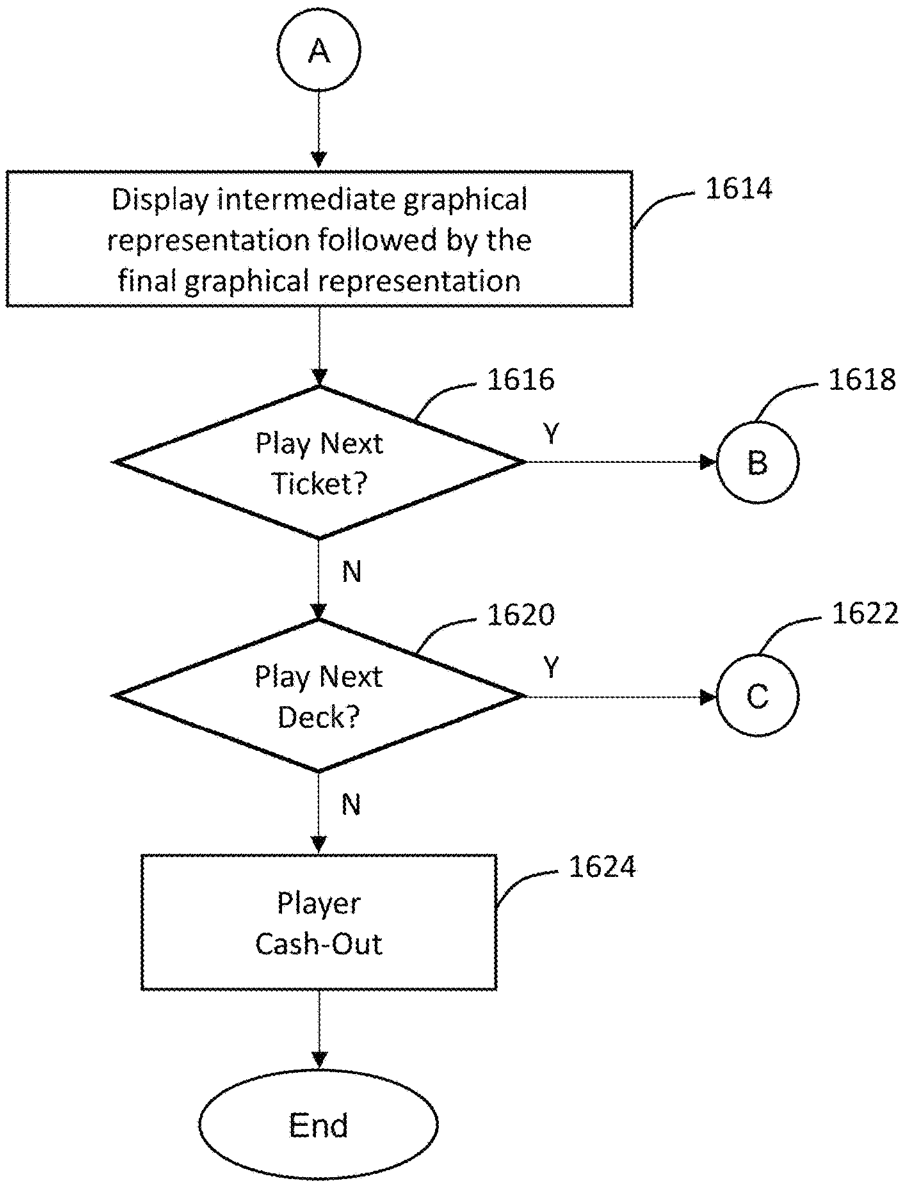

The pre-play selection is not limited to multiple electronic pull-tab decks. FIG. 16A and FIG. 16B show a flowchart for a pull-tab gaming method 1600 with pre-play selection for a single deck. At block 1602, the wagering system 102 provides a finite pool deck that includes a plurality of predetermined electronic pull-tab results with at least one winning ticket. The finite pool deck includes a plurality of predetermined electronic pull-tab results with at least one winning ticket. In one illustrative embodiment, the wagering system 102 may have a local server that synchronizes with a remote server periodically.

At block 1604, the gaming client device 108 displays a pre-play selection instruction and receives a pre-play selection input that includes at least one pre-play selection image.

At block 1606, the gaming client 108 receives the pre-play selection input before initiating a game play instruction. More specifically, the gaming client displays a pre-play selection instruction to the player, and the gaming client then receives a pre-play selection input from the player. The pre-play selection input includes at least one pre-play selection image.

The gaming client 108 may receive a plurality of pre-play selection game inputs, in which each pre-play game input is received before the game play instruction is received. Each pre-play selection game input is associated with a pre-play game selection image so that when the winning ticket is received by the gaming client, a plurality of images that correspond to the plurality of pre-play selection game inputs are displayed on the gaming client 108.

At block 1608, the gaming client 108 then receives the game play instruction. The gaming client receives the pre-play selection input before initiating a game play instruction. The gaming client receives the game play instruction and transmits the game play instruction to the wagering system 102. In one embodiment, the game play instruction includes receiving a bet amount which is associated with a player wager. In another embodiment, the game play instruction includes receiving a play game instruction received from a play button.

At decision diamond 1610, a determination is made if the gaming client 108 received a winning ticket. A winning ticket, determined by the wagering system 102, is transmitted from the wagering system 102 to the gaming client 108. The winning ticket includes a final awarded prize.

If the wagering system 102 transmits a winning ticket that includes at least one final awarded prize in response to the gaming client 108 receiving the game play instruction, then the method proceeds to block 1612 where the first graphical representation that includes a payline is displayed. If a winning ticket is not received by the gaming client 108, the gaming client 108 may receive a game play instruction that requests another ticket from the wagering system. Of course, the player may also cash-out during game play as reflected by block 1624.

If the gaming client receives the winning ticket at decision diamond 1610, the method continued to block 1612 where the gaming client displays a first graphical representation combination that indicates the winning ticket has been received by the gaming client. In the illustrative embodiment, the winning ticket transmitted by the wagering system 102 includes a final awarded prize.

In another embodiment, the gaming client 108 transmits the pre-play selection input to the wagering system 102 and the wagering system 102 associates the pre-play selection image with one or more winning tickets. The pre-play selection image associated with the winning ticket is then transmitted from the wagering system 102 to the gaming client 108.

In the illustrative embodiments presented herein the first graphical representation includes a set of payline symbols that reveals a non-zero winning tickets has been received by the gaming client device. Additionally, the payline symbols include a watermark. The watermark is used to make the payline unique-so that when the player checks the paytable for the specific watermark, the player can determine the awarded prize.

In the illustrative embodiment, the combination of the watermark and the payline symbols can then be looked up on a paytable to determine the final awarded prize. The player can perform the action of analyzing the payline symbols and the watermark to identify the prize associated with the winning ticket. Thus, the awarded prize may be revealed without a roll-up.

After displaying the first graphical representation combination, the method proceeds to block 1614 in FIG. 16B where the gaming client device 108 displays an intermediate graphical representation that includes the animated roll-up associated with the pre-play selection image. The intermediate graphical representation is presented after displaying the first graphical representation combination. The pre-play selection image may be associated with the winning ticket and the corresponding final awarded prize. Thus, the final awarded prize may include the pre-play selection image.

After the payline symbols including the watermark are displayed in the first graphical representation, the animated roll-up is initiated. Although, the gaming client device may automatically indicate the prize awarded by displaying the prize associated with the winning ticket, the animated roll-up provides a more entertaining reveal than having the gaming client present the awarded prize with the first payline symbol combination. Also, the animated roll-up embodiment presented herein provides a more entertaining reveal than having a player perform the payline and watermark look-up operation with a paytable.

The "animated roll-up" described above is an intermediate graphical representation that is displayed after the first set of payline symbols, and the watermark are presented in the first graphical representation. The animated roll-up is an animation of the awarded prize with intermediate graphical representation that are separate from the first set of payline symbols, i.e., the first graphical representation. The animated roll-up may include a pre-play selection of symbols that are used to customize the reveal of the awarded prize as described herein.

The animated roll-up may include a pre-play selection image or pre-play selection animation. Pre-play selection refers to the gaming client device displaying a pre-play selection instruction that is associated with at least one pre-play selection image. The gaming client receives the pre-play selection input before initiating a game play instruction at block 1608. When the gaming client receives a winning ticket, the gaming client displays the payline symbol combination that includes the watermark, which indicates the winning ticket has been received by the gaming client. The gaming client then displays an intermediate graphical representation that includes the pre-play selection image. The final awarded prize in the animated roll-up may include the pre-play selection image.

The animated roll-up does not require a pre-play selection. However, the pre-play selection customizes the player experience and may be more entertaining that a standard animated roll-up. Additionally, persons have the benefit of this disclosure shall appreciate that the pre-play selection described herein may operate without an animated roll-up. Further, the pre-play selection image may be associated with the payline in the first set of payline symbols as described herein.

As previously stated, the final graphical representation includes the payline symbols, the watermark, and the final awarded prize.

At decision diamond 1616, a play next ticket instruction may be received by the gaming client 108. If the play next ticket instruction is an affirmative instruction, the method proceeds to bubble B 1618 where the gaming client receives a game play instruction at block 1608. Note, the pre-play selections may be preserved, i.e., stored, for the next round of game play. If the play next ticket instruction is a negative instruction, the method proceeds to decision diamond 1620.

At decision diamond 1620, a play next deck instruction may be received by the gaming client 108. Thus, the player may elect to play another deck having a different denomination or the player may elect to play another game. If the player decides to play another denomination, which would be associated with another deck, the method proceeds via bubble C 1622 to block 1608 where the gaming client receives a game play instruction. The pre-play selections may be saved for the next game. If the play next deck instruction is negative, then the method proceeds to block 1624 where the player cashes out.

Note, a game play instruction includes an instruction to play a ticket, or the next ticket, or to play a next deck, or to cash-out as shown in block 1624.

Also, the pre-play selection image may be stored for the various game play instructions that may be subject to engineering design constraints.

Referring now to FIGS. 17A through 17C, there is shown another illustrative electronic pull-tab game 1700 entitled The House on Haunted Hill that includes a plurality of pre-play selections associated with a single deck. More particularly, the player is presented with three different pre-play selections. The pre-play selections include an emblem, a key, and a character.

Screenshot 1702 in FIG. 17A includes five pre-play selection emblems that the player may select from. The emblems include the numbers 7, 11, 153, a bird symbol, and a skull symbol. In FIG. 17B, the player is asked to choose a key in screenshot 1704 from four keys that have different bows, namely, a diamond bow, a spades bow, a hearts bow, and a club bow. In FIG. 17C, screenshot 1706 asks the player to choose a character. Three different characters are presented, namely, a female character, a first male character, and a second male character that looks like Milton Berle.

The player's pre-play selections are shown in the small window on the right side of the screenshot that includes the emblem 13 1708, the spade shaped key 1710, and the second male character 1712. The player's pre-play selections may be viewed and changed by selecting the arrow 1714 adjacent to the small window.

Referring to FIG. 17D there is shown a screenshot 1720 displaying a losing grid of symbols 1722. Note that the symbols displayed on the 3×3 grid do not include any of the player selected symbols.

Referring to FIG. 17E, a first graphical representation combination with watermark is displayed with payline symbols in screenshot 1724 because a winning ticket has been received by gaming client device 108. The diagonal payline symbol combination informs the player that a winning ticket has been received by the gaming client device 108. In the illustrative embodiment, the diagonal payline symbol combination includes two (2) clocks and a watermarked third clock 1726.

In the illustrative embodiment, displaying of the payline symbol combination and the watermark is a game device Executable. In other embodiments, the displaying of the payline symbol combination and the watermark is a combination of a system-driven Game Event and a game device Executable. For example, after the winning ticket is received by the gaming client device 6, a game device Executable requests avatar information from the wagering system 8, which triggers a system-driven Game Event that communicates avatar information that is stored by the wagering system 8.

After the first graphical representation combination with watermark is display in screenshot 1724, the process of displaying the customized "animated roll-up" is initiated. As stated above, the animated roll-up corresponds to a intermediate graphical representation that includes one or more animations.

Referring to FIG. 17F there is shown a screenshot 1730 that presents the first part of the customized "animated roll-up," i.e., the animated roll-up. Recall, the animated roll-up corresponds to an intermediate graphical representation that includes one or more animations. For illustrative purposes only, the animated roll-up is performed as a game device Executable, although the animated roll-up may also be generated by having the game device Executable communicating with the wagering system 102 initiating a system-driven Game Event regarding the pre-selected symbols.

Since the player's pre-play selection included the number 13 for the emblem, the customized animated roll-up reveals the selection of the number 13 as an "advance" 1732 to the next customized animation shown in FIG. 17G. The advance may be considered a simulated prize. In FIG. 17G, the customized animated rollup continues by zooming and panning into the hallway where the door marked with the pre-selected Spade key was selected prior to committing the wager. Again, the player is informed that they "Advance" 1742 to the next stage of the customized animated roll-up. Again, the advance may be considered a simulated prize that does not affect the final awarded prize.

Referring to FIG. 17H there is shown a screenshot 1750 of a camera that zooms and pans to reveal the three characters. The player had previously selected the second male character 1752 that looked like Milton Berle, and a $300 final awarded prize is revealed and awarded to the player. The reveal of the $300 final awarded prize completes the intermediate graphical representation.

Referring to FIG. 17I there is shown a screenshot 1760 of the final graphical representation that includes the final awarded prize 1762 of $300, the payline clock symbols, and the watermarked clock 1726.

Figure 18A:
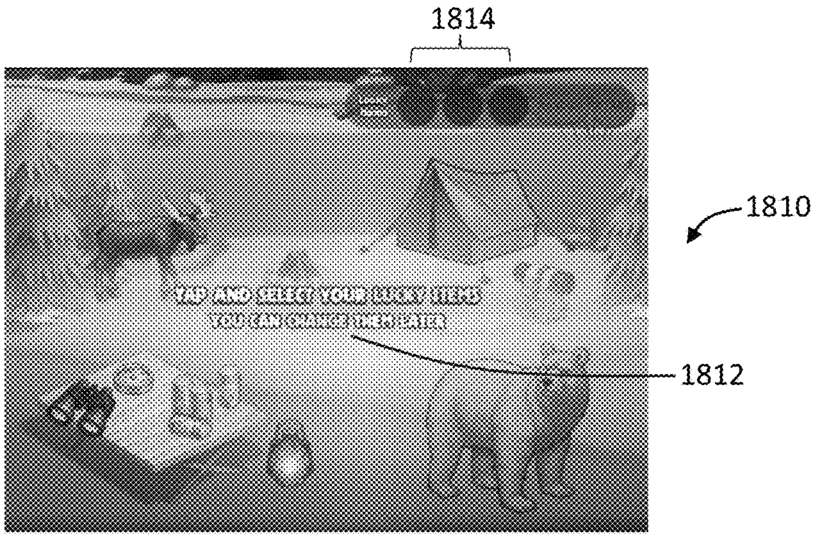

Referring to FIGS. 18A through 18I there is shown a Cash Mountain pull-tab game with pre-play selection for a single deck that also includes the watermarking feature. FIG. 18A presents the first screenshot 1810, which includes a prompt 1812 requesting that the player select their lucky items—these are the pre-play selections. There are three (3) empty spaces 1814 at the top of screenshot 1810 that indicate the lucky items that form part of the customized animated roll-up feature.

Figure 18B:
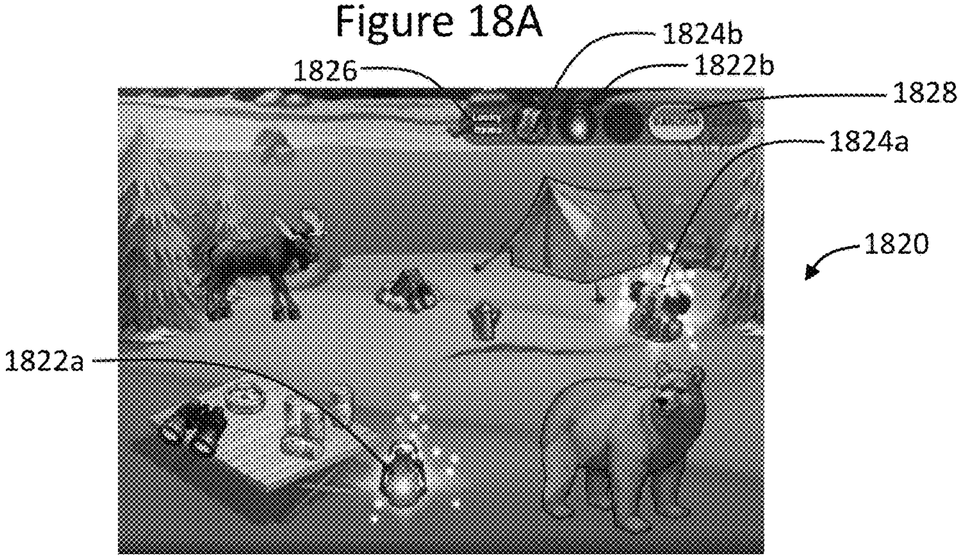

Referring to FIG. 18B there is shown a screenshot 1820, in which the player has selected two objects, namely, a lamp 1822*a* and a backpack 1824*a*. The selected lamp 1822*b* and backpack 1824*b* are also shown in the "lucky items" menu bar 1826, which is disposed at the top right-hand corner of screenshot 1820.

The menu bar 1826 indicates that the player should select three (3) items. Additionally, the player may randomly select objects by engaging the "random" button 1828 on the menu bar 1826.

Figure 18C:
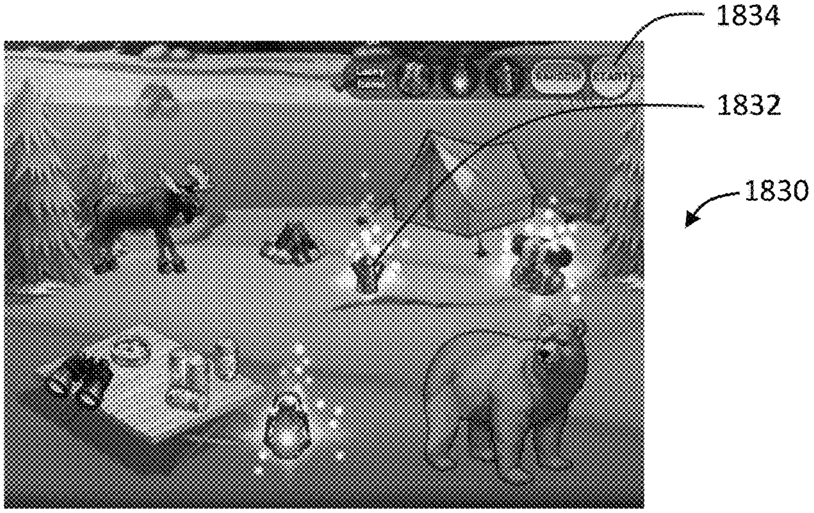
Figure 18D:

Referring to FIG. 18C there is shown screenshot 1830, in which the player makes the third selection, namely, a coffee pot 1832. Again, each of the three pre-play selections may be selected randomly.

The player then engages the "start" button 1834, which provides the game play instruction that requests a ticket from wagering system 102. A winning ticket is then received by the gaming client device 108. The receipt of the winning ticket is indicated by screenshot 1840, which is associated with FIG. 18D.

Screenshot 1840 includes a first graphical representation combination with three "cash mountain" symbols 1842 and a watermark 1844. However, the final awarded prize is not revealed on the payline. Note, the win meter 1846 displays the previously awarded prize and does not reveal the final awarded prize, which is e revealed via the customized animated roll-up.

The first graphical representation includes three "cash mountain" symbols 1842 and a watermark 1844. After the first graphical representation combination is displayed, then the customized animated roll-up begins in screenshot 1850 with a yeti 1852 selecting the "lucky items" to determine the final awarded prize. In an alternative embodiment, the players may choose to change their lucky items after the first graphical representation combination, but before the yeti begins selecting the lucky items.

Figure 18E:
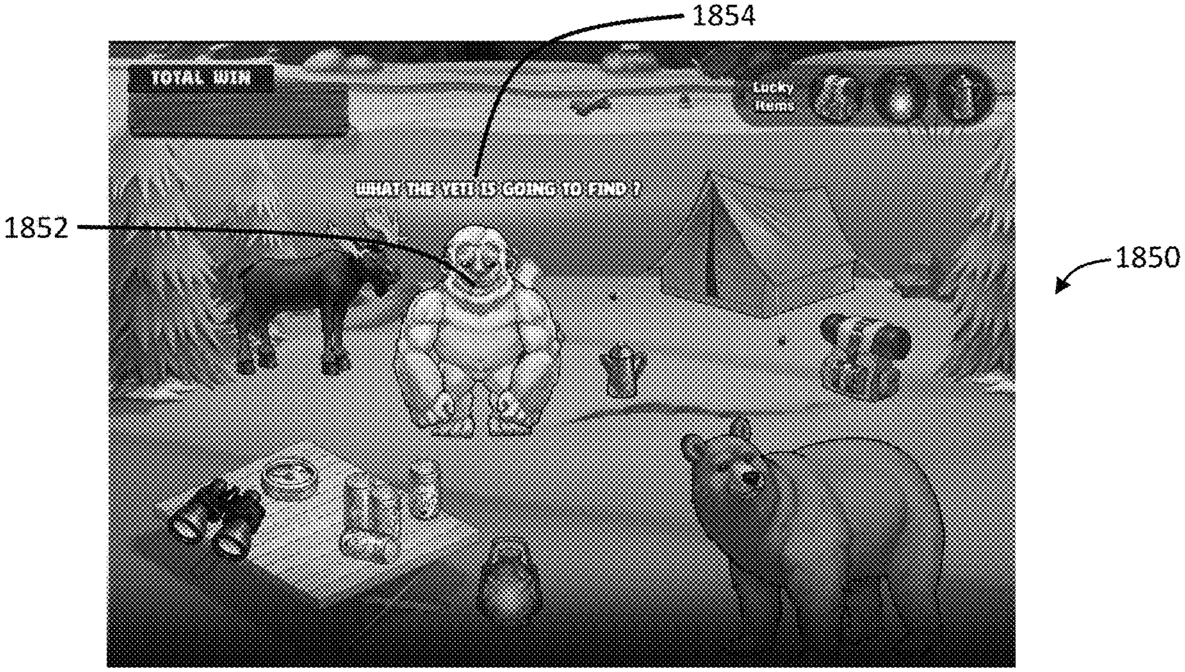
Figure 18F:
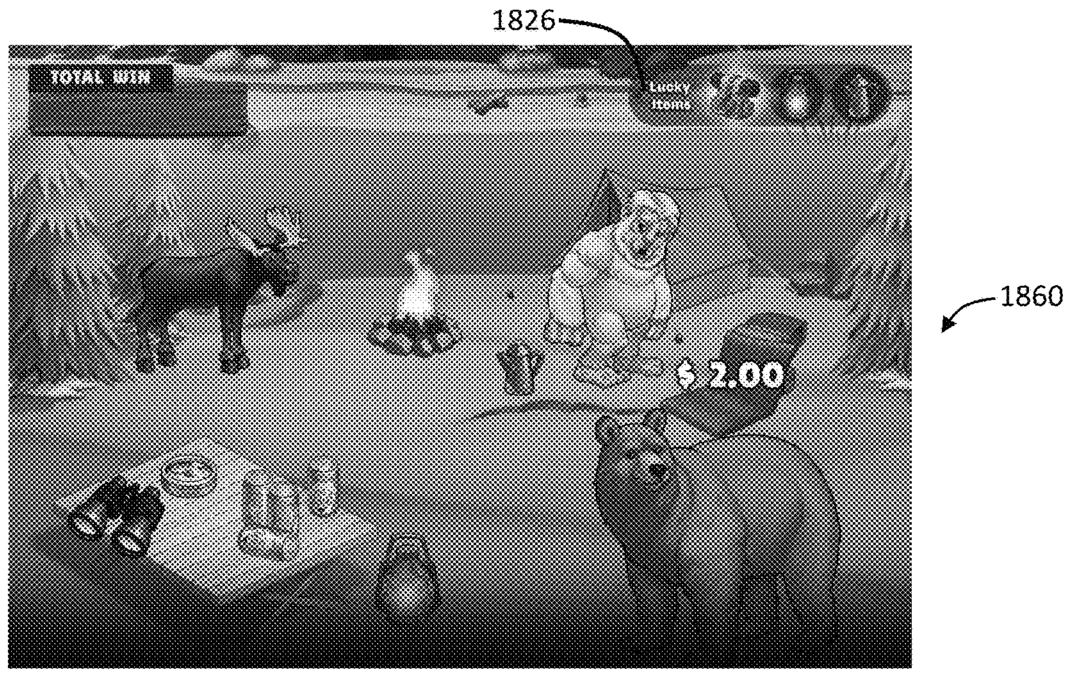

Referring to FIG. 18E, the screenshot 1850 with a yeti 1852 includes the prompt 1854 that states "what the yeti is going to find?" In this illustrative embodiment, the yeti 1852 selects items according to pre-play selection process described above in FIG. 18A through FIG. 18C.

Recall that pre-play selection "lucky items" include lamp 1822*a*, backpack 1824*a*, and coffee pot 1832. The pre-selected items are also shown in the "lucky items" menu bar 1826 at the top right-hand corner of screenshot 1860 associated with FIG. 18F. Screenshot 1860 shows the yeti selecting the backpack and a simulated prize of $2 is awarded.

Figure 18G:
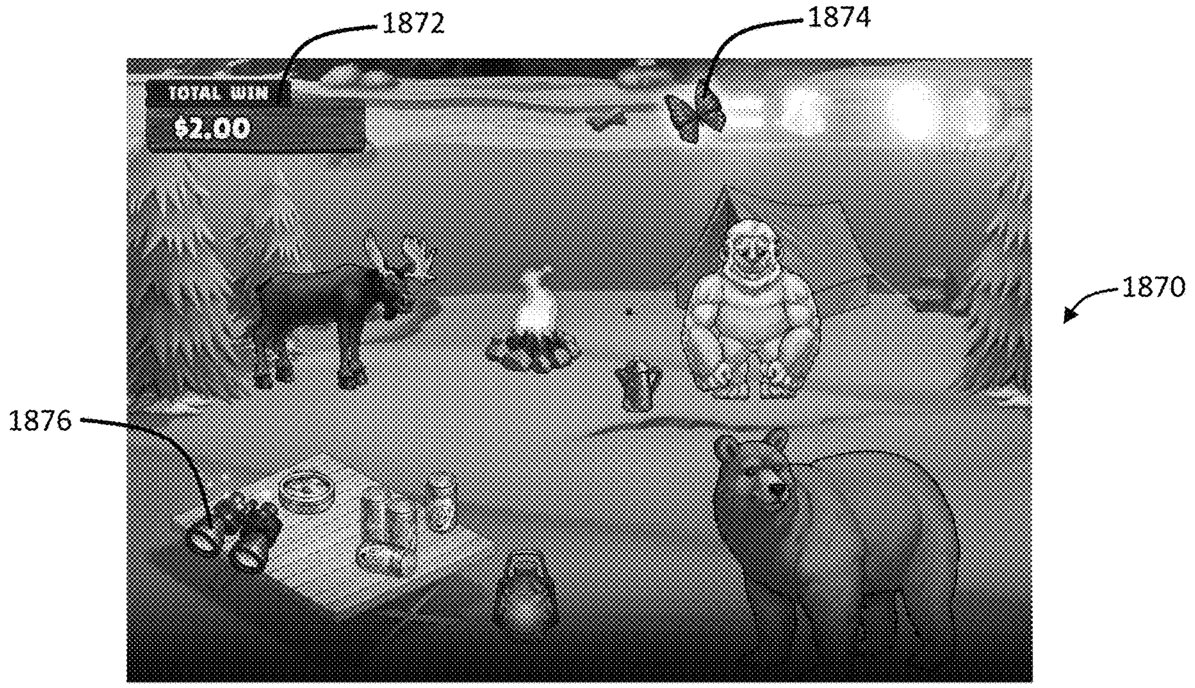

In FIG. 18G, screenshot 1870 updates the win meter 1872 with the $2 awarded prize from the backpack reveal. Additionally, a butterfly 1874 appears during the customized animated roll-up. The butterfly awards an additional lucky item and, thereby, extends the customized animated roll-up. Thus, the butterfly 1874 produces an extended animated roll-up prize that simulates randomly awarding an additional prize that extends the prize reveal.

Figure 18H:

More specifically, the butterfly 1874 proceeds to select the binoculars 1876 as shown in FIG. 18H, which shows a screenshot 1880 having an updated "lucky items" menu bar 1826 that includes the binoculars 1876. Thus, the butterfly simulates awarding a player an additional prize without changing the final prize awarded to the player.

Figure 18I:
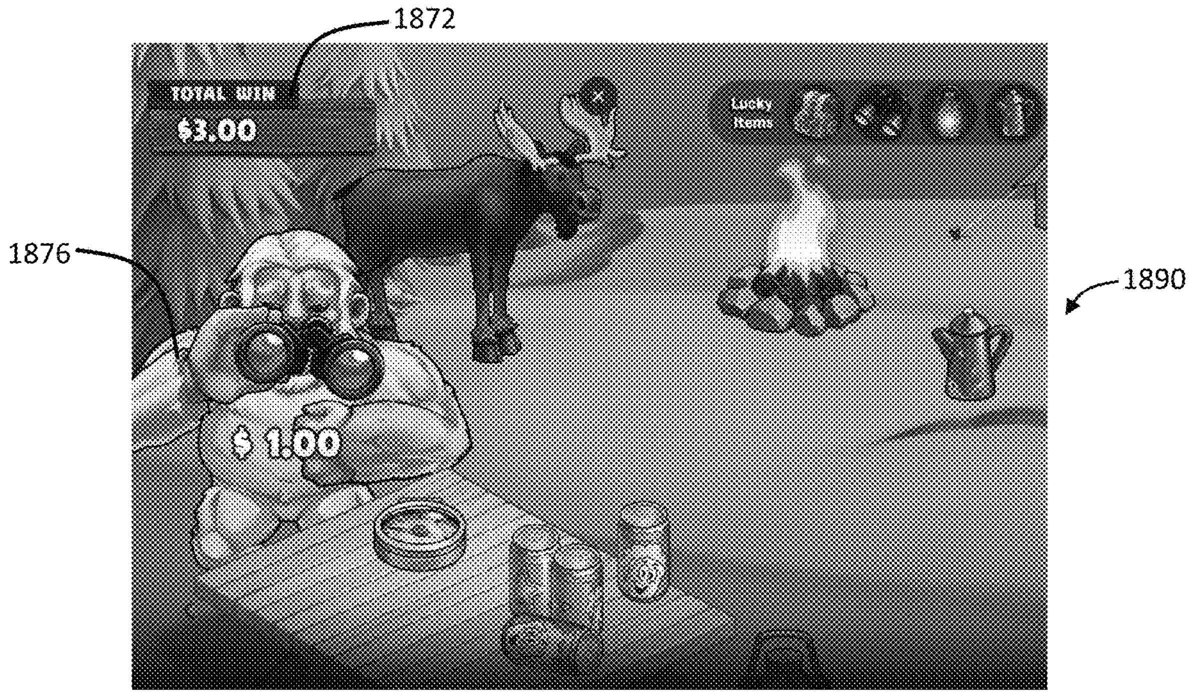

The yeti then moves towards the binoculars and as shown in FIG. 18I, the yeti reveals that there is a simulated $1 prize associated with binoculars 1876. The win meter is updated to $3 to include both simulated prizes associated with the yeti selecting the binoculars 1876.

The yeti continues to reveal prizes associated with the remaining items, namely, the lamp and the coffee pot. However, there are no prizes associated with the lamp and the coffee pot. Thus, the final awarded prize is $3, After the animated roll-up is completed, the final graphical representation (not shown) includes the final awarded prize 1872, which is overlaid on the three "cash mountain" symbols 1842 and a watermark 1844. After the final graphical representation is completed, the round is over.

The customized animated roll-up with pre-play selection and an extended roll-up that simulates awarding an additional prize is shown in FIG. 18A through FIG. 18I and the related text. More specifically, the customized animated roll-up shown in FIG. 18A through FIG. 18I simulates awarding a bonus, namely, awarding a simulated prize such as an additional "lucky Item", e.g., the binoculars, that appear to increase the award. The process of simulating the awarding of an additional lucky item extends the animated roll-up because the additional animation in FIG. 18I simulates a bonus of $1. As previously stated, the final prize awarded via the animated roll-up matches the winning electronic pull-tab ticket prize.

Figure 19A:
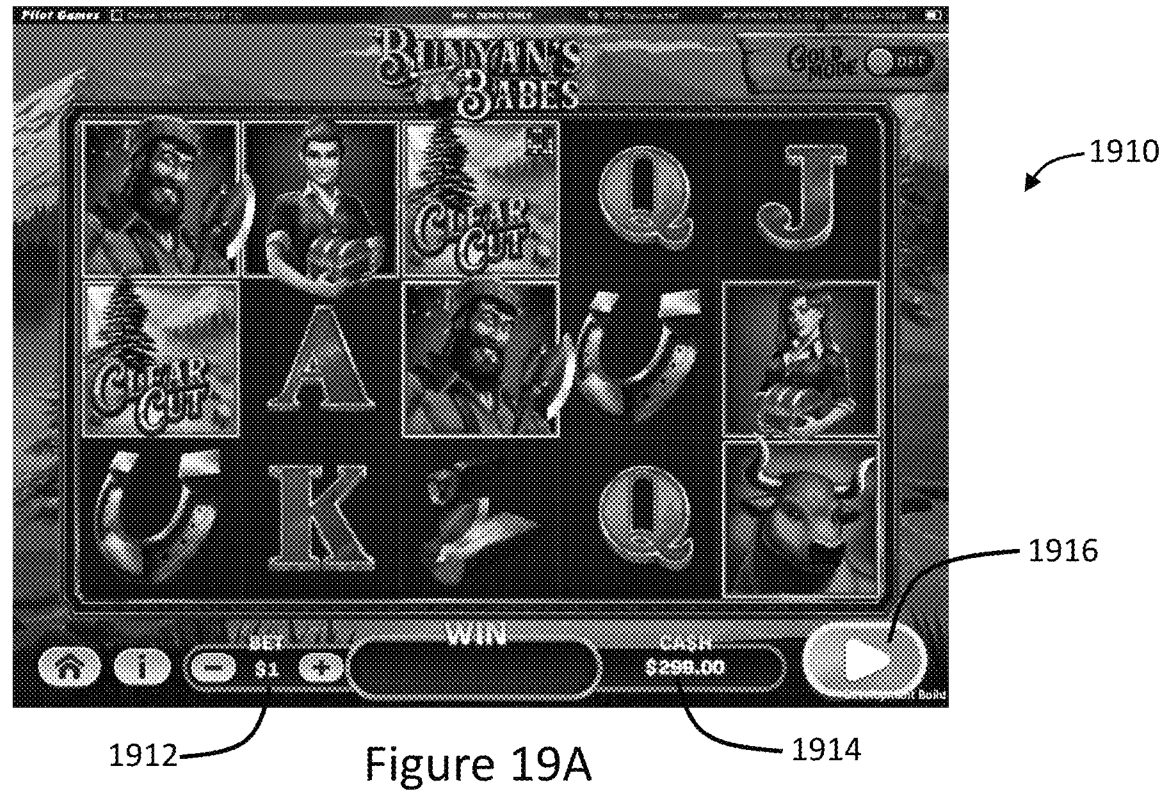
Figure 19B:

Referring now to FIG. 19A there is shown a game entitled Bunyan's Babes that also includes an extended roll-up game feature, however, without the pre-play selection feature. The extended animated roll-up prize feature simulates randomly awarding an additional prize, e.g. a bonus and/or free play, that extends the animated prize-roll up. The extended animated roll-up is part of the standard animated roll-up (no pre-play selection). As previously described, the final awarded prize matches the winning ticket prize received by the gaming client device.

The first screenshot 1910 corresponding to FIG. 19A shows the game before receiving a game play instruction 124. Again, Bunyan's Babes does not include a pre-play selection game feature.

During the first illustrative round, the bet amount meter 1912 reads $1 and the cash meter 1914 reads $299. The gaming client device receives a game play instruction when the player hits the play button 1916. In screenshot 1920, a winning ticket is received that presents a traditional roll-up, which includes the payline of J symbols 1922 and the final awarded prize 1924 of $0.50. Thus, an animated roll-up is not presented in FIG. 19B.

The player then proceeds to initiate the next round by engaging, again, the play button 1916 which causes the gaming client device to receive the wager, receive the game play instruction, and request electronic pull-tab gaming ticket from wagering system 102.

Figure 19C:

A winning ticket is, again, received by the illustrative gaming client device 108 in FIG. 19C. However, unlike screenshot 1920, a standard animated roll-up is presented—not a traditional roll-up. The first graphical representation includes three "clear cut" symbols 1932 and watermark 1934.

Figure 19D:

FIG. 19D presents a screenshot 1940 associated with the animated roll-up that reveals a preliminary prize of $4 caused by cutting three trees. More specifically, an animation is displayed that results in three trees 1942 being cut and the player being awarded two $1 prizes and one $2 prize. Additionally, screenshot 1940 includes a simulated prize of awarding the player an extra axe 1944 prize. The extra axe 1944 extends the animated roll-up and the extended animated roll-up feature is executed with extra axe 1944.

Figure 19E:
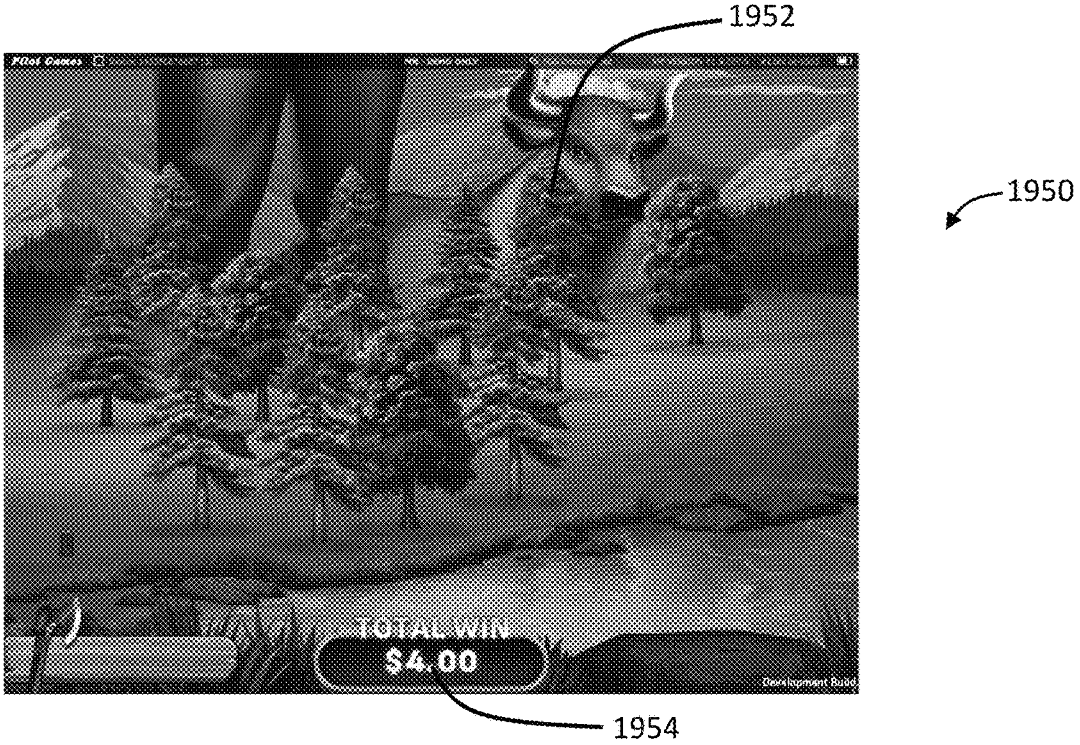

The extended animated roll-up is shown in FIG. 19E through FIG. 19H. The extended animated roll-up associated with the extra axe 1944 prize reveal is shown in FIG. 19E where the screenshot 1950 display another group of uncut trees 1952 by performing a screen shift from FIG. 1D (displaying cut trees) to FIG. 19E (displaying uncut trees). During a screen shift, the camera view pans from an initial location to another location that is typically adjacent to the initial location. The camera view may shift in a variety of directions including, but not limited to, a horizontal shift, a left shift, a right shift, a vertical shift, an upward shift, a downward shift, a diagonal shift, and any combination thereof. Screenshot 1950 also acknowledges the simulated prize of $4 in the win meter 1954.

Figure 19F:

The extra axe 1944 then proceeds to chop down the different set of trees shown in screenshot 1950, which result in the chopped trees 1962 shown in screenshot 1960 of FIG. 19F. Screenshot 1960 shows that three trees have been chopped and two $1 prizes and one $2 prize are awarded. Thus, in addition to the first simulated prize of $4 shown in FIG. 19D, the extended animated roll-up resulted in another simulated prize of $4.

Figure 19G:
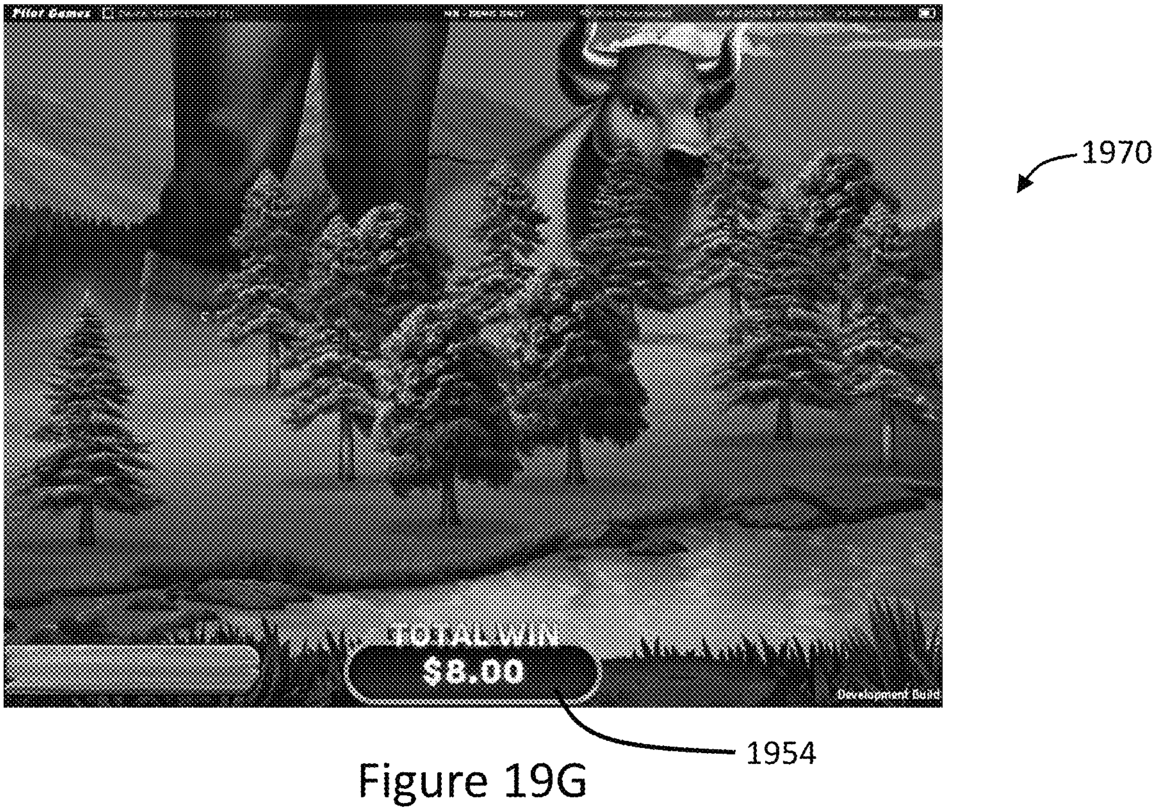
Figure 19H:

The extended animated roll-up then proceeds to FIG. 19G where a final awarded prize of $8 is presented in win meter 1954 at screenshot 1970. At FIG. 19H, the final graphical representation is shown with the first clear cut symbol combination, the watermark, and the final awarded prize 1982 of $8. The final awarded prize 1982 of $8 is overlaid on the three clear cut symbols 1932 and watermark 1934 and round is over.

Referring to FIG. 20A through FIG. 20L, there is an animated roll-up that includes a Picture-in-Picture (PiP) game play feature for the Go4Gold game 2000. In summary, the PiP game play feature reveals the awarded prize using a secondary display that is initially in the background- and then the background display moves to the foreground during the prize reveal as shown below in the Go4Gold game. Thus, the background display becomes a foreground display with the PiP feature. The Go4Gold game 2000 has a stadium background that is filled with people and includes a jumbotron, which forms the secondary display as described in further detail below.

Figure 20A:
Figure 20B:

In FIG. 20A, a screenshot 2010 is presented that includes a zero-win, i.e., losing, outcome. The bet meter 2012 reads a $1 bet and the cash meter 2014 reads $304.40 and the win meter 2016 reflects that a zero-win ticket was received by the gaming client device 108. The illustrative Go4Cold game does not include the pre-play selection feature described above. In the illustrative embodiment, the gaming client device 108 receives a game play instruction when the player hits the play button 2016.

FIG. 20A shows the result of the first illustrative round, in which a winning ticket is received, and a traditional roll-up is presented in screenshot 2020 in FIG. 20B. More specifically, a payline of J symbols 2022 and the final awarded prize 2024 of $0.50 is displayed on the gaming client device 108. An animated roll-up is not presented in FIG. 20B.

The player then proceeds to initiate the next round by engaging, again, the play button 2016 which causes the gaming client device to receive the game play instruction, receive a wager, and request an electronic pull-tab gaming ticket from wagering system 102.

Figure 20C:
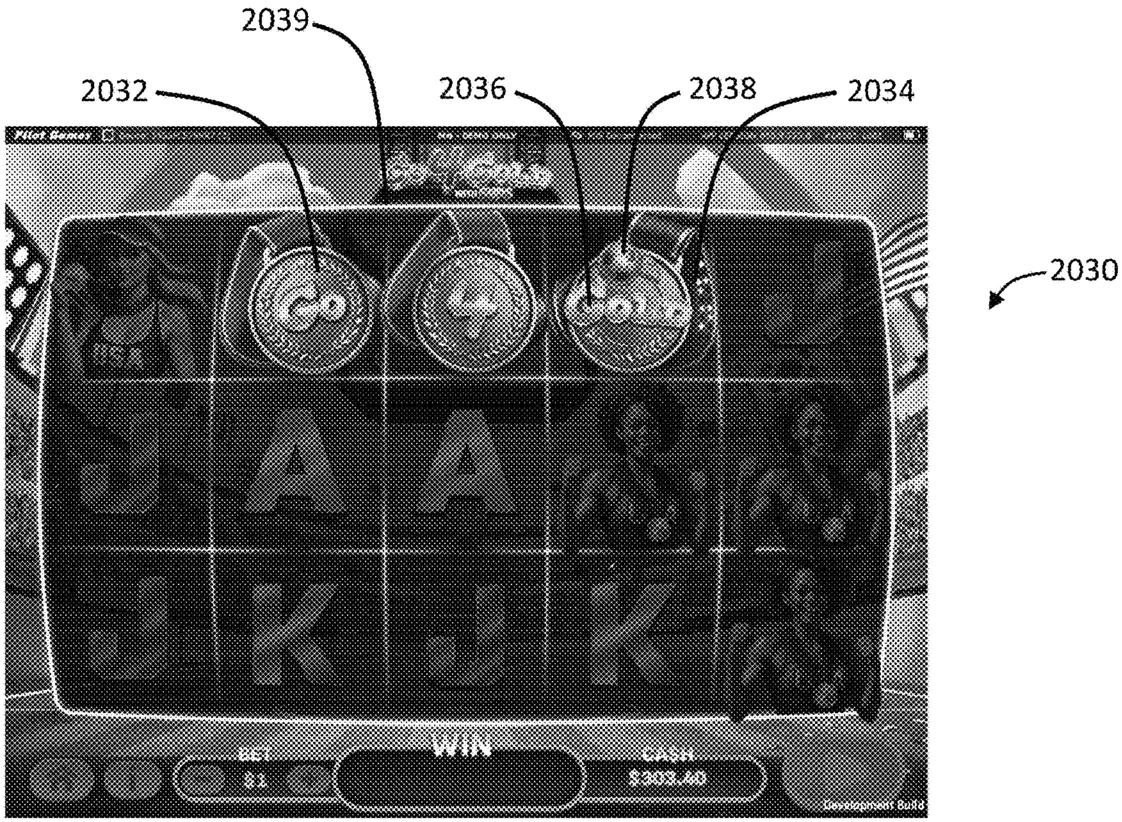

A winning ticket is received by the illustrative gaming client device 108 in FIG. 20C. Screenshot 2030 presents a first graphical representation, which includes three gold medal symbols 2032. The watermark 2034 is disposed on the third gold metal symbol in the red ribbon. Additionally, the gold symbol 2036 includes a soccer ball 2038. The soccer ball 2038 indicates that the standard animated roll-up has a soccer theme.

A jumbotron 2039 is in the background of the 3×5 symbol matrix of screenshot 2030. The illustrative standard animated roll-up then proceeds to zoom into jumbotron 2039. A jumbotron is a large video display screen used in venues such as sport stadiums.

Figure 20D:
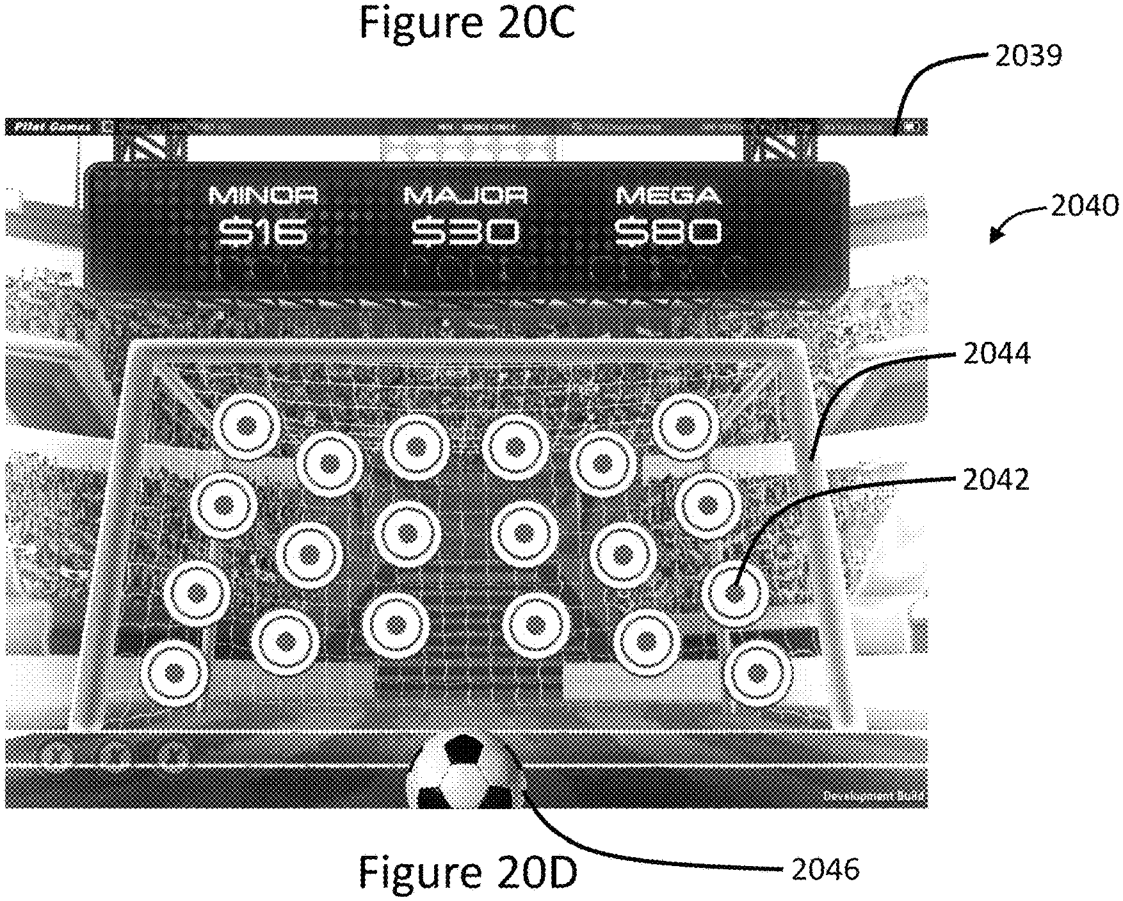

Referring to FIG. 20D there is shown a screenshot 2040 of the jumbotron 2039 after the standard animated roll-up zooms into the jumbotron. The jumbotron screenshot 2040 includes a variety of targets 2042 inside a soccer goal net. The targets are bounded by the soccer goal post 2044 and a soccer ball 2046 is shown in the foreground of screenshot 2040. Large prizes are presented as a Minor prize, Major prize, and a Mega prize at the top of screenshot 2040.

Figure 20E:
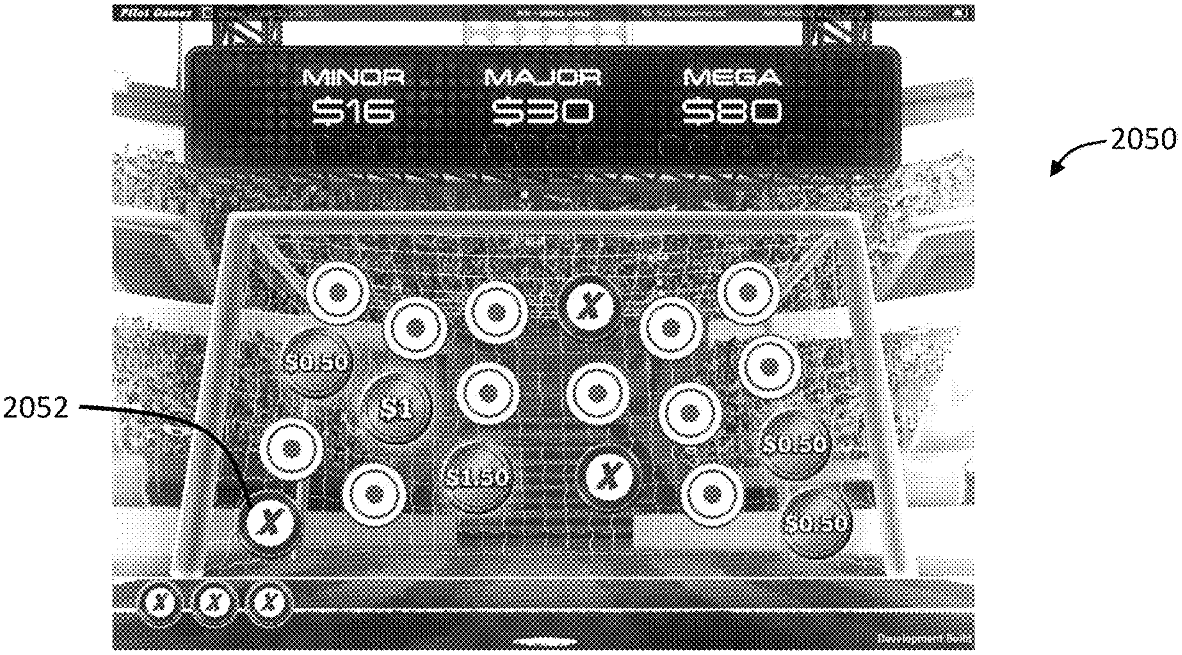
Figure 20F:

Referring to FIG. 20E there is shown a simulated penalty kick process in the Go4Gold game 2000, in which the soccer ball hits the targets 2042. The standard animated roll-up proceeds by simulating multiple penalty kicks striking the targets and awarding prizes until three strikes 2052 are revealed. The standard animated-roll-up reveals that five (5) prizes were awarded during the penalty kick phase. The five prizes consist of three (3) $0.50 prizes, one (1) $1.00 prize, and two (2) $1.50 prizes. Referring to FIG. 20F, the total of the final awarded prize 2062 is $4.00 and screenshot 2060 reveals the $4.00 prize.

Figure 20G:
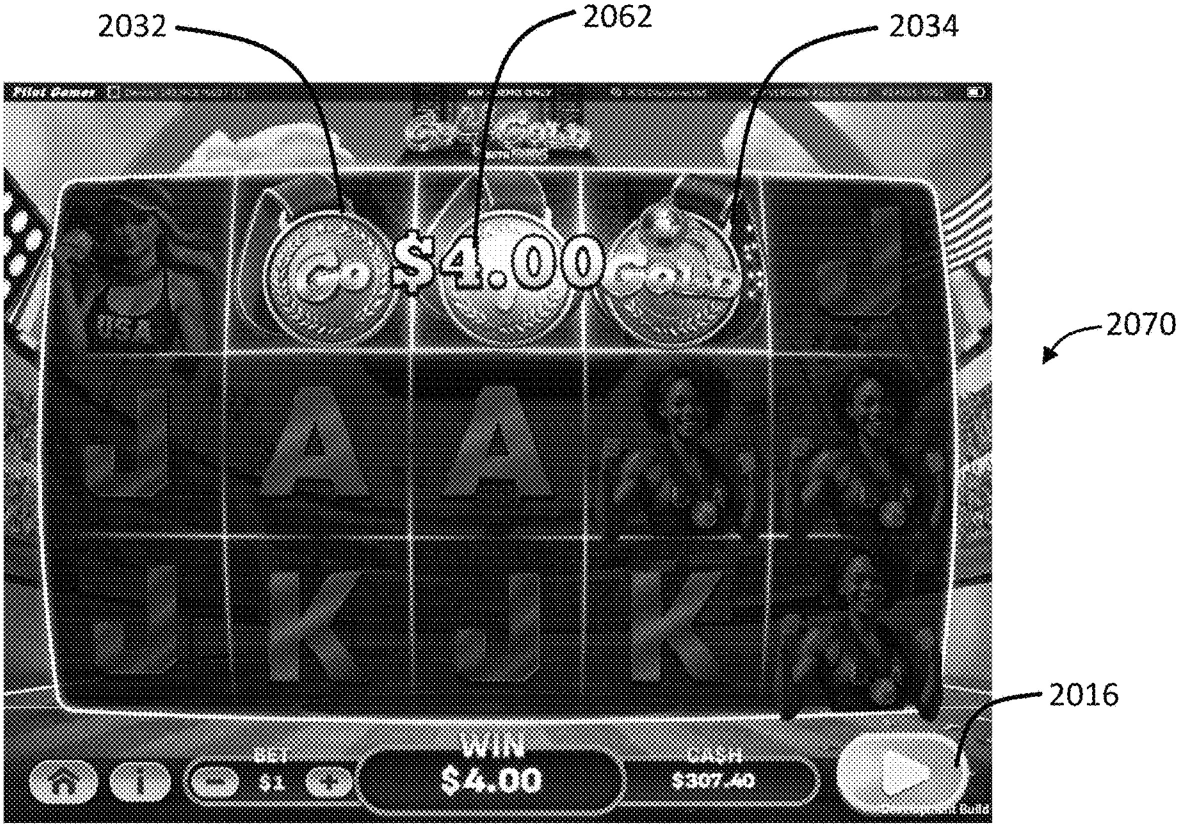

In FIG. 20G, the final graphical representation is shown, which includes the final awarded prize 2062, e.g., $4.00, the gold medal symbol combination 2032, and the watermark 2034.

The player then proceeds to initiate the next round of game play by engaging, again, the play button 2016 which causes the gaming client device to receive the game play instruction and request an electronic pull-tab gaming ticket from wagering system 102. Again, Go4Gold does not include the pre-play selection feature.

The game play instruction causes the gaming client device 108 to request an electronic pull-tab ticket from wagering system 102. The gaming client device 108 then receives a winning ticket, and the first graphical representation combination and watermark indicate a winning ticket has been received.

Figure 20H:
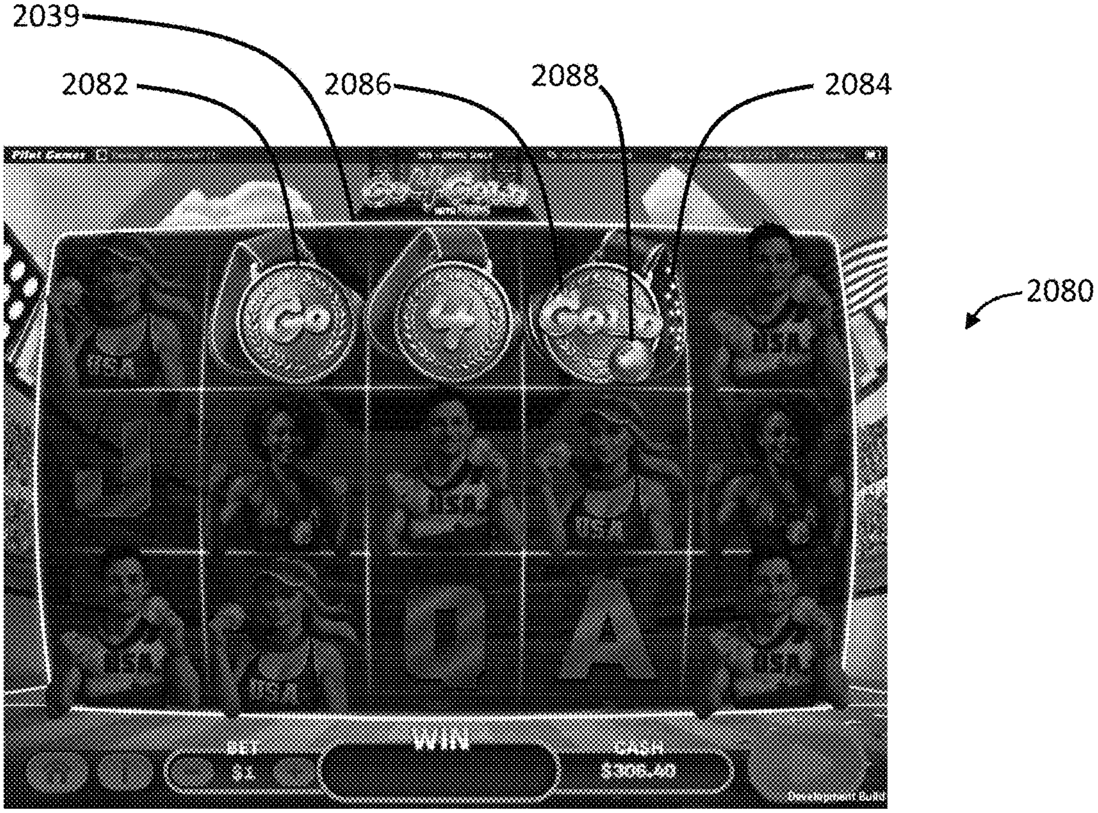

More specifically, FIG. 20H shows screenshot 2080 that includes gold medal symbols 2082 and watermark 2084 shown, which indicates that another winning ticket has been received by the gaming client device 108. Again, the final awarded prize is not revealed and first graphical representation includes the payline symbols and watermark.

The third gold medal symbol 2086 includes a shot put 2088, which indicates that the prize reveal is associated with a shot put themed animated roll-up. Also, the jumbotron 2039 is in the background of the 3×5 symbol matrix of screenshot 2080. The illustrative standard animated roll-up then proceeds to zoom into jumbotron 2039. A jumbotron is a large video display screen used in venues such as sport stadiums.

Figure 20I:
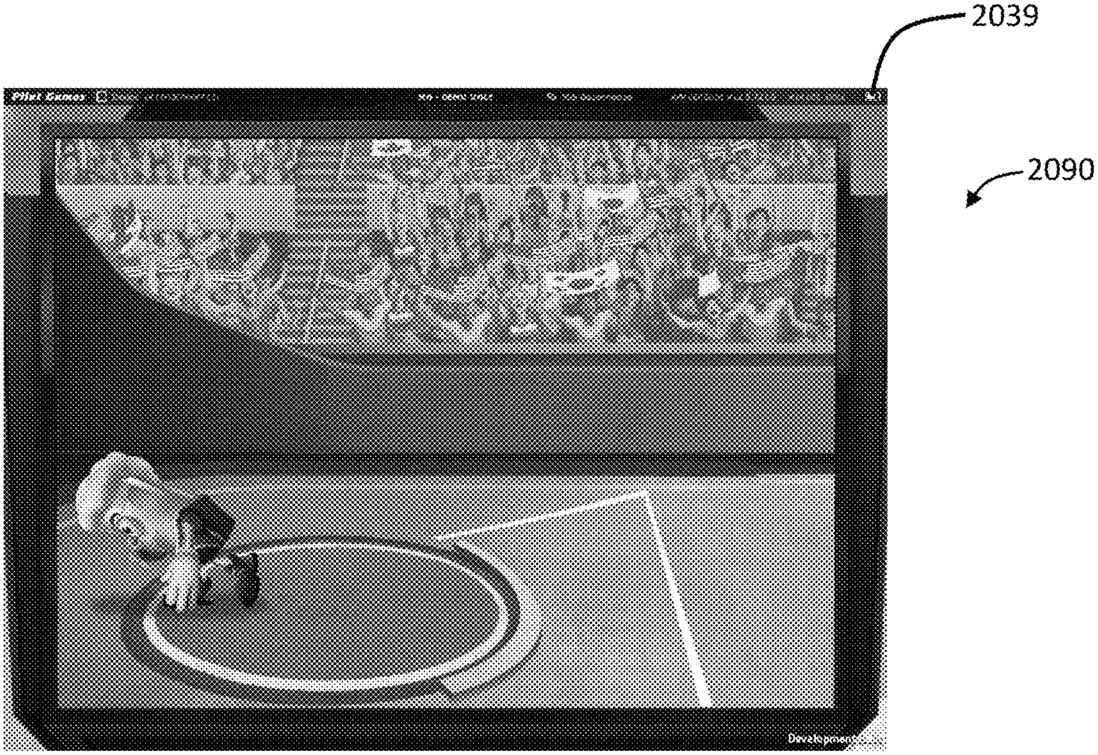

Referring to FIG. 20I there is shown a screenshot 2040 of the jumbotron 2039 after the standard animated roll-up zooms into the jumbotron. The jumbotron screenshot 2090 includes an image of Suds resting the shot close to his neck and preparing to throw. Suds is inside the shotput circle and preparing to complete the throw from inside the shotput circle.

Figure 20J:
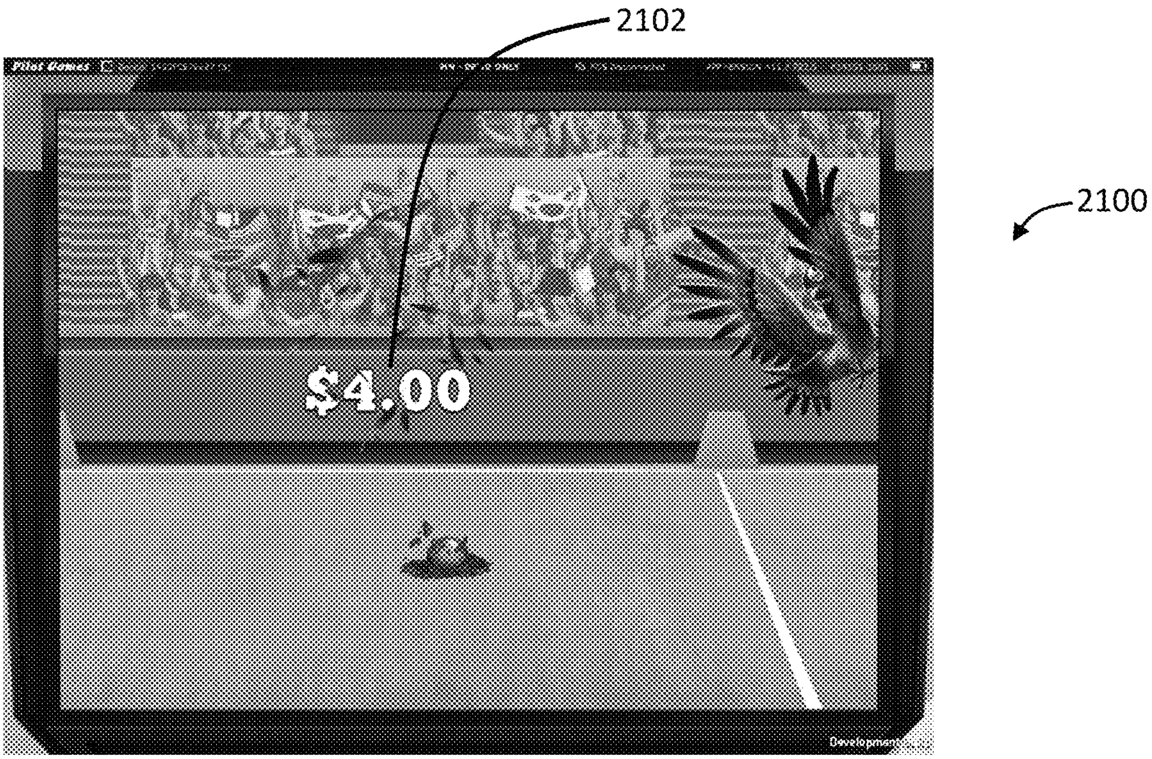
Figure 20K:

The standard animated roll-up then proceeds to FIG. 20J, where the screenshot 2100 shows that the shot landed inside the sector lines and a final awarded prize 2102 of $4.00 is shown. There are no simulated prizes in the standard animated roll-up and the final awarded prize 2112 is shown in FIG. 20K where the final awarded prize is presented in screenshot 2110.

Figure 20L:

In FIG. 20L, the final graphical representation for the shot put round is completed when the final awarded prize 2112, e.g., $4.00, is revealed in combination with the gold medal symbol combination 2082 and the watermark 2084.

While some of the illustrative embodiments presented above teach a single row game display area, the term "row" is interchangeable with similar terms, such as "grid," "column," or "reel," unless otherwise stated herein. Further, a grid may comprise a single row, a single column, multiple rows, and/or multiple columns, and is not limited to the illustrative embodiments presented herein. Furthermore, each row or column of a grid is not limited to particular game symbol display positions and may include more or fewer game symbol display positions. The size and number of symbols may vary according to the gaming engineering constraints such as display size, game features, game play and other such engineering constraints.

In other embodiments, the game prizes may be presented to players using a variety of visual constructs. For example, a wheel constructed of wedge slices may be used to display the game prizes, where each slice may represent one or more prizes or tickets. One of skill in the art would recognize from this description that the presentation of prizes need not be limited to symbol arrays, grids or wheels, and any construct may be used to display the game prizes.

In the illustrative embodiment, each finite pool deck includes a plurality of predetermined electronic pull-tab results, in which each deck has an associated paytable that reflects a particular game volatility for each deck. Additionally, the selection instructions of the illustrative embodiment include selecting an avatar that is associated with a particular deck.

The illustrative gaming systems and methods presented above may include a plurality of server applications that configured to provide high-availability and redundancy, processes all inputs, generates outputs, and maintains a central database for accounting, game play, system configuration data, and other such data types. By way of example and not of limitation, critical system data regarding clients may be maintained in a repository associated with the illustrative gaming system. Historical games results and leader board information may be maintained. Printable versions of this information may be available on a portal.

The illustrative client devices described in the illustrative embodiments are communicatively coupled to a gaming system database, which stores client device data. Additionally, the illustrative gaming system database is configured to be secure. Furthermore, the illustrative gaming system database manages the data that is received from client devices in geographically dispersed gaming venues.

The illustrative centralized gaming system may be disposed in a central site as described. The illustrative centralized gaming system may process information received over the internet backbone from client devices such as mobile devices, management terminals and other such client devices.

The illustrative wagering system manages the funding of game play and operation of wagering games and overall system management. All gaming messaging between servers and client devices is sent and received over a secure internet network that directs network traffic to the appropriate server elements. A portal service receives messages from management terminals and provides functionality to authorized users to control the system and access real-time and historical data. All server applications are structured to be deployable in a virtual server environment, configured for high availability with fail-over capabilities on hardware components and database structures that keep a multiplicity of all data records.

By way of example and not of limitation, the games supported by the wagering system include electronic pull-tabs, electronic pull-tab tournaments, multiple chance pull-tabs, linked bingo, high-speed linked bingo with entertainment, bingo tournaments, slot games, video poker, multi-player poker, blackjack, roulette, and other casino or entertainment games.

Many game types, including electronic pull-tabs and the entertainment aspect of linked bingo may have bonus modes that award prizes based on a theme-specific animation. Often these features take more play time than a conventional game. While these features are entertaining, many players who have played the games for some period of time find the time spent in animation wasteful. Therefore, this system features a unique system driven Game Event at the beginning of any potentially long animation, bonus or otherwise where the player is presented with a screen announcing the animation and then is presented with opportunity to input a Game Action to proceed with the animation or bypass the animation and go directly to the final awarded prize at the end of the animation.

The watermarked virtual pull-tab gaming system and method can support a wide variety of game types, in addition to the ones described above. By way of example and not of limitation, the games type that include slot machine games, video lottery games, poker, blackjack, skill-based wagering games, and other such game types. With respect to security and/or cybersecurity issues, the illustrative systems and methods described may require different security measures that conform to jurisdictional gaming requirements.

It is to be understood that the detailed description of illustrative embodiments are provided for illustrative purposes. Thus, the degree of software modularity for the systems and methods presented above may evolve to benefit from the improved performance and lower cost of the future hardware components that meet the system and method requirements presented. The scope of the claims is not limited to these specific embodiments or examples. Therefore, various process limitations, elements, details, and uses may differ from those just described, or be expanded on or implemented using technologies not yet commercially viable, and yet still be within the inventive concepts of the present disclosure. The scope of the invention is determined by the following claims and their legal equivalents.

What is claimed is:

1. A pull-tab gaming system comprising:

a wagering system that generates an electronic pull-tab deck which includes a plurality of electronic pull-tab tickets, wherein the electronic pull-tab deck includes a plurality of winning electronic pull-tab tickets having a non-zero prize value and each non-zero prize value electronic pull-tab ticket includes a watermark identifier and a final awarded prize that is associated with the watermark identifier;

a plurality of gaming clients communicatively coupled to the wagering system, wherein each gaming client includes a processor and a memory, in which the gaming client enters an idle state, in which the user device awaits receiving a game play instruction;

wherein the game play instruction received by a user interface causes the gaming client to transition from the idle state to a game execution state, in which the gaming client generates an electronic pull-tab request from the wagering system;

a non-zero electronic pull-tab ticket transmitted from the wagering system to the gaming client in response to the electronic pull-tab ticket request, wherein the non-zero electronic pull-tab ticket includes a watermark identifier associated with the final awarded prize;

the gaming client displaying at the user interface, for the non-zero electronic pull-tab ticket, a plurality of payline symbols associated with a first graphical representation and a watermark associated with the watermark identifier during a first graphical representation state, wherein the final awarded prize is not revealed by the first graphical representation;

the gaming client displaying at the user interface an animation that transitions the gaming client from the first graphical representation state to an intermediate graphical representation state, in which the watermark and the final awarded prize is not revealed in the intermediate graphical representation state;

the gaming client transitioning from the intermediate graphical representation state to a final prize state when the user interface displays a final graphical representation and the watermark after the intermediate graphical representation, wherein the final graphical representation includes the watermark, the plurality of payline symbols and the final awarded prize; and wherein the first graphical representation, the intermediate graphical representation state, and the final prize state are successive states associated with the gaming client receiving the non-zero electronic pull-tab ticket transmitted from the wagering system to the gaming client.

2. The pull-tab gaming system of claim 1 wherein the game play instruction includes receiving a bet amount which is associated with a player wager.

3. The pull-tab gaming system of claim 1 wherein the game play instruction includes receiving a play game instruction received from a play button.

4. The pull-tab gaming system of claim 1 wherein the animation of the intermediate graphical representation includes a simulated prize; and wherein the simulated prize does not affect the final awarded prize.

5. The pull-tab gaming system of claim 1 wherein the simulated prize extends the animation without affecting the final awarded prize.

6. The system of claim 1 further comprising a background display that is presented with the first graphical representation that includes the payline symbols;

wherein the animation zooms into the background display to present an exploded view of the background display;

the simulated prize revealed on the exploded view of the background display; and the final awarded prize presented on the exploded view of the background display.

7. A pull-tab gaming method comprising:

enabling a wagering system to generate an electronic pull-tab deck that includes a plurality of electronic pull-tab tickets, wherein the electronic pull-tab deck includes a plurality of winning electronic pull-tab tickets having a non-zero prize value and each non-zero prize value electronic pull-tab ticket includes a watermark identifier and a final awarded prize that is associated with the watermark identifier;

communicatively coupling a plurality of gaming clients to the wagering system, wherein each gaming client includes a processor and a memory;

entering an idle state in which a user interface awaits receiving a game play instruction;

receiving, via the user interface during the idle state, a game play instruction that transitions a gaming client from the idle state to a game execution state when the gaming client generates an electronic pull-tab request from the wagering system;

transmitting, by the wagering system, a non-zero electronic pull-tab ticket to the gaming client during the game execution state, wherein the non-zero electronic pull-tab ticket includes a watermark identifier associated with a final awarded prize;

transitioning, by the gaming client, to a first graphical representation state, in which a plurality of payline symbols and a watermark associated with the watermark identifier are displayed on the user interface, and the final awarded prize is not revealed by the first graphical representation state;

transitioning, by the gaming client, to an intermediate graphical representation state, wherein an animation is displayed by the user interface that follows the first graphical representation, in which the final awarded prize is not revealed by the intermediate graphical representation state;

transitioning, by the gaming client, to a final prize state, wherein a final graphical representation and the watermark is displayed by the user interface after the intermediate graphical representation; and wherein the first graphical representation, the intermediate graphical representation, and the final prize state are successive states associated with the gaming client receiving the non-zero electronic pull-tab ticket transmitted from the wagering system to the gaming client.

8. The method of claim 7 wherein the game play instruction includes receiving a bet amount which is associated with a player wager.

9. The pull-tab gaming method of claim 7 wherein the game play instruction includes receiving a play game instruction received from a play button.

10. The pull-tab gaming method of claim 7 wherein the animation of the intermediate graphical representation includes a simulated prize; and wherein the simulated prize does not affect the final awarded prize.

11. The pull-tab gaming method of claim 7 wherein the simulated prize extends the animation without affecting the final awarded prize.

12. The method of claim 7 further comprising providing a background display when displaying the first graphical representation;

zooming into the background display during the intermediate graphical representation state to generate an exploded view of the background display;

revealing the simulated prize on the exploded view of the background display; and revealing the final awarded prize on the exploded view of the background display.

13. A pull-tab gaming method comprising:

enabling a wagering system to generate an electronic pull-tab deck that includes a plurality of electronic pull-tab tickets, wherein the electronic pull-tab deck includes a plurality of winning electronic pull-tab tickets having a non-zero prize value and each non-zero prize value electronic pull-tab ticket includes a watermark identifier and a final awarded prize that is associated with the watermark identifier;

communicatively coupling a plurality of gaming clients to the wagering system, wherein each gaming client includes a processor and a memory;

entering an idle state in which a user interface awaits receiving a game play instruction;

receiving, via the user interface during the idle state, a game play instruction that transitions a gaming client from the idle state to a game execution state when the gaming client generates an electronic pull-tab request from the wagering system;

transmitting, by the wagering system, a non-zero electronic pull-tab ticket to the gaming client during the game execution state, wherein the non-zero electronic pull-tab ticket includes a watermark identifier associated with a final awarded prize;

transitioning, by the gaming client, to a first graphical representation state, in which a plurality of payline symbols and a watermark associated with the watermark identifier are displayed on the user interface, and the final awarded prize is not revealed by the first graphical representation state;

transitioning, by the gaming client, to an intermediate graphical representation state, wherein a simulated prize is displayed by the user interface that follows the first graphical representation, in which the final awarded prize is not revealed by the intermediate graphical representation state;

transitioning, by the gaming client, to a final prize state, wherein a final graphical representation and the watermark is displayed by the user interface after the intermediate graphical representation;

wherein the first graphical representation, the intermediate graphical representation, and the final prize state are successive states associated with the gaming client receiving the non-zero electronic pull-tab ticket transmitted from the wagering system to the gaming client; and displaying, by the user interface at the gaming client, a paytable that presents a plurality of final prizes corresponding to the plurality of payline symbols and the watermark associated with the final prize.

14. The pull-tab gaming method of claim 13 wherein the game play instruction includes receiving a bet amount which is associated with a player wager.

15. The pull-tab gaming method of claim 13 wherein the game play instruction includes receiving a play game instruction received from a play button.

16. The pull-tab gaming method of claim 13 wherein the simulated prize includes an animation that extends the intermediate graphical representation without affecting the final awarded prize.

17. The pull-tab gaming method of claim 13 further comprising providing a background display when displaying the first graphical representation;

zooming into the background display during the intermediate graphical representation state to generate an exploded view of the background display;

revealing the simulated prize on the exploded view of the background display; and revealing the final awarded prize on the exploded view of the background display.

* * * * *